United States Patent [19]
Takenaka et al.

[11] Patent Number: 5,526,383
[45] Date of Patent: Jun. 11, 1996

[54] NETWORK CONTROL SYSTEM FOR CONTROLLING RELATIVE ERRORS BETWEEN NETWORK NODES

[75] Inventors: Tetsuyoshi Takenaka; Hideto Furukawa; Nobutsugu Fujino; Satoru Chikuma; Atsushi Yamashita; Takeshi Inoue, all of Kawasaki, Japan

[73] Assignee: Fujitsu Limited, Kawasaki, Japan

[21] Appl. No.: 400,198

[22] Filed: Mar. 3, 1995

Related U.S. Application Data

[63] Continuation of Ser. No. 929,525, Aug. 14, 1992, abandoned.

[51] Int. Cl.[6] ............................................... H04B 7/00
[52] U.S. Cl. .......................... 375/356; 375/358; 455/51.1
[58] Field of Search .................................. 375/356, 358, 375/362; 455/57.1, 50.1, 51.1, 54.1, 69, 62, 67.1, 67.6, 88; 370/104.1

[56] References Cited

U.S. PATENT DOCUMENTS

| | | | |
|---|---|---|---|
| 3,646,444 | 2/1972 | Bitzer | 375/107 |
| 3,936,604 | 2/1976 | Pommerening | 375/107 |
| 4,188,582 | 2/1980 | Cannalte et al. | 455/51.2 |
| 4,251,801 | 2/1981 | LeMair et al. | 375/118 |
| 4,651,330 | 3/1987 | Ballane | 375/109 |
| 4,718,109 | 1/1988 | Breeden et al. | 375/107 |
| 5,140,697 | 8/1992 | Igarashi | 455/69 |
| 5,172,260 | 12/1992 | Takatsu | 375/3 |
| 5,212,831 | 5/1993 | Chuang et al. | 455/62 |
| 5,404,575 | 4/1995 | Lehto | 375/356 |

*Primary Examiner*—Stephen Chin
*Assistant Examiner*—Timothy J. May
*Attorney, Agent, or Firm*—Staas & Halsey

[57] ABSTRACT

A network control system for eliminating a relative error among control signals transmitted from nodes provided in radio zones respectively, a mobil station moving among the radio zones, each of the nodes comprising: a relative error detecting unit for detecting a relative error between an after-controlled transmitting control signal to be transmitted to adjacent nodes and a received control signal from an adjacent node; and a control unit for controlling a before-controlled transmitting control signal in such a way that the relative error becomes zero so as to output the after-controlled transmitting control signal.

30 Claims, 53 Drawing Sheets

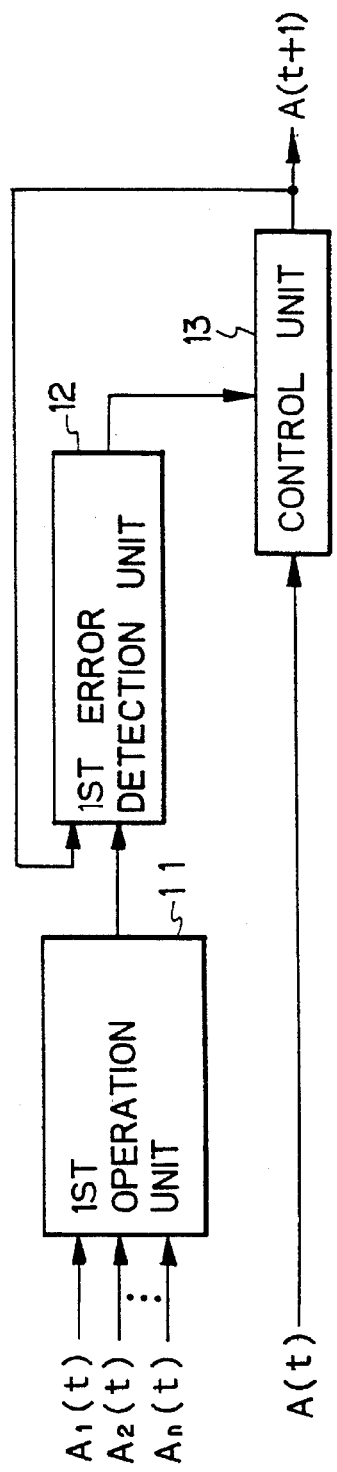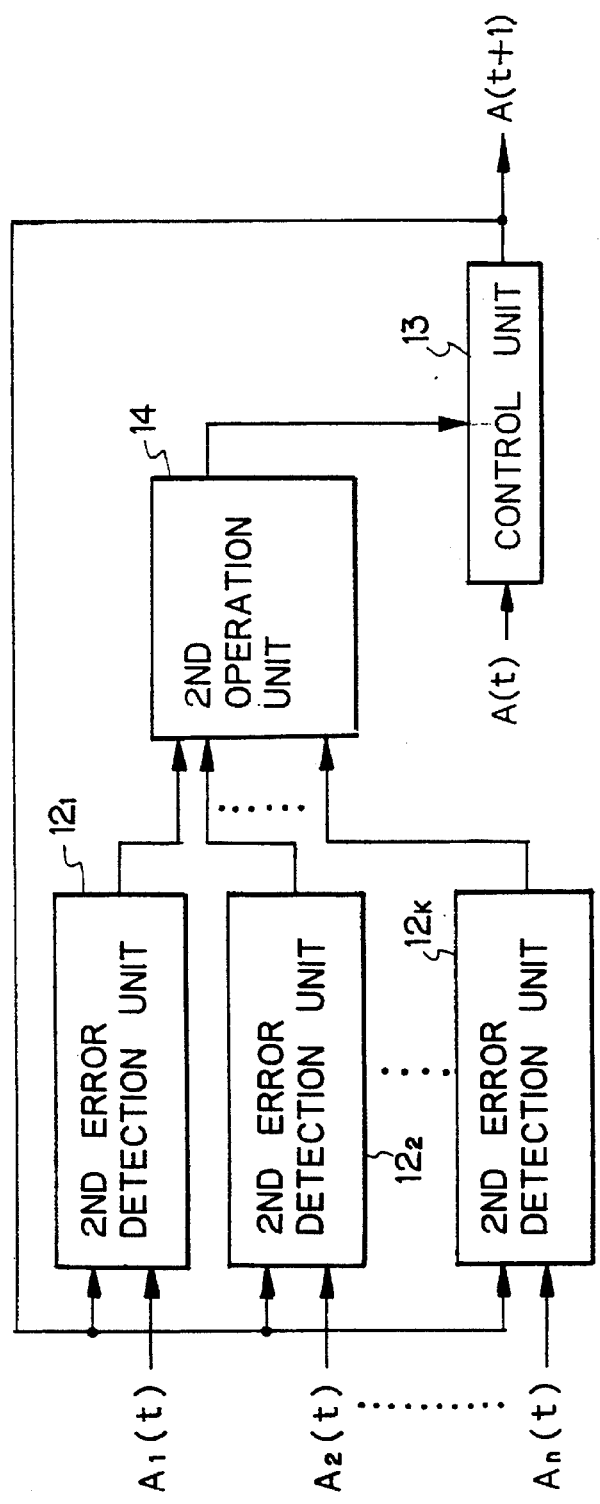

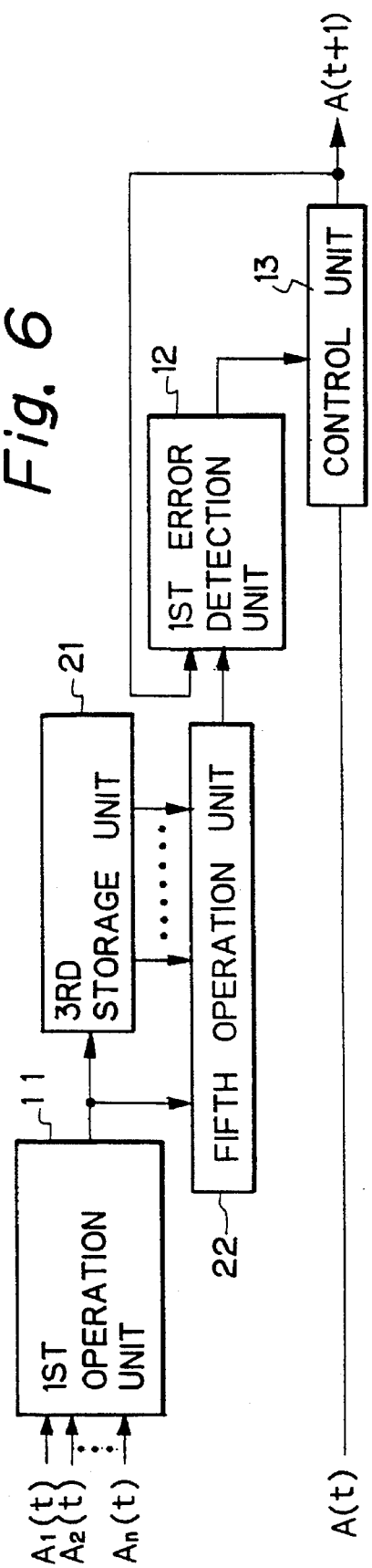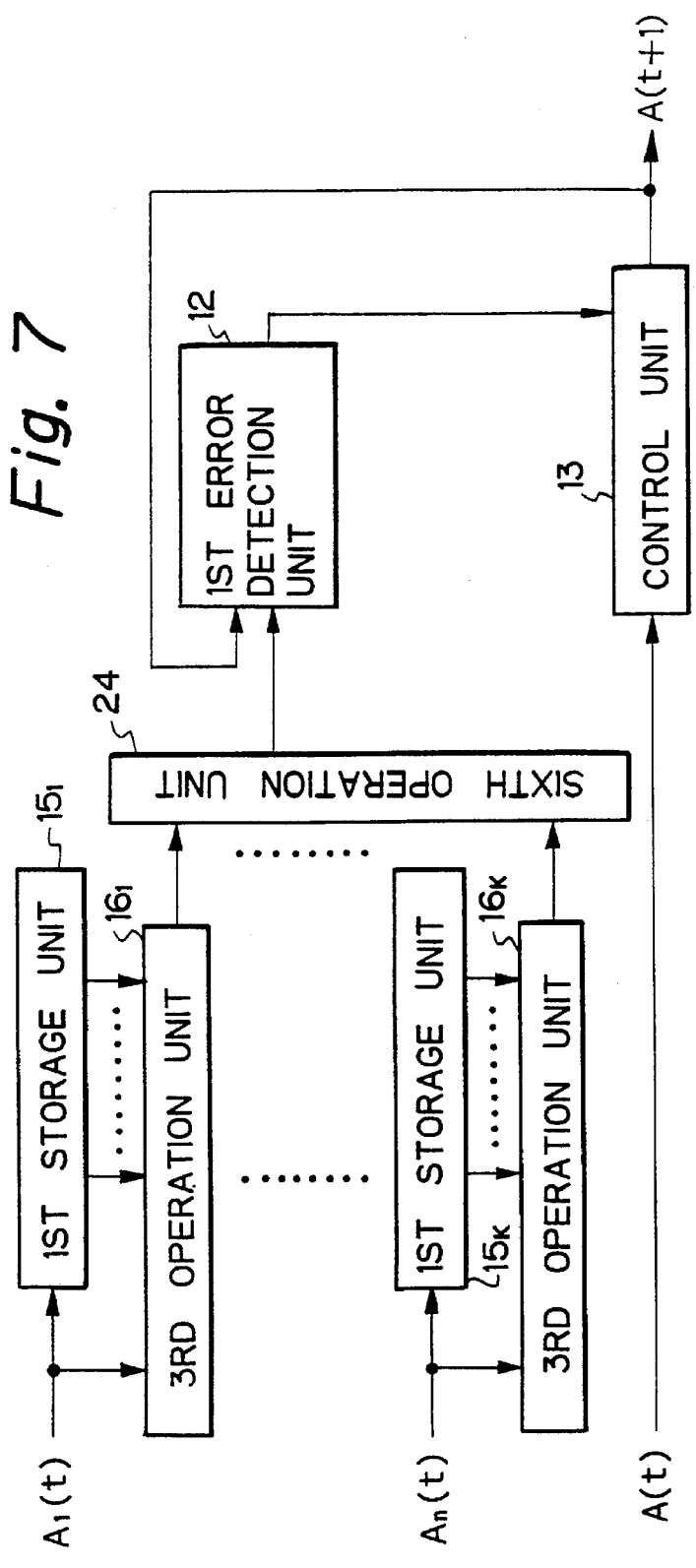

NETWORK CONTROL SYSTEM FOR CONTROLLING RELATIVE ERRORS BETWEEN NETWORK NODES

This application is a continuation, of application Ser. No. 07/929,525, filed Aug. 14, 1992, now abandoned.

BACKGROUND OF THE INVENTION

1. Field of the Invention

The present invention relates to a network control system, and particularly, to a network control system with a mobile station moving among a plurality of cells and communicating with a base station in a cell to which the mobile station belongs.

A mobile communication network divides a service area into a plurality of radio zones (cells) and provides each radio zone with a base radio station (hereinafter also referred to as a "node", depending on the situation). A network control system employed to establish communication between the base radio station and the mobile station is usually based on a TDMA, FDMA, or CDMA method. According to these methods, the mobile station synchronizes itself with the base radio station of a radio zone in which the mobile station is present and communicates with the base station.

Each of the base radio stations has its own reference clock, and according to which, sends a signal. When travelling among the radio zones, the mobile station must synchronize itself with the frequency and timing of a signal transmitted from the base radio station in a new zone any time the mobile station enters the zone. Until synchronization is established, communication is suspended. It is necessary, therefore, to provide means for eliminating relative errors or differences in controlled values such as the phases and frequencies of clocks among adjacent base radio stations.

2. Description of the Related Art

In a conventional network control system, a plurality of base radio stations serving as nodes are monitored by a central radio control station. These central radio control stations constitute a centralized control network for harmonizing and correcting the frequencies, and timing of signals used to communicate among the base radio stations. With this conventional network, a mobile station is not required to synchronize itself with the signals provided by the base radio stations when travelling among their zones.

This conventional network system determines the size of each radio zone depending on the efficiency of frequency use, transmission power of the mobile station, etc., and each zone is made relatively large in size (for example, several kilometers in radius).

In recent years, light and compact mobile stations have been developed having low transmission power. Recently, however, it has been required to improve the efficiency of frequency use, which has extremely reduced the size of each radio zone to, for example, 50 to 100 meters in radius. A network involving such miniature zones must have a large number of conventional base radio stations, thereby increasing the load on an upper apparatus such as a central radio control station and requiring a complicated control system.

To solve these problems, an object of the present invention is to provide a network control system for controlling a plurality of radio zones with a mobile station moving among the zones and communicating with a base radio station of one of the zones where the mobile station is present, wherein each base radio station is capable of adjusting a controlled value of its own transmission signal without relying on a centralized control network involving a central control station thereby reducing the load on the central control station. In more detail, an object of the present invention is to provide such a network control system as above wherein even when the mobile station enters one radio zone from another radio zone, instant disabling of communication does not occur.

SUMMARY OF THE INVENTION

To attain the above objects, there is provided, according to the present invention, a network control system for eliminating a relative error among control signals transmitted from a plurality of nodes provided in a plurality of radio zones respectively, in which a mobile station is moving among the radio zones. Each of the nodes comprises: a relative error detecting unit for detecting a relative error between an after-controlled transmitting control signal to be transmitted to adjacent nodes and a received control signal from an adjacent node; and a control unit operatively connected to the relative error detecting unit, for controlling a before-controlled transmitting control signal in such a way that the relative error becomes zero so as to output the after-controlled transmitting control signal.

In the above system, it is preferable that the relative error detecting unit detects a plurality of the relative errors between the after-controlled transmitting control signal and a plurality of received control signals from a plurality of adjacent nodes, and that the system further comprises a filtering unit, operatively connected between the relative error detecting unit and the control unit, for filtering noise from the relative errors.

Alternatively, the system comprises a filtering unit for filtering noises from a plurality of received control signals from a plurality of adjacent nodes to output a filtered signal, and the relative error detecting unit is connected between the filtering unit and the control unit so as to detect a relative error between the filtered signal and the after-controlled transmitting control signal.

According to another aspect of the present invention, there is provided a network control system for controlling nodes involving fixed base stations and a mobile station with the same frequency for reception and transmission as controlled values, each of the base stations comprising: a reception automatic frequency control unit for adjusting itself with a transmission frequency of an adjacent base station; a frequency error detection unit for detecting a frequency error between an output frequency of the reception automatic frequency control unit and a frequency that is obtained by adding a nominal frequency gap between reference stations to the transmission frequency of its own node; an averaging unit for spatially filtering the frequency errors of the adjacent base stations and providing a spatial mean value; and a transmission frequency control unit for controlling the transmission frequency of its own node in a way to eliminate the frequency errors.

According to still another aspect of the present invention, there is provided a network control system for controlling a plurality of cells each having a base radio station serving as a node for transmitting a transmission signal at optional timing that is a controlled value, each base radio station communicating with a mobile station when the mobile station is located in the zone of the corresponding node, each of the base radio stations comprising: a notification unit for notifying adjacent base radio stations of transmission timing information of its own node; and a correction unit for receiving, as input signals, pieces of transmission timing information of the adjacent base radio stations, and correcting at least the timing of the transmission signal of its own node in a way to minimize a difference between the timing of the signal of its own node and the timing of the transmission signals of the adjacent base radio stations that have been spatially filtered.

BRIEF DESCRIPTION OF THE DRAWINGS

The above features and advantages of the present invention will be more apparent from the following description of the preferred embodiments with reference to the accompanying drawings, wherein;

FIG. 2 and 3 are block diagrams both showing a system employing a spatial filter according to an aspect of the invention;

FIG. 6 and FIG. 7 are block diagrams both showing a system employing a spatial filter and a time filter according to still another aspect of the invention;

DESCRIPTION OF THE PREFERRED EMBODIMENTS

Figure 58:
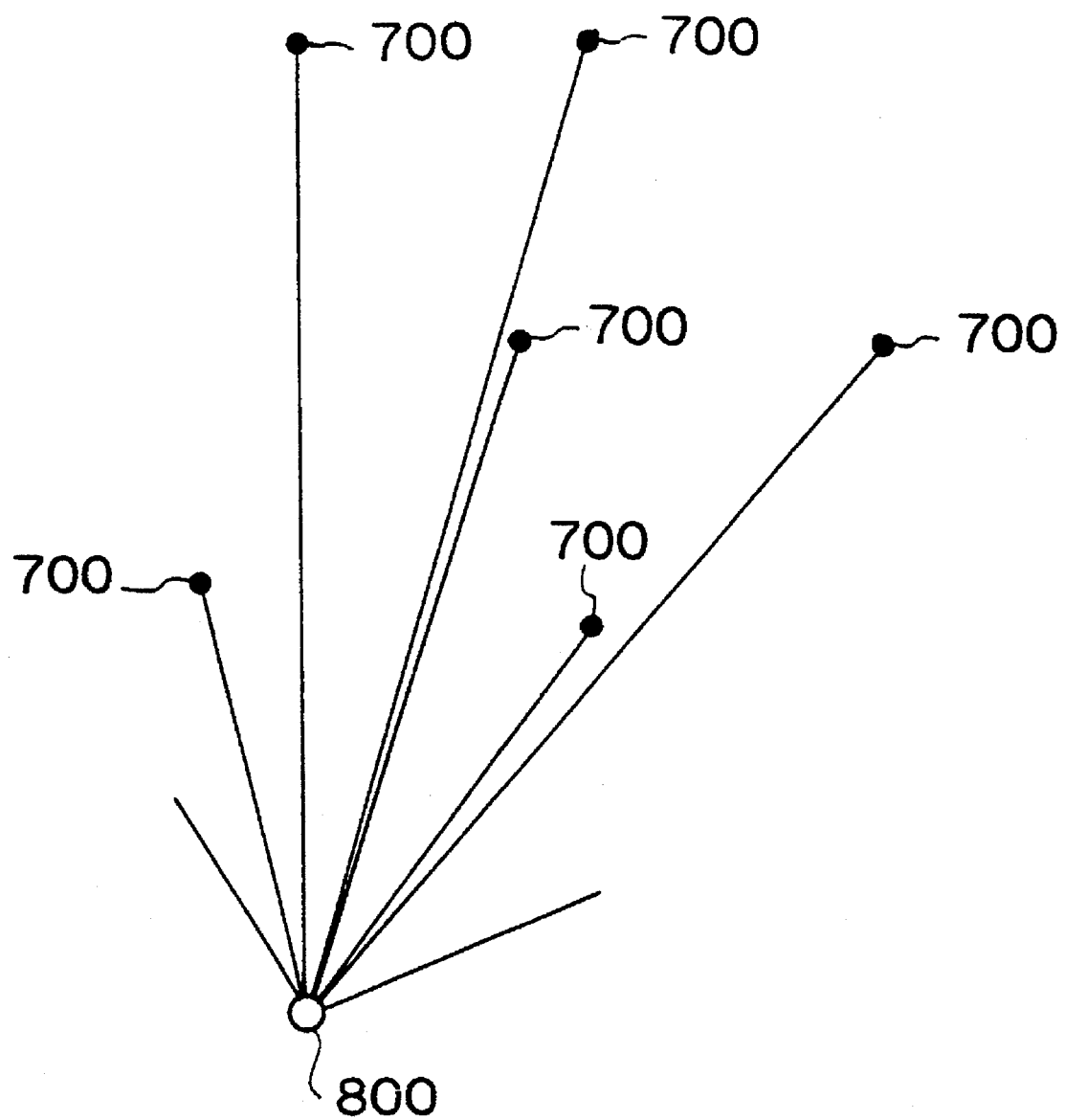
FIG. 58 is a schematic view showing a conventional network.

For better understanding the background of the present invention, a conventional network control system will first be described with reference to FIG. 58. In FIG. 58, 700 represents a plurality of base radio stations, and 800 represents a central control station. The conventional network control system is a centralized control network in which each base radio station 700 is synchronized with the central control station 800. The problem in the conventional system is that, in accordance with the increase of the number of the base radio stations, 700 the load on the central radio control station 800 is increased.

Embodiments of the present invention will be described in the following.

Figure 1A:
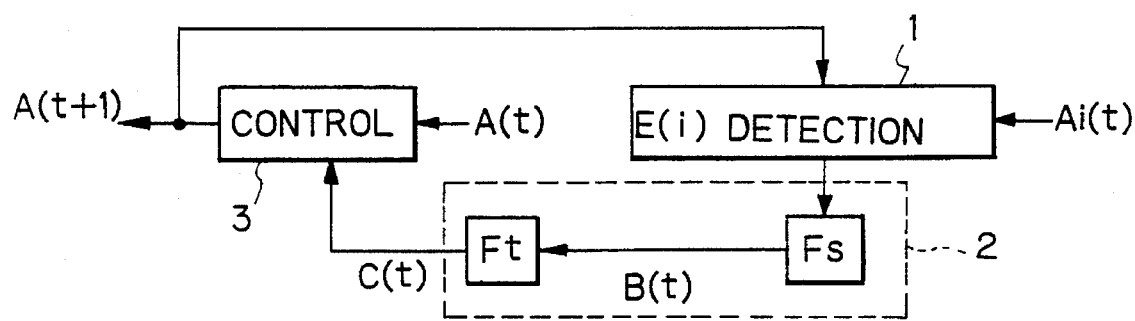
FIG. 1A and FIG. 1B are block diagrams showing principle constructions of a node in a network control system according to the invention.
Figure 1B:
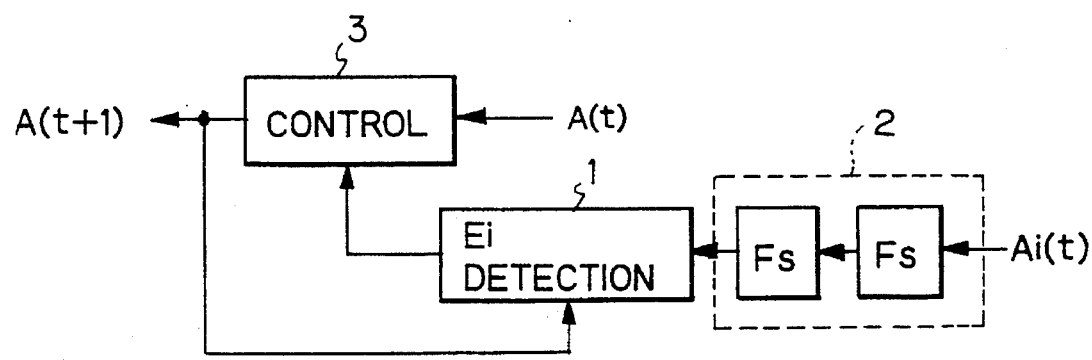

Basic concept and operation of an embodiment shown in FIG. 1A and FIG. 1B

FIG. 1A shows a network control system according to an embodiment of the present invention.

In FIG. 1A, 1 is a relative error detecting unit for detecting a relative error between a transmission signal A(t+1) after transmission, i.e., an after-controlled transmitting control signal A(t+1) to be transmitted to adjacent nodes and a received control signal Ai(t) from an adjacent node; and 3 is a control unit having an output connected to the relative error detecting unit, for controlling a before transmission signal (a before-controlled transmitting control signal) A(t) to output the after-controlled transmitting control signal A(t+1) in such a way that the relative error becomes zero.

The relative error detecting unit 1 detects a plurality of relative errors between the after-controlled transmitting control signal A(t+1) and a plurality of received control signals Ai(t) (i=1, 2, ..., n) from a plurality of adjacent nodes. In FIG. 1A, the system further comprises a filtering unit 2, operatively connected between the relative error detecting unit 1 and the control unit 3, for filtering noises from the relative errors.

In the following, the before-controlled transmitting control signal A(t) is called a controlled value to be controlled in the node; the after-controlled transmitting control signal A(t+1) is called a next controlled value to be controlled in the next node; and the received control signal Ai(t) is called a controlled value already controlled in an adjacent node. The controlled value is a synchronizing signal such as a clock timing or a frequency. The controlled value Ai(t) may be referred to as a first signal; the controlled value A(t) may be referred to as a second signal; and the controlled value A(t+1) may be referred to as a third signal.

A node under consideration involves a controlled value A(t) at time t and controls the next controlled value A(t+1) for the next time t+1 as follows:

$$A(t+1)=A(t)+C(t) \qquad (1)$$

where C(t) is a value obtained by a time filtering operation Ft carried out at the time t and expressed as follows:

$$C(t)=Ft\{B(t), B(t-1), \ldots, B(t-m)\} \qquad (2)$$

where B(t) is a value obtained by a space filtering operation Fs carried out at the time t and expressed as follows:

$$B(t)=Fs\{E1(t), E2(t), \ldots, En(t)\} \qquad (3)$$

where Ei(t) (i=1, 2, ..., n) are relative errors at the time t between the controlled value of the given node and controlled values Ai(t) of nodes that are referred to by the given node and expressed as follows:

$$Ei(t)=A(t)-Ai(t) \ (i=1, 2, \ldots, n) \qquad (4)$$

In this way, the node under consideration provides and receives information of controlled values to and from the adjacent nodes. Without a central control station, this method can remove relative errors of controlled values between a given node and adjacent nodes, thereby correctly controlling controlled values of the system as a whole.

The spatial filtering carried out on error signals removes or reduces the influences of disturbance and abnormality occurring on some reference signals with respect to space. The time filtering removes or reduces the influences of disturbance and abnormality occurring on some of a string of continuous error signals with respect to time.

Order of the spatial filtering Fs and time filtering Ft may be reversed. It is possible to carry out at least one of the space and time filtering operations.

Further, as shown in FIG. 1B, the space and time filtering may be carried out on the received controlled value Ai(t) before detecting the relative error.

Aspects of the embodiments of invention of FIGS. 2 to 9

FIGS. 2 to 9 show preferred aspects of the embodiments of the invention based on the system of FIG. 1A and FIG. 1B.

According to the embodiment shown in FIG. 2, a network control system involves a plurality of base radio stations serving as nodes for transmitting signals. A mobile station communicates with any one of the base radio stations while the mobile station is present in the radio zone of the base radio station in question. Each of the nodes (base radio stations) comprises a first operation unit 11, a first error detection unit 12, and a control unit 13. The first operation unit 11 spatially filters reference signals (which are the controlled values in FIG. 1A or 1B) received from adjacent nodes. The first error detection unit 12 provides an error signal indicating a difference between an output signal of the first operation unit 11 and an output signal A(t+1) of its own node. The control unit 13 controls a synchronization object input signal A(t) in a way to minimize the error signal, and provides the adjacent nodes with a reference signal A(t+1) of its own node.

In FIG. 3, the first error detection unit 12 in FIG. 2 is replaced with a plurality of second error detection units $12_1$ to $12_k$ each providing an error signal indicating a difference between a corresponding reference signal Ai(t) (i=1,2, ..., n) and an output signal A(t+1) of its own node. The first operation unit 11 in FIG. 2 is replaced with a second operation unit 14 for spatially filtering output signals from the second error detection units $12_1$ to $12_k$ and providing a control unit 13 with a control signal.

Figure 4:
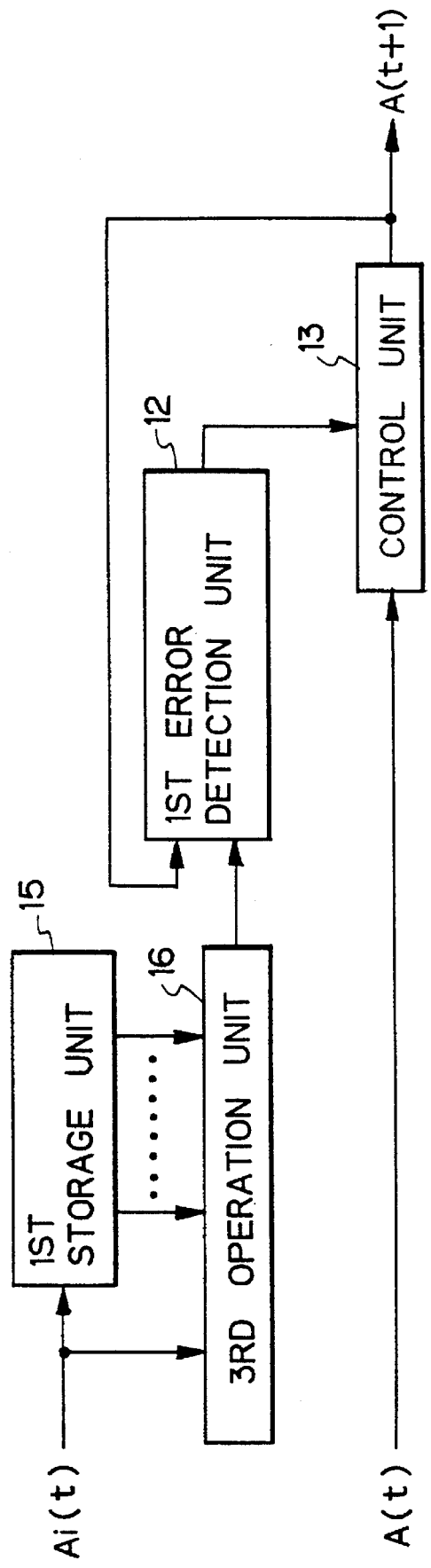
FIG. 4 and 5 are block diagrams both showing a system employing a time filter according to another aspect of the invention.

In FIG. 4, a first storage unit 15 stores a reference signal Ai(t) from an adjacent node at a plurality of instants. A third operation unit 16 filters, with respect to time, at least the reference signals of a plurality of instants provided by the first storage unit 15 and provides a first error detection unit 12 with a filtered signal filtered with respect to time. Other arrangements in FIG. 4 are the same as those in FIG. 2.

Figure 5:
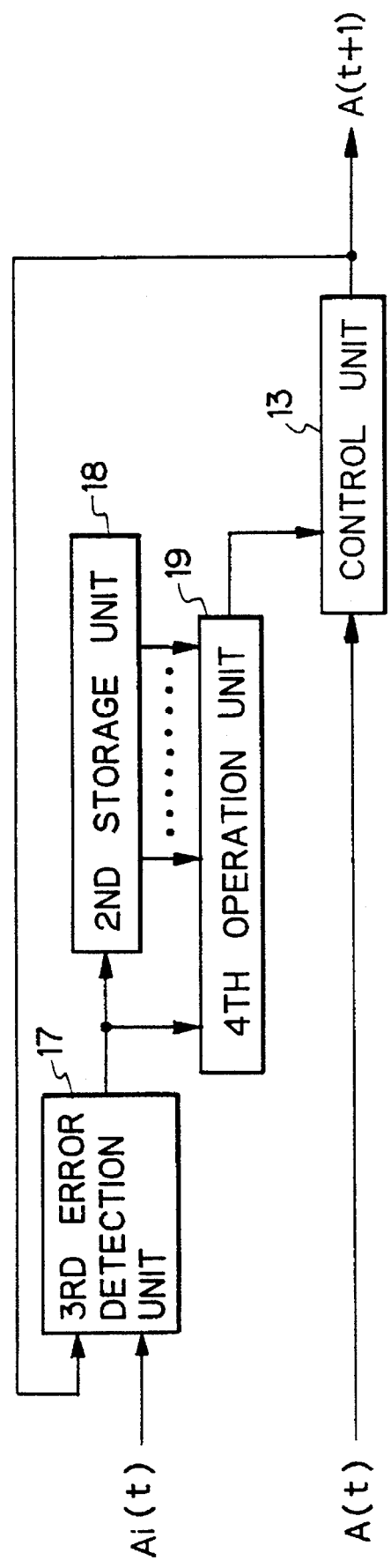

In FIG. 5, a third error detection unit 17 prepares an error signal indicating a difference between an output signal A(t+1) of its own node and a reference signal Ai(t). A second storage unit 18 stores the error signal at a plurality of instants. A fourth operation unit 19 filters, with respect to time, at least the error signal of a plurality of instants provided by the second storage unit 18 and provides a control unit 13 with the signal, filtered with respect to time, as a control signal. Other arrangements of FIG. 5 are the same as those of FIG. 3.

In addition to the arrangement of FIG. 2, an arrangement of FIG. 6 has a third storage unit 21 and a fifth operation unit 22. The third storage unit 21 stores an output signal of the first operation unit 11 at a plurality of instants. The fifth operation unit 22 filters, with respect to time, at least an output signal of plurality of instants provided by the third storage unit 21 and provides a first error detection unit 12 with the signal filtered with respect to time.

In addition to the arrangement of FIG. 2, an arrangement of FIG. 7 has a plurality of first storage units $15_1$ to $15_k$, a plurality of third operation units $16_1$ to $16_k$, and a sixth operation unit 24 for spatially filtering temporally filtered reference signals provided by the third operation units $16_1$ to $16_k$. The term spatially filtering refers to a filtering with respect to space, and the term temporally filtering refers to a filtering with respect to time.

Figure 8:
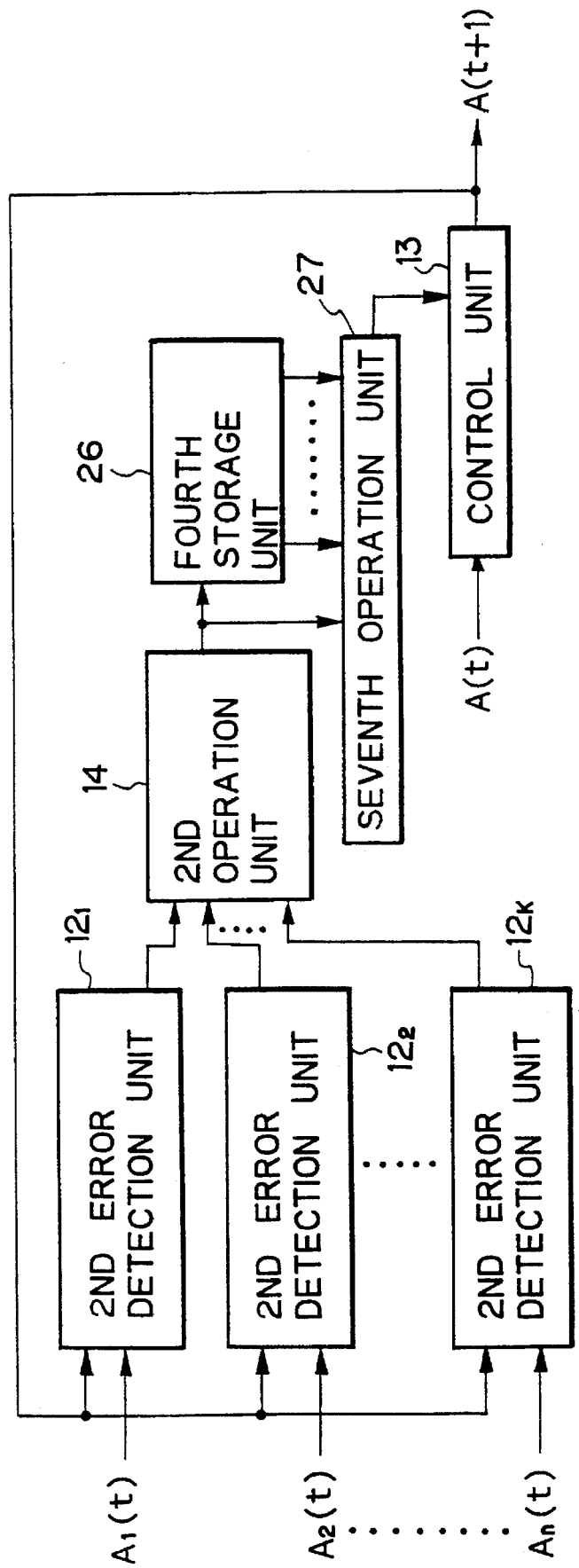
FIG. 8 is a block diagram showing a system employing a spatial filter and a time filter according to still another aspect of the invention.

In addition to the arrangement of FIG. 3, an arrangement of FIG. 8 has a fourth storage unit 26 and a seventh operation unit 27. An error signal spatially filtered by the second operation unit 14 is temporally filtered by the fourth storage unit 26 and seventh operation unit 27 and provided as a control signal to a control unit 13.

Figure 9:
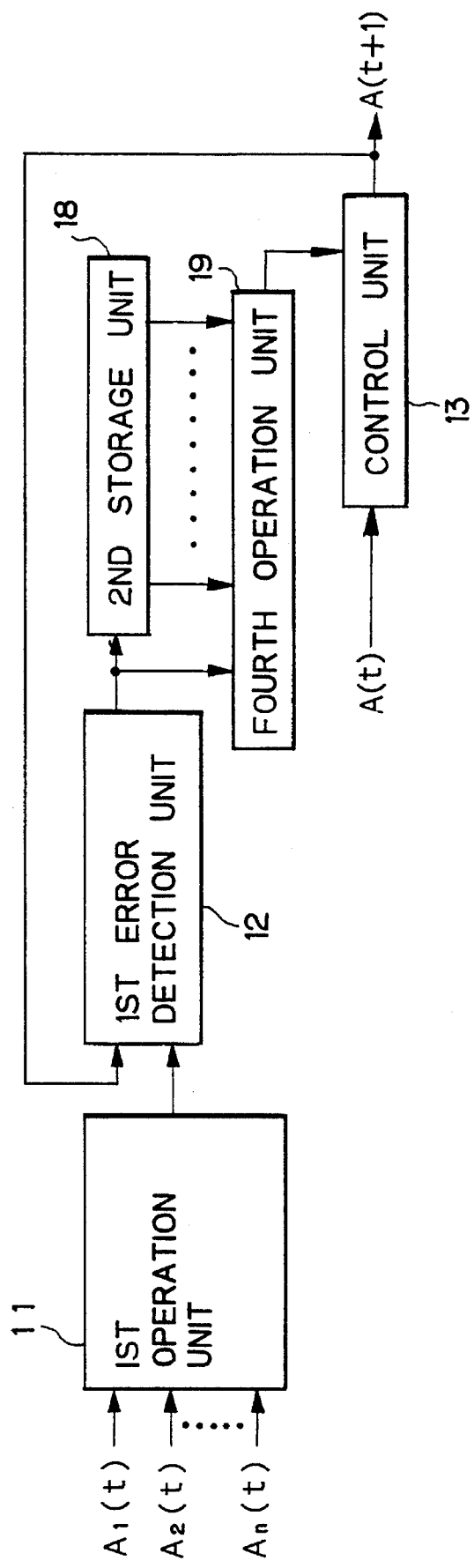
FIG. 9 is a block diagram showing a system employing a spatial filter and a time filter according to still another aspect of the invention.

FIG. 9 shows a combination of the arrangements of a modification of FIG. 1B, wherein the reference signals Ai(t), illustrated as $A_1(t) \ldots A_n(t)$, are spatially filtered by the first operation unit 11. The first error detection unit 12 prepares an error signal indicating a difference between an output signal A(t+1) of its own node and the output signal of the first operation unit 11. The second storage unit 18 stores the error signal at a plurality of instants. The forth operation unit 19 temporally filters at least the error signal of a plurality of instants provided by the second storage unit 18 and provides the control unit 13 with the temporally filtered signal as a control signal.

Figure 10:
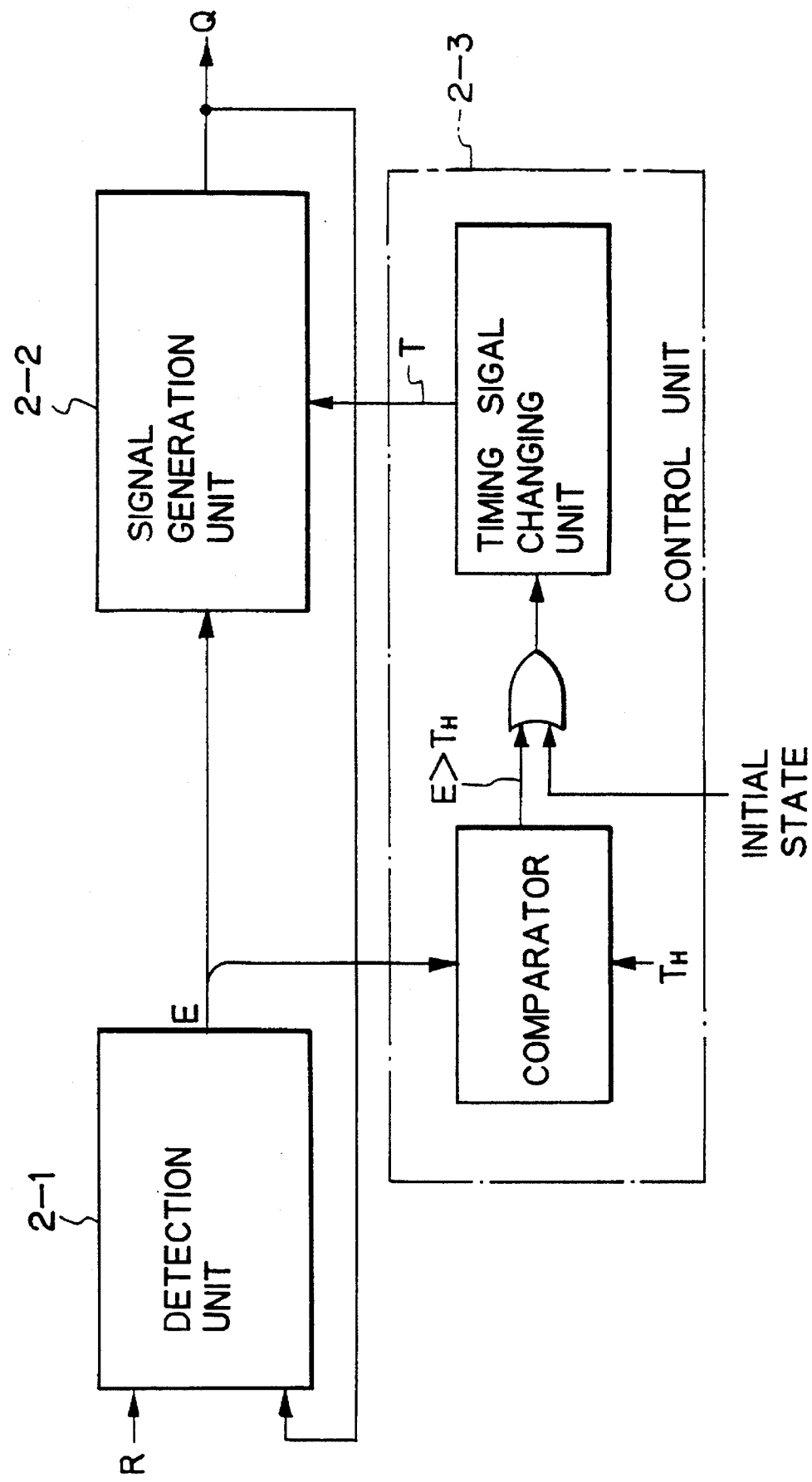
FIG. 10 is a block diagram showing a system employing variable intervals according to still another aspect of the invention.
Figure 11:
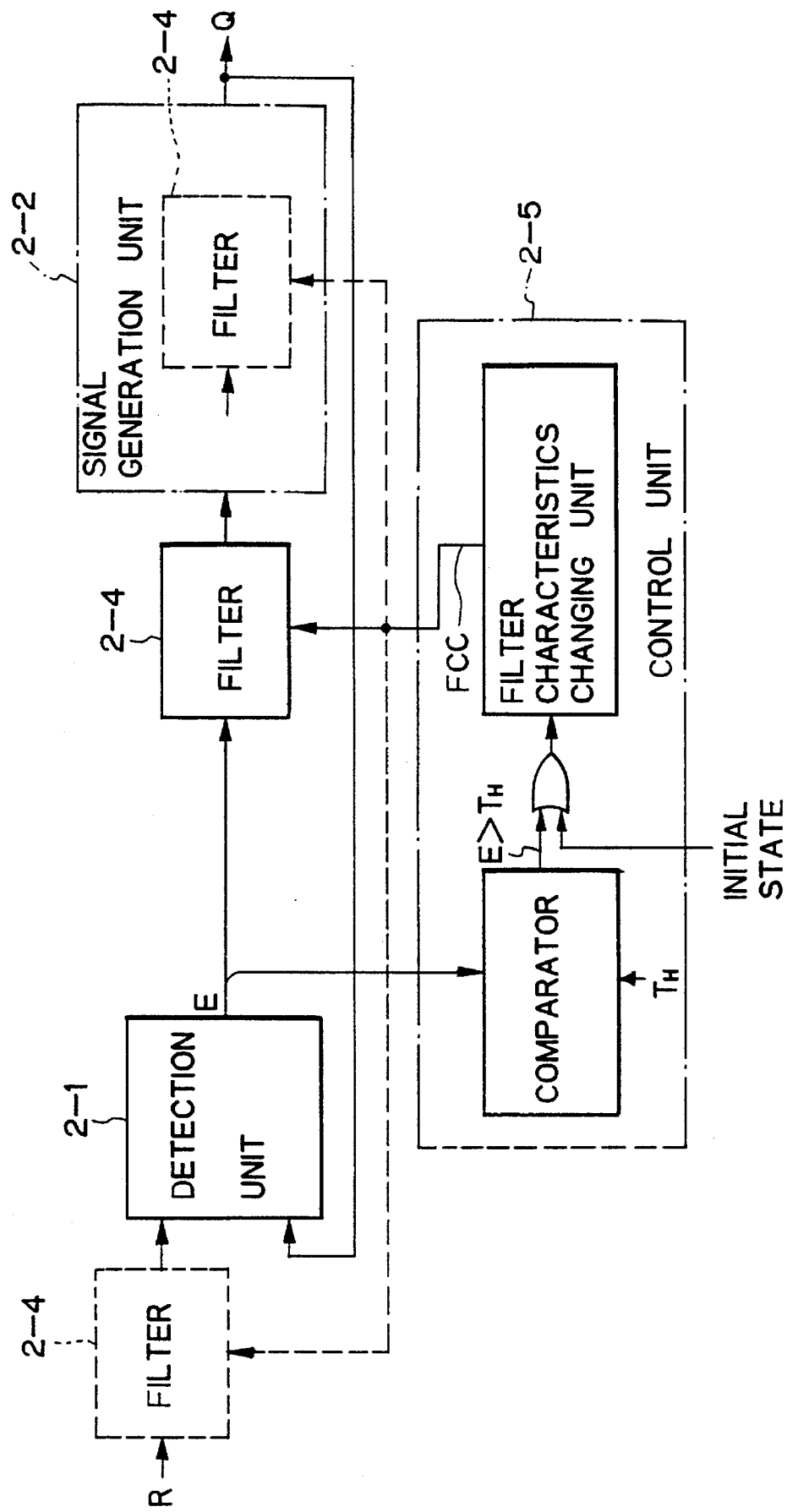
FIG. 11 is a block diagram showing a system employing variable filtering characteristics according to still another aspect of the invention.
Figure 12:
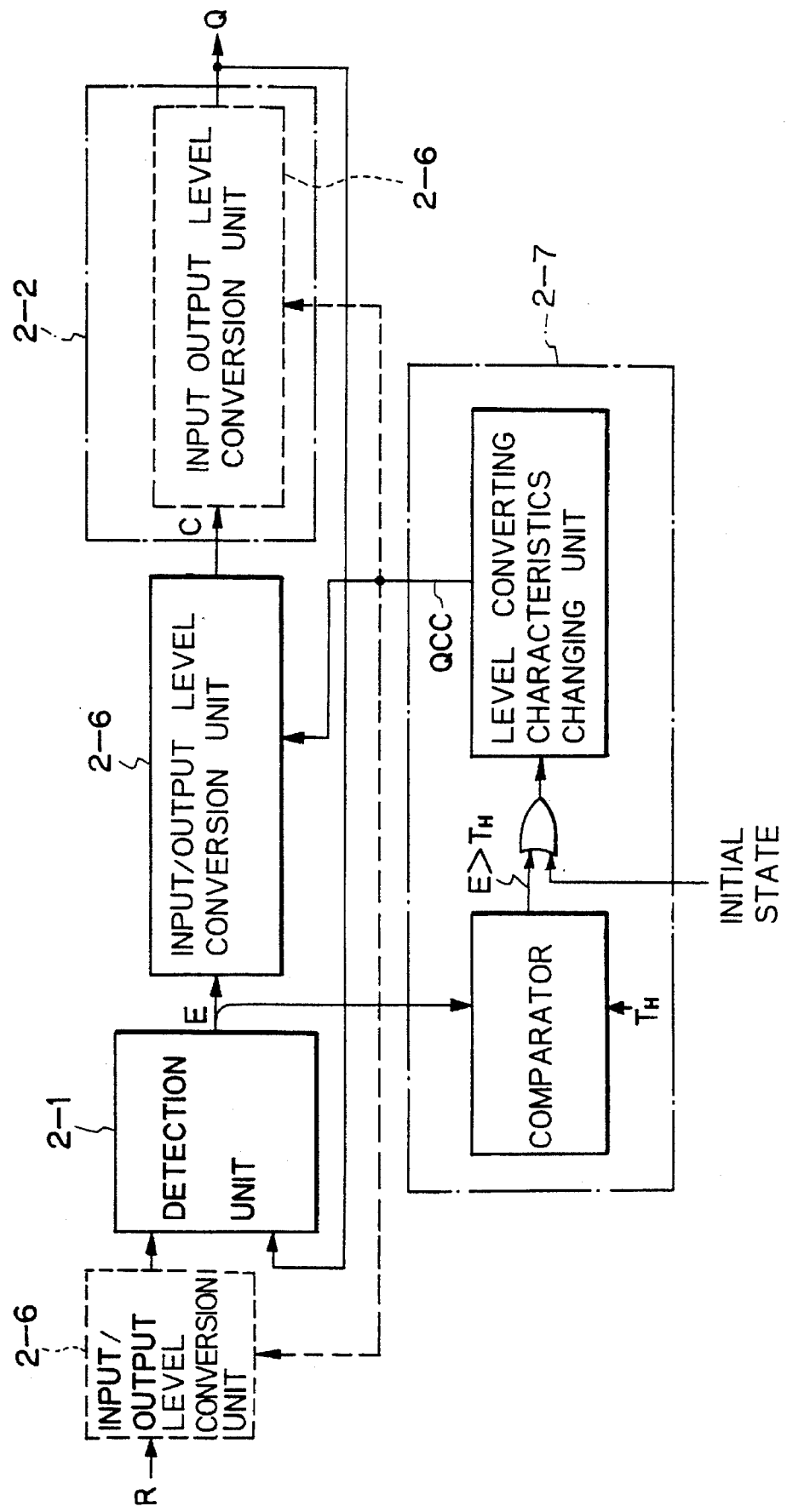
FIG. 12 is a block diagram showing a system employing variable level converting characteristics according to still another aspect of the invention.

Aspects of the embodiments of the invention of FIGS. 10 to 12

FIGS. 10 to 12 show preferred examples of apparatuses directly employable for the basic system of FIG. 1A.

Each node usually periodically updates the timing and parameters (which are the controlled values or the controlled transmitting signals in FIGS. 1A and 1B) of its own signal in order to synchronize the controlled values with those of adjacent nodes. Shortening signal updating intervals will reduce a convergent time of the system. This, however, raises a problem that the system is easily affected and destabilized by disturbance. Elongating the time width of a temporal filtering operation will improve an effect of suppressing the influence of disturbance. This, however, raises a problem of extending a convergent time of the system. Improving the accuracy of quantization will minimize a residual error, thereby achieving accurate synchronous control. This, however, causes a problem of elongating a convergent time of the system.

In FIG. 10 of the invention, a detection unit 2-1 detects a differential signal E between an output signal Q (corresponding to the controlled value of FIG. 1A) of its own node and a signal R from another node. A signal generation unit 2-2 controls the signal Q in a way to minimize the differential signal E according to a timing signal T from a control unit 2-3. The control unit 2-3 changes intervals of activating the signal generation unit 2-2 when the system is initialized or depending on the magnitude of the differential signal E. When the system is initialized according to, for example, a power ON reset signal, or when the differential signal E is greater than a predetermined value $T_H$, the control unit 2-3 shortens the intervals of activation to promote convergence to the signal R, and in other cases, elongates the intervals of activation to avoid an influence of disturbance.

In FIG. 11, a detection unit 2-1 detects a differential signal E between a signal Q of its own node and a signal R from another node. A signal generation unit 2-2 controls the signal Q in a way to minimize the differential signal E. A filter 2-4 spatially or temporally filters the signal R provided by another node, the differential signal E provided by the detection unit 2-1, or a control signal C prepared for the signal generation unit 2-2 from the differential signal E. A control unit 2-5 changes the filtering characteristics of the filter 2-4 when the system is initialized or depending on the magnitude of the differential signal E. When the system is initialized or when the differential signal E is greater than a predetermined value $T_H$, response of the filter 2-4 is quickened to speed up convergence to the signal R. In other cases, the response is slowed down to avoid disturbance.

In FIG. 12, a detection unit 2-1 detects a differential signal E between a signal Q of its own node and a signal R of another node. A signal generation unit 2-2 controls the signal Q in a way to minimize the differential signal E. An input/output level conversion unit 2-6 converts input and output levels of the signal R from another node, of the differential signal E, or of a control signal C prepared for the signal generation unit 2-2 from the differential signal E. A control unit 2-7 changes the level converting characteristics of the input/output level conversion unit 2-6 when the system is initialized or depending on the magnitude of the differential signal E. When the system is initialized or when the differential signal E is greater than a predetermined value $T_H$, the level conversion characteristics are made to be coarse for quantization or linearization, to expedite convergence to the signal R. In other cases, quantization accuracy around an input level of 0 is improved to increase the accuracy of convergence.

Figure 13:
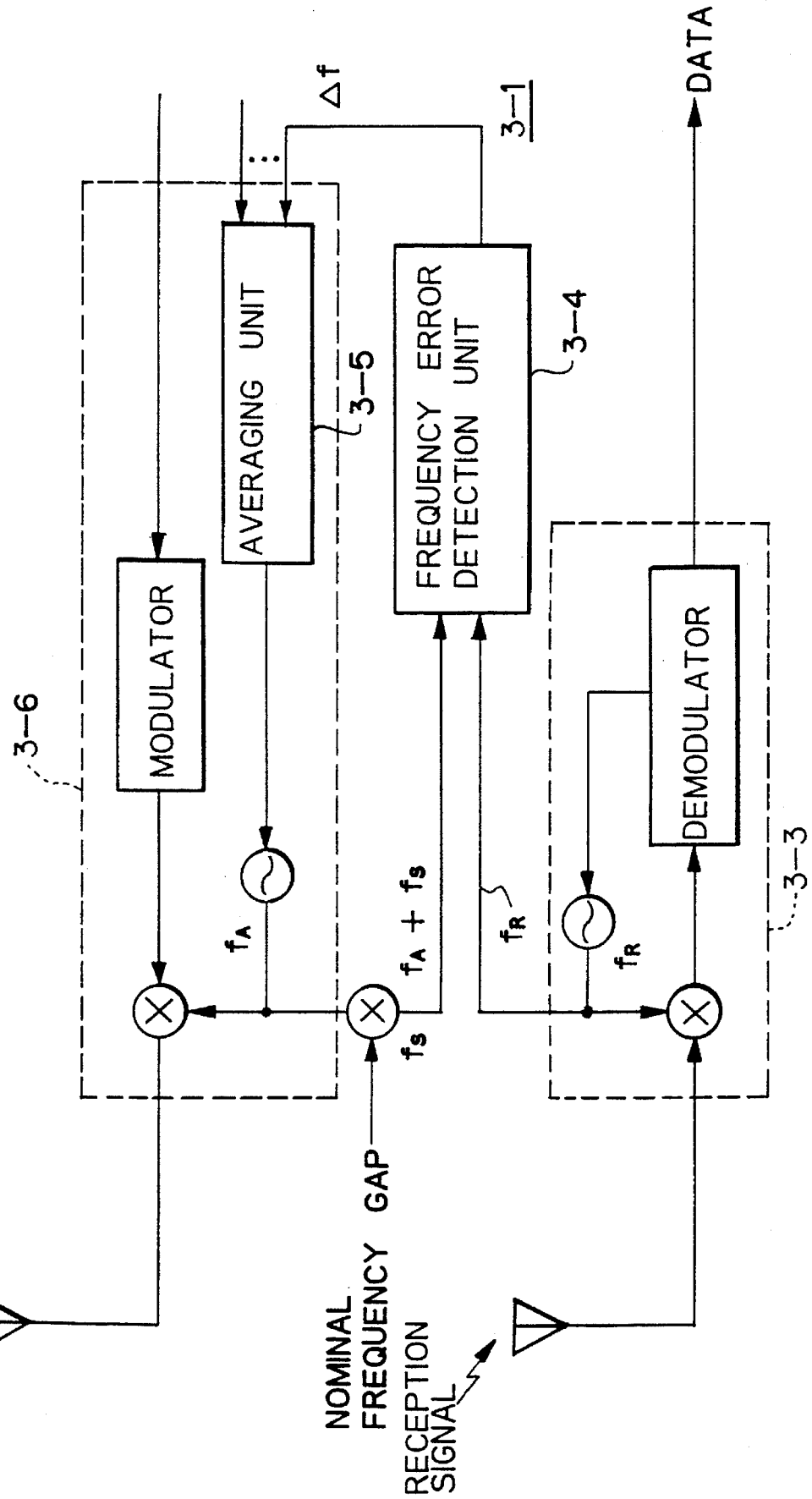
FIG. 13 is a block diagram showing a system for controlling frequencies according to still another aspect of the invention.

Aspect of the embodiments of the invention of FIG. 13

FIG. 13 shows a preferred embodiment of the invention for controlling frequencies as controlled values. This embodiment is directly applicably for the basic system of FIG. 1.

Generally, radio channel frequencies $f_A$ and $f_B$ (which are the controlled values of FIG. 1A) of base stations of adjacent nodes have a nominal frequency gap $f_S$ to minimize an interference between the frequencies. When a mobile station travels among zones from one base station to an adjacent base station, the mobile station changes its frequency from $f_A$ to $f_B$ for communicating with a corresponding base station.

The oscillation frequency of a local oscillator that determines a radio channel frequency has a finite stability. For this reason, a frequency allocated for one base station always involves a finite error. In a conventional mobile radio communication system, this frequency error is absorbed by an automatic frequency control (hereinafter referred to as AFC) circuit provided for the mobile station.

Accordingly, when the mobile station travels from one zone to another (hereinafter, the travelling of the mobile station among zones or cells will be referred to as a hand-over), the mobile station receives information related to the radio channel frequency $f_B$ of the base station of the zone into which the mobile station has entered. Even if such information is provided, the mobile station must absorb, through the AFC circuit, an error frequency $(f_B-f_B')$ between a nominal frequency $f_B$ and an actual frequency $f_B'$ of the base station in question. In practice, a signal provided by a base station with which the mobile station was communicating before a hand-over involves a frequency error, so that a maximum frequency error that must be absorbed may be twice the frequency error allowed for the base station.

Accordingly, the AFC circuit extensively operates during a transient period for every hand-over, and until the operation of the AFC circuit is completed, a call or data transmission is suspended, thereby causing inconvenience for a user. It is pointed out that effective use of frequencies is achievable by reducing the size of each zone (cell) and by spatially repeatedly using the frequencies. This causes many hand-overs to occur, thereby causing many momentary stoppages of communication and deteriorating system serviceability.

To solve this problem, the invention intends to eliminate relative frequency errors between adjacent base stations where hand-overs occur. This requires a mobile station to only change its frequency for a nominal radio channel frequency gap $f_S$ whenever a hand-over occurs.

To achieve this, each base station detects a difference between the signal frequency of an adjacent base station and the signal frequency of its own node and zeroes the difference by controlling the transmission frequency of its own node.

In the preferred network control system of FIG. 13, a reception automatic frequency control unit 3-3 of a base station 3-1 carries out an AFC operation according to the transmission frequency of an adjacent base station. A frequency error detection unit 3-4 compares a frequency $f_R$ provided by the control unit 3-3 with a frequency "$f_A+f_S$" obtained by adding a prescribed frequency gap $f_S$ between base stations to a transmission frequency $f_A$ of the base station 3-1, and provides a frequency error $\Delta f$.

Such frequency error $\Delta f$ is detected between the base station in question and every adjacent base station. An averaging unit 3-5 averages the detected errors by spatially filtering the errors as shown in FIG. 1.

When an "i"th base station has a nominal frequency $f_i$ and an actual frequency $f_i'(t)$ at time t, a relative frequency error $\Delta f_i(t)$ with respect to any adjacent base station j (j=1, 2, . . . , N) with which a hand-over may occur will be expressed as follows:

$$\Delta f_i(t) = \left[ \sum_{j=1}^{N} \{(f_i'(t)-f_i) - (f_j'(t)-f_j)\} \right]/N \qquad (5)$$

$$= \left[ \sum_{j=1}^{N} \{(f_i'(t) + (f_j-f_i) - f_j'(t)\} \right]/N$$

$$= \left[ \sum_{j=1}^{N} \{(f_i'(t) + f_{sij}) - f_j'(t)\} \right]/N$$

where $f_{sij}$ is expressed as follows:

$$f_{sij}=f_j-f_i \qquad (6)$$

Namely, $f_{sij}$ is a difference between the nominal frequencies of the base stations i and j and is an integer multiple of the nominal frequency gap $f_S$. An accumulation of $_{j=1}\Sigma^N$ is carried out for j=1, 2, . . . , N.

The averaging unit 3-5 provides a transmission frequency control unit 3-6 with the error information $\Delta f_i(t)$, and the control unit 3-6 controls a transmission frequency $f_A$ of its own station at time t+1 as follows:

$$f_i(t+1)=f_i(t)-\alpha\Delta f_i(t) \qquad (7)$$

where $\alpha$ is a numerical coefficient of $0<\alpha<1$.

When averaging relative frequency errors between a given base station and adjacent base stations, it is possible to use a weight of C/N of each signal to calculate a weighted mean, or exclude extremely large errors. These averaging techniques may improve the stability of the control system.

The averaging unit 3-5, according to the invention, can also average the frequency errors $\Delta f_i(t)$ by temporally filtering the frequency errors. This may eliminate adverse effects caused by noise, etc., in communication paths and smooth momentary large errors, thereby further stabilizing the system. This is particularly needed when the C/N of a received signal is low.

In this way, relative frequency errors between a given base station and adjacent base stations are eliminated. This effect, however, is only local. When an absolute frequency value must be secured, the above relative frequency control technique carried out between adjacent base stations is insufficient because it never guarantees an absolute frequency value.

Figure 14:
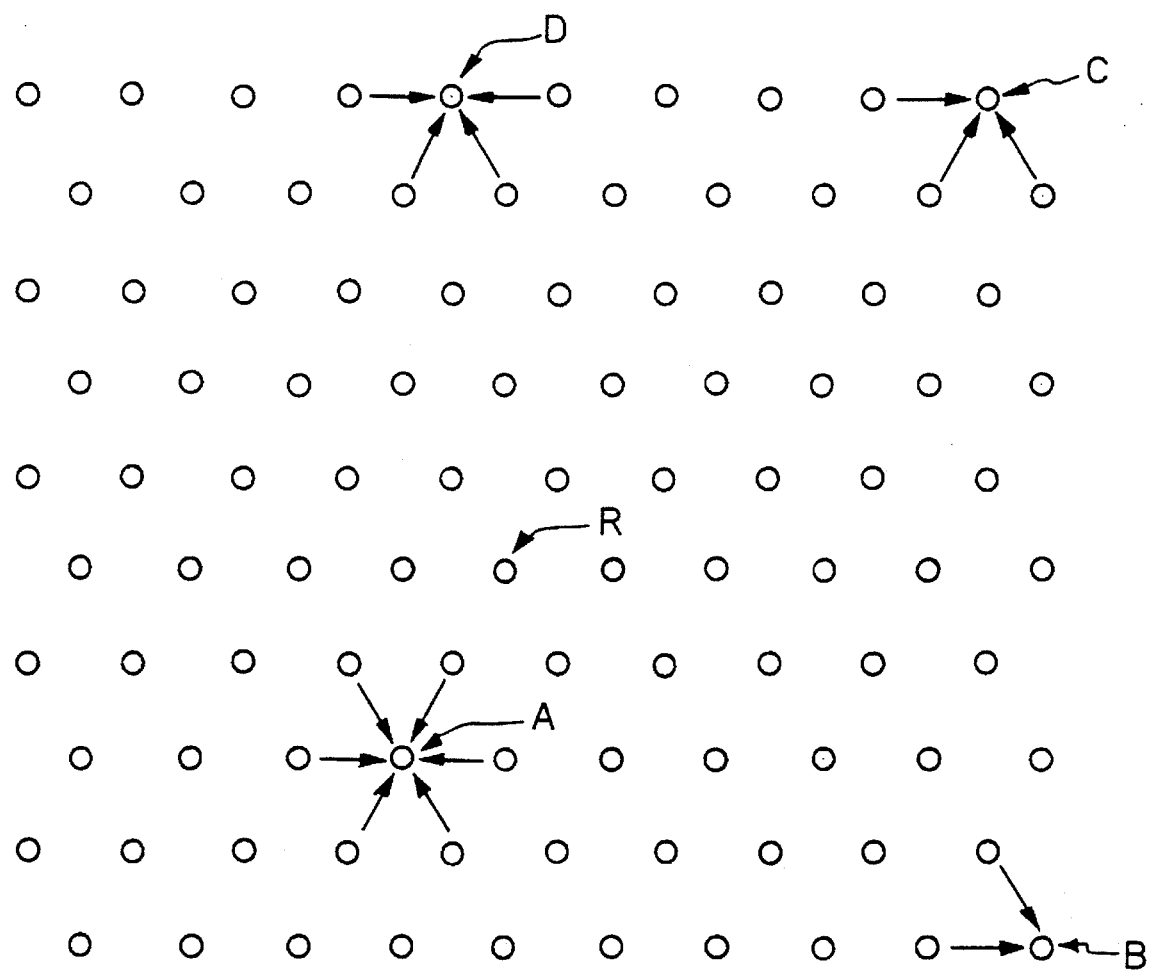
FIG. 14 is a view showing an arrangement of base stations.

FIG. 14 shows a method of globally eliminating frequency errors from a communication system, according to the invention. In the figure, one of base stations 3-1 is selected as a reference station R that transmits an absolute transmission frequency. Being pulled by this absolute transmission frequency, each of the other base stations absorbs the frequency error $\Delta f$ mentioned above, thereby guaranteeing an absolute frequency for the whole system and improving reliability of the system.

This invention is applicable not only for a communication system employing the same frequency for transmission and reception but also for a communication system employing different frequencies for transmission and reception with each base station and mobile station always controlling a frequency difference between a reception frequency and a transmission frequency.

Figure 15:
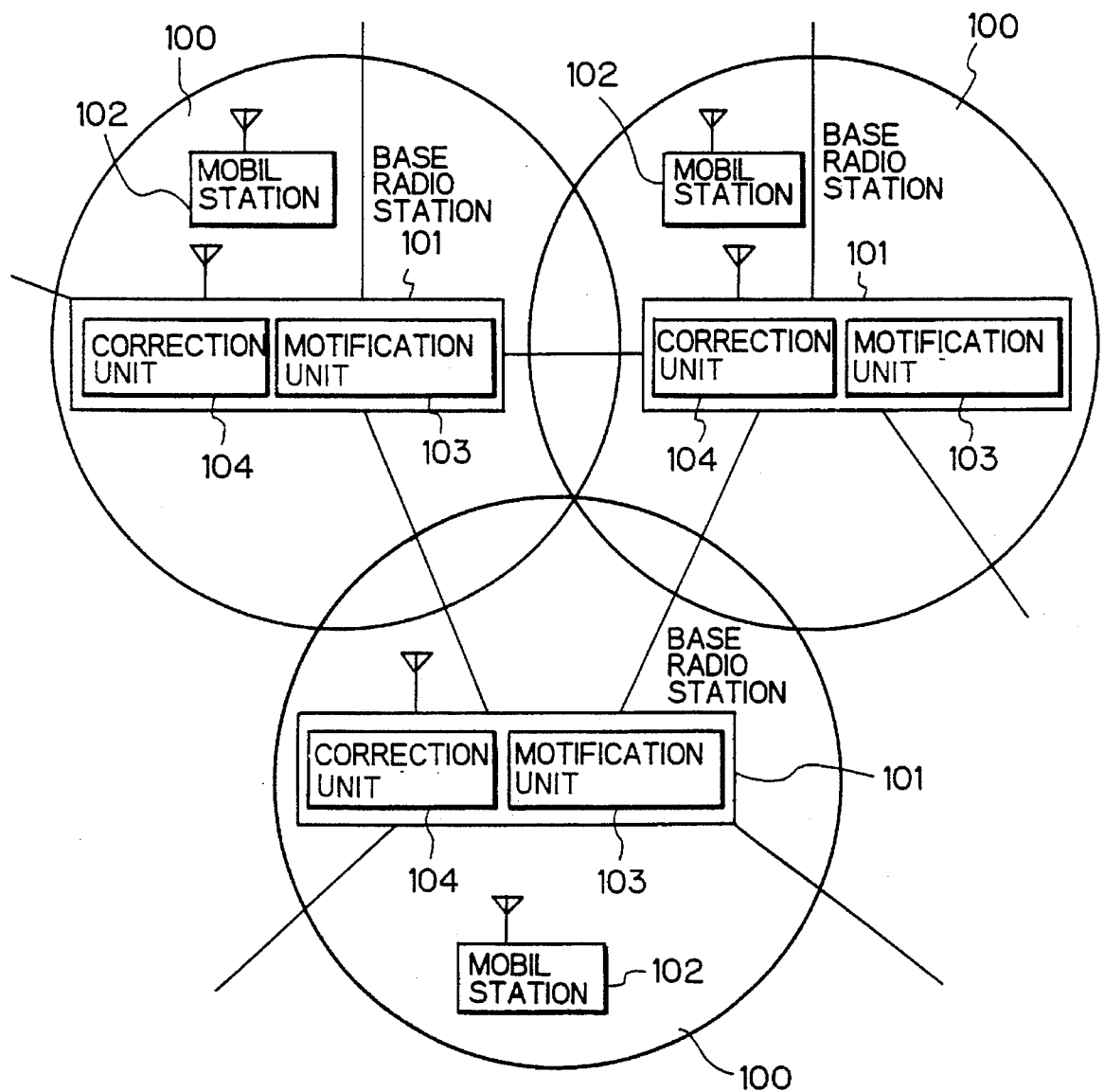
FIG. 15 is a block diagram showing a system for controlling timing according to still another aspect of the invention.

Aspect of the embodiment of the invention of FIG. 15

FIG. 15 shows an aspect of the invention based on the system of FIG. 1A or 1B. The controlled value of this aspect is timing.

A network control system of this aspect involves base radio stations 101 serving as nodes. Each of the base radio stations 101 comprises a notification unit 103 for notifying adjacent base radio stations 101 of transmission timing of its own node, and a correction unit 104 for receiving transmission timing information as an input signal and correcting at least the phase of a transmission signal of its own node in a way to minimize a difference between the timing of its own node and the timing of a transmission signal that has been received from an adjacent base station 101 and spatially filtered.

Figure 16:
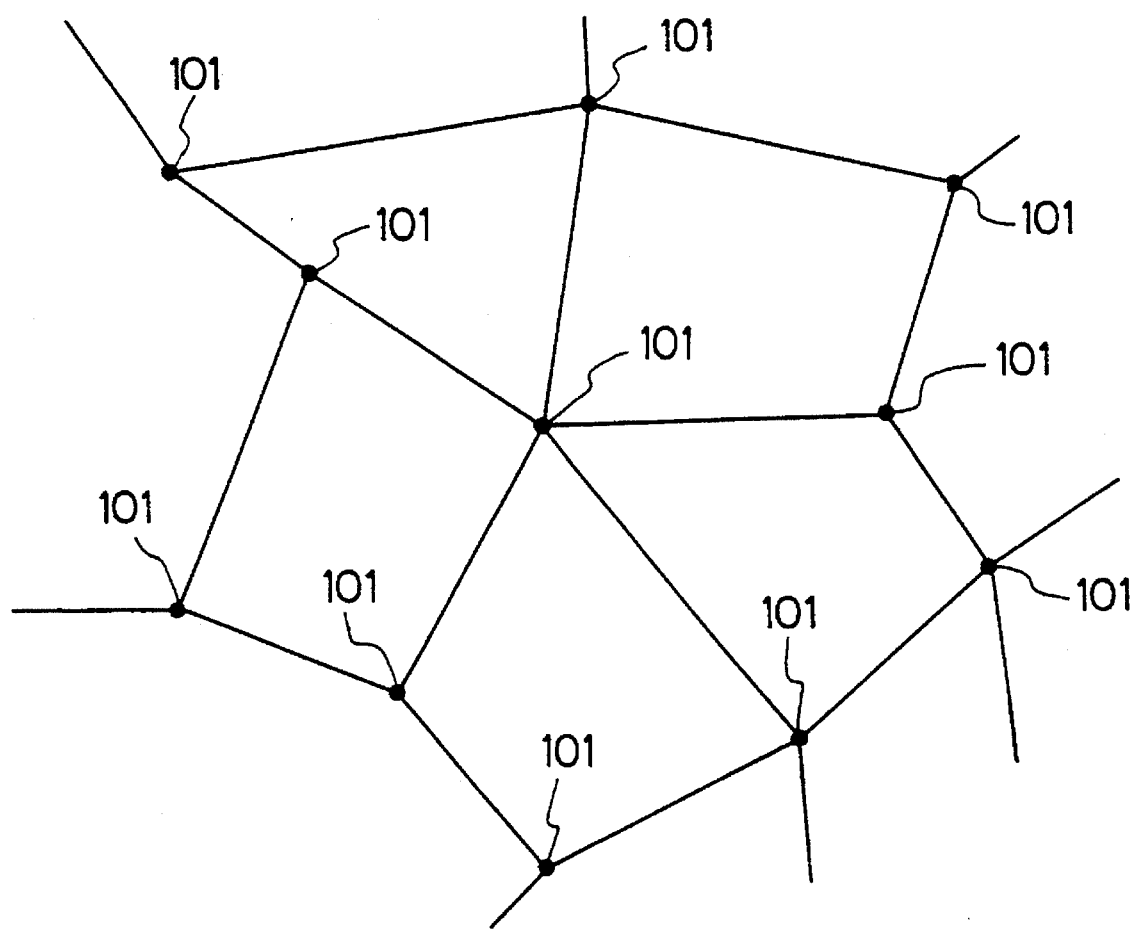
FIG. 16 is a schematic view showing a network according to the invention.

The base radio stations 101 communicate individual transmission timing information with one another through the notification unit 103. The correction unit 104 of each of the base radio stations 101 corrects, according to the transmission timing information, at least the phase of the transmission signal of its own node in a way to minimize a difference between the transmission timing of its own node and those of signals of the adjacent base stations. As a result, the phase difference becomes zero in the end. This embodiment forms a distributed control network system with the base radio stations 101 serving as nodes, similar to the model of FIG. 16.

The correction mentioned above will be explained in more detail. The level (corresponding to a frame phase and clock frequency in the TDMA method, and a clock phase and clock frequency in the FDMA or CDMA method) of a given node (base radio station 101) of the distributed control network is expressed as $B(i, t)$, where $i$ is a node number and $t$ is time. Each node compares the level with those of adjacent nodes and corrects a difference between them.

With node numbers 1 to N (for the sake of convenience, $i > N$) to be compared with one another, the difference of level between a given node and adjacent nodes after a spatial filtering operation is expressed as follows:

$$\Delta B(i, t-1) = B(i, t-1) - {}^N\Sigma_{n=1} B(n, t-1)/N \tag{8}$$

Accordingly, the level $B(i, t)$ of the node $i$ is corrected as follows:

$$B(i, t) = B(i, t-1) - [\alpha \Delta B(i, t-1)]_{AVE} \tag{9}$$

where $\alpha$ is a coefficient ($0 < \alpha \leq 1$) and $[]_{AVE}$ is averaging.

For any of the TDMA, FDMA, and CDMA methods, the invention equalizes the levels of all nodes in the end and synchronizes all base radio stations with one another.

According to the invention, each node (base radio station 101) is connected to adjacent nodes, so that, even if any one of the adjacent nodes fails, the remaining nodes will not be affected by the failure because they can control themselves according to timing information provided by the normal adjacent nodes. Even when the number of nodes (base radio stations 101) is increased, an increase in the number of adjacent nodes around a given node will be small so that load on the node will be substantially unchanged.

According to the invention, each node may have a pull-in range to only control controlled values that exist in the pull-in range. This technique excludes uncontrollable values from mutual synchronous control, thereby reducing a destabilized period of the system.

According to the invention, base stations that provide controlled values may be selected according to a certain rule. This technique prevents a fluctuation in the controlled values from spreading to adjacent nodes at random, thereby reducing a destabilized period of the network.

According to the invention, the spatial filtering operation mentioned above may provide a weighted mean of relative errors of controlled values according to a reception electric field strength selected by diversity reception, to omit a special S/N detection circuit.

Figure 17:
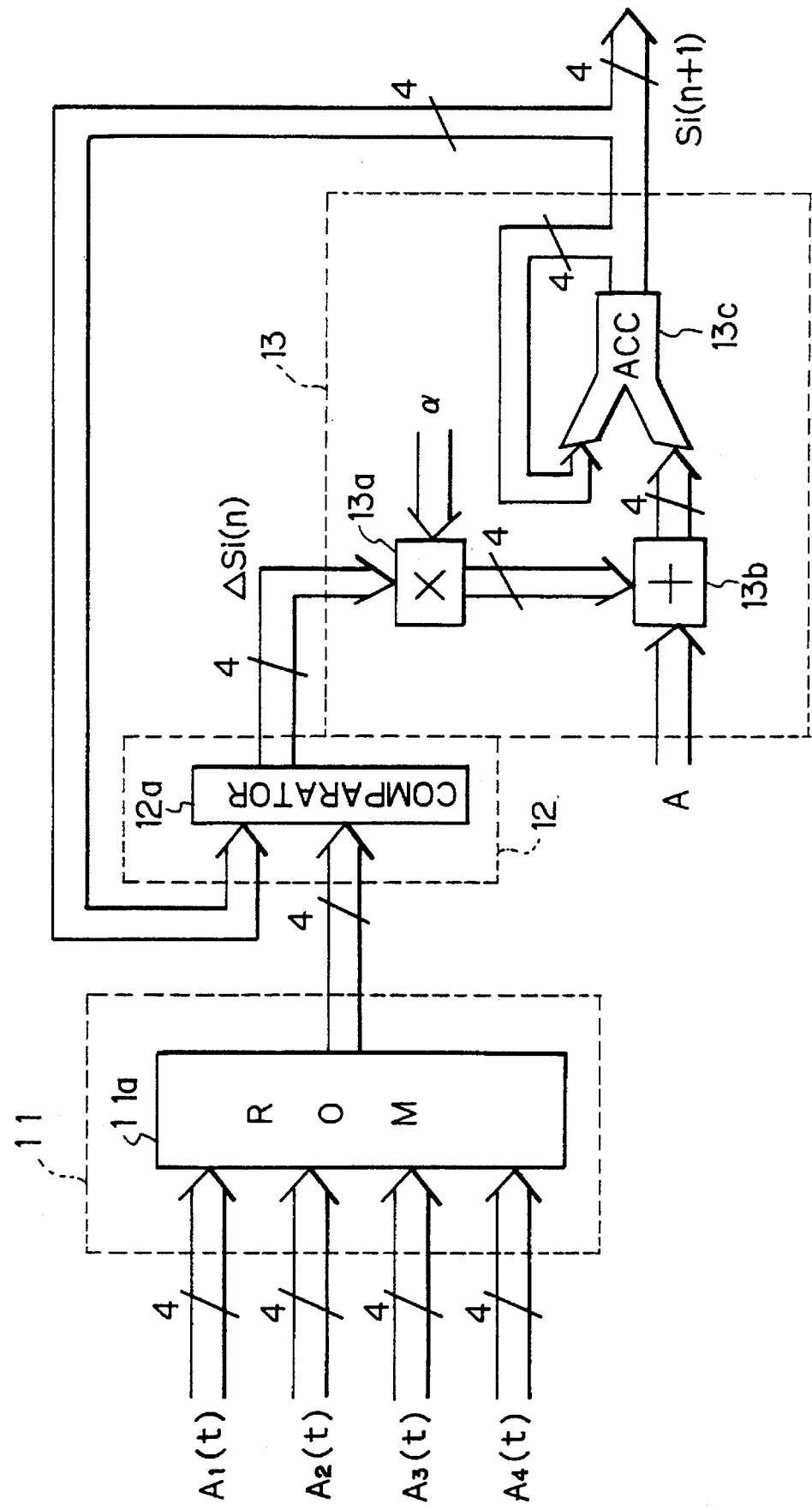
FIG. 17 is a block diagram showing an embodiment based on the system of FIG. 2.

FIG. 17 shows a more practical embodiment of the network control system of FIG. 2. In the figure, the same parts as those of FIG. 2 are represented with like numerals and their explanations will not be repeated. In FIG. 17, a read only memory (ROM) 11a receives, through address lines, 4-bit reference signals (controlled values such as frequency signals, timing signals, and reception power signals) from four adjacent nodes. The ROM 11a stores a table for providing an average of the address inputs of 4 bits×4 through four bits of an 8-bit data line.

A comparator 12a is, for example, a 4-bit digital subtracter. This comparator forms an error detection unit 12. The comparator 12a, which is the 4-bit digital subtracter, subtracts a 4-bit input value from another 4-bit input value and provides a 4-bit result.

A coefficient multiplier 13a, an adder 13b, and a controller 13c form a control unit 13. The coefficient multiplier 13a is, for example, a 4-bit digital multiplier, which multiplies a 4-bit input value by a 4-bit coefficient $\alpha$ ($0 < \alpha < 1$) and provides a 4-bit result.

The adder 13b is, for example, a 4-bit digital adder, which receives a 4-bit digital input, i.e., a synchronization object signal (a controlled value such as clock information and transmission power information) of its own node as well as a 4-bit output of the coefficient multiplier 13a, adds them to each other, and provides a 4-bit result. This adder 13b provides an initial value or an offset. If such initial value or offset is not needed, the adder 13b may be omitted.

The controller 13c comprises, for example, a 4-bit digital accumulator (ACC), which adds a 4-bit input value to a stored last output value and provides a 4-bit output. The output of the controller 13c is provided to the comparator 12a, used as a synchronization object signal for its own node, and transmitted as a reference signal to adjacent nodes through output means.

Operations of this embodiment will be explained. The ROM 11a receives reference signals from four adjacent nodes and provides a mean value of the four reference signals. The comparator 12a receives the mean value and subtracts it from an output value of the controller 13c. When a given node i and an adjacent node j have signal quantities Si(n) and Sj(n), respectively, at time n, an output error signal of the comparator 12a of the given node is expressed as follows:

$$\Delta Si(n)=\{_{j=1}\Sigma^N Sj(n)\}/N - Si(n) \quad (10)$$

where N is the total number of the input reference signals, which is equal to four in this embodiment. The first term of the right side of this equation indicates an output mean value of the ROM 11a.

The output error signal $\Delta Si(n)$ from the comparator 12a is multiplied by the coefficient $\alpha$ in the coefficient multiplier 13a, added to a synchronization object input signal A in the adder 13b, and added to the last signal in the controller 13c. As a result, the controller (ACC) 13c provides a signal Si(n+1), which is expressed as follows:

$$Si(n+1)=Si(n)+\alpha \cdot \Delta Si(n) \quad (n \geq)$$

$$Si(n+1)=Si(n)+\alpha \cdot \Delta Si(n)+A \quad (n=0) \quad (11)$$

Under a steady state, the signal value of the given node agrees with the mean value of the reference signals, so that $\Delta Si(n)=0$. Namely, the signal of the given node is unchanged. If the signal value of the given node is changed by some reason, or if the reference signals are changed, the signal value Si(n+1) is controlled to zero the $\Delta Si(n)$. In this way, each node synchronizes itself with adjacent nodes, and all nodes in the network are synchronized with one another.

If one of the four reference signals is abnormally large or small, the averaging operation, i.e., the spatial filtering operation of the ROM 11a, reduces the influence of the abnormality to one fourth so that the signal quantity to be synchronized as a controlled value may be stabilized.

The spatial filtering operation by the ROM 11a is not limited to the simple averaging operation. For example, a mean value may be calculated after excluding values that are greater (or smaller) than a threshold value.

Figure 18:
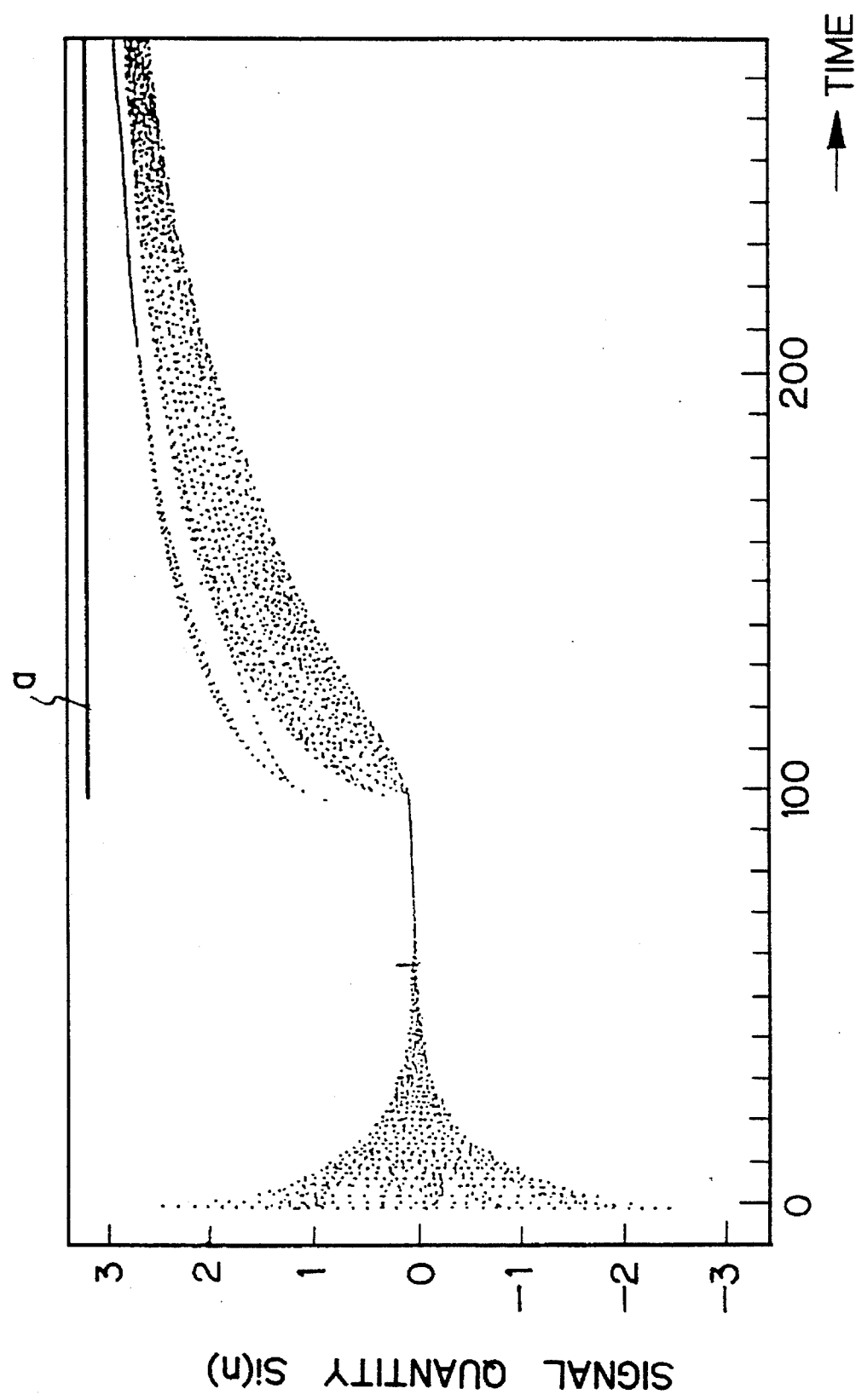
FIG. 18 relates to FIG. 17 and shows a result of simulation of characteristics of signal quantity to time according to a prior art.
Figure 19:
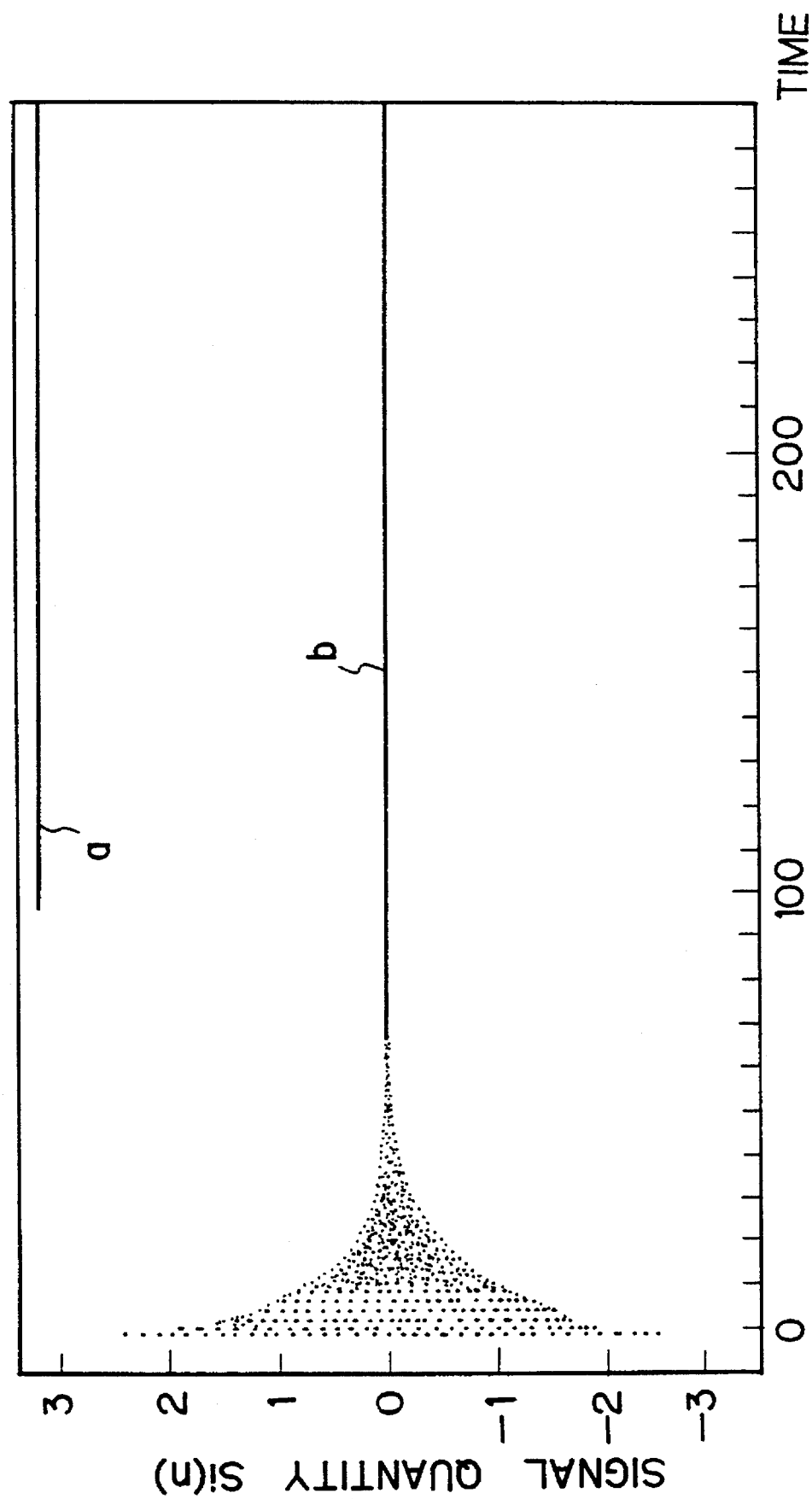
FIG. 19 is a view showing a result of simulation of characteristics of signal quantity to time according to FIG. 17.

FIGS. 18 and 19 show results of simulations of the first embodiment of FIG. 17. FIG. 18 shows a result of simulation of characteristics of signal quantity Si(n) versus, time with a simple averaging operation such as one shown in the embodiment being used as a spatial filtering operation. FIG. 19 shows characteristics of signal quantity versus time with a spatial filtering operation being carried out by averaging values after excluding those exceeding a threshold. In each figure, changes in signal quantity of all nodes (36 nodes) are plotted on the same graph.

In FIG. 18, if one reference signal changes to an abnormally great value at a certain time point, as indicated by "a", then a signal quantity as a synchronization object of each node gradually converges to a certain value. In FIG. 19, if one reference signal exceeds the threshold and is fixed at an abnormally great value, as indicated with by "a," this reference signal is excluded. As a result, this abnormality does not influence the other nodes.

The spatial filtering operation may be achieved by obtaining most frequent input values (medians), or by averaging values after excluding maximum and minimum values. These techniques also remove the influences of extreme values.

The above embodiment compares a spatially filtered result of input reference signals with a signal of its own node. It is also possible, as shown in FIG. 3, to compare input reference signals with a signal quantity of its own node to provide a plurality of error signals, and then spatially filter the error signals to provide the control unit 13 with a result of the spatial filtering.

In this case, the following spatially filtered result $\Delta Si(n)$ is obtained according to the equation (10):

$$\Delta Si(n)=\{_{j=1}\Sigma^N \Delta Sij(n)\}/N \quad (12)$$

$$\Delta Sij(n)=Sj(n)-Si(n) \quad (13)$$

Figure 20:
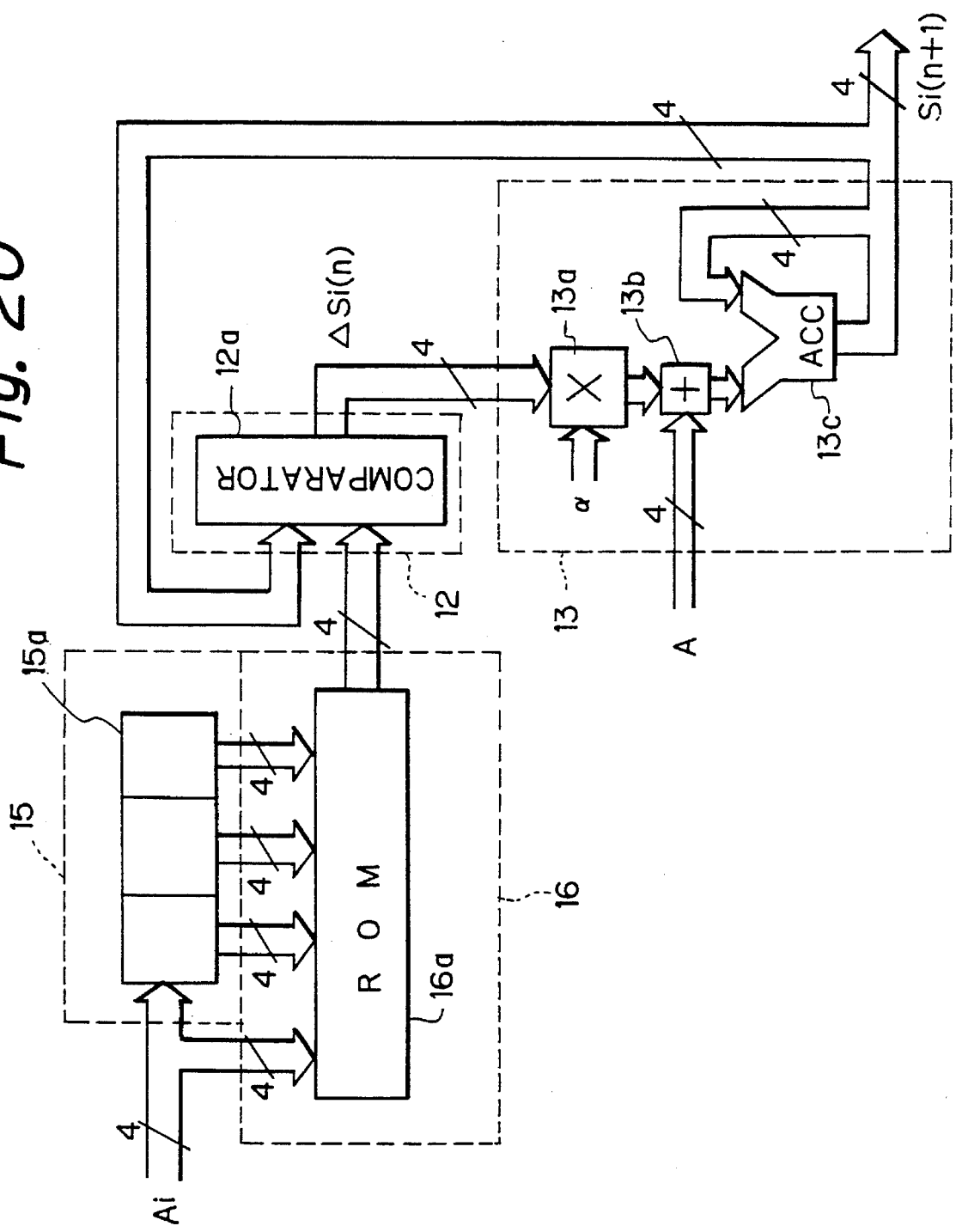
FIG. 20 is a block diagram showing an embodiment based on the system of FIG. 4.

FIG. 20 is a schematic view showing an embodiment of the network control system of FIG. 4 according to the invention. In the figure, the same parts as those of FIGS. 4 and 17 are represented with like numerals and their explanations will not be repeated. In FIG. 20, a 3-stage shift register 15a of 4-bit width forms a first storage unit 15. The shift register receives a 4-bit reference signal, shifts the signal to the right at each clock pulse, and stores the reference signal for the last three clock periods.

A ROM 16a forms a third operation unit 16. The ROM 16a stores a table, which provides a mean value of address inputs of 4 bits×4 through four bits of an 8-bit data line.

According to this embodiment, the shift register 15a shifts a reference signal provided by an adjacent node to the right at every clock pulse, and the reference signal is applied to a 4-bit address terminal of the ROM 16a. The other three 4-bit address terminals of the ROM 16a receive the reference signal sampled at the last three time points (the first, second, and third latest clock pulses) from the shift register 15a in parallel. The ROM 16a calculates a mean value (a moving average value) of the reference signal sampled at the four consecutive instants from the past to the present, and provides a comparator 12a with a result of the averaging. In this way, the ROM 16a temporally filters the reference signal and provides the comparator 12a with a result of the temporal filtering. The comparator 12a compares the result with an output signal Si(n) of a controller 13c and provides an error signal $\Delta Si(n)$ expressed as follows:

$$\Delta Si(n)=\{_{m=1}\Sigma^M Sj(n-m+1)\}/M - Si(n) \quad (14)$$

where M is a period (the number of instants) for which the moving average is calculated. In this embodiment, M is 4.

The error signal $\Delta Si(n)$ at time n is supplied as a control signal to a control unit 13 having the same arrangement as the control unit 13 of FIG. 17. The control unit 13 provides a signal Si(n+1) for the next time n+1 as follows:

$$Si(n+1)=Si(n)+\alpha \Delta Si(n)+A \quad (15)$$

This output signal is supplied to the comparator 12a, used as, for example, a clock for its own node, and transmitted as a reference signal to adjacent nodes. In the above equation (15), A is a synchronization object input signal.

Under a steady state of this embodiment, the signal value of a given node agrees with a moving average of reference signals of the node. In this case, $\Delta Si(n)=0$, so that the signal of the given node is unchanged. If the signal value of the given node is changed due to some reason, or if the reference signals are changed, the signal value $Si(n+1)$ of the given node is controlled to zero the error signal $\Delta Si(n)$. In this way, each node operates to synchronize itself with adjacent nodes, so that all nodes of the network synchronize with one another.

If reference signal values become abnormally large or small, the moving average operation suppresses the influence of the abnormality to one fourth, so that the signal quantity of a given node may gradually change.

Figure 21:
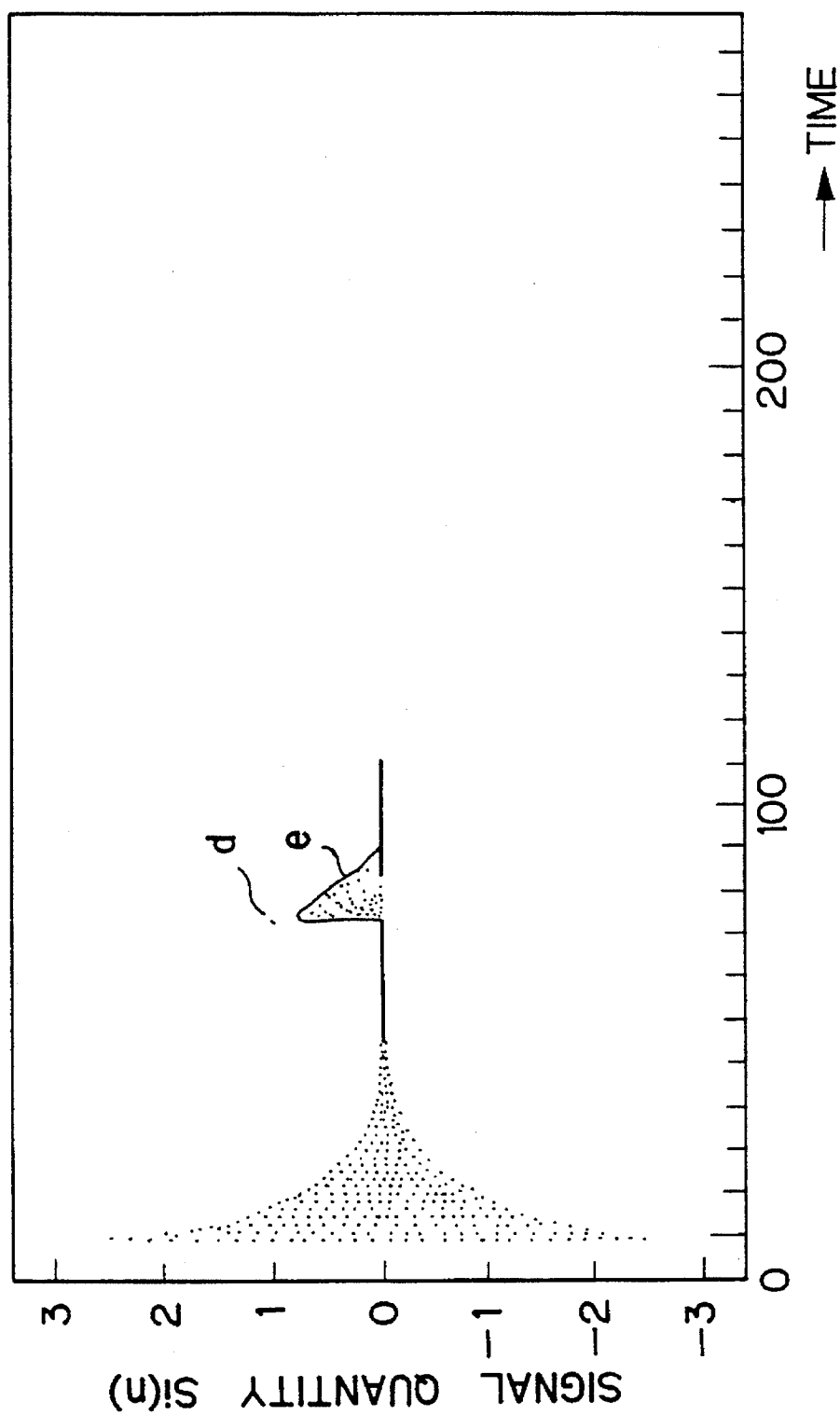
FIG. 21 is a view showing a result of simulation of a system with no time filter.
Figure 22:
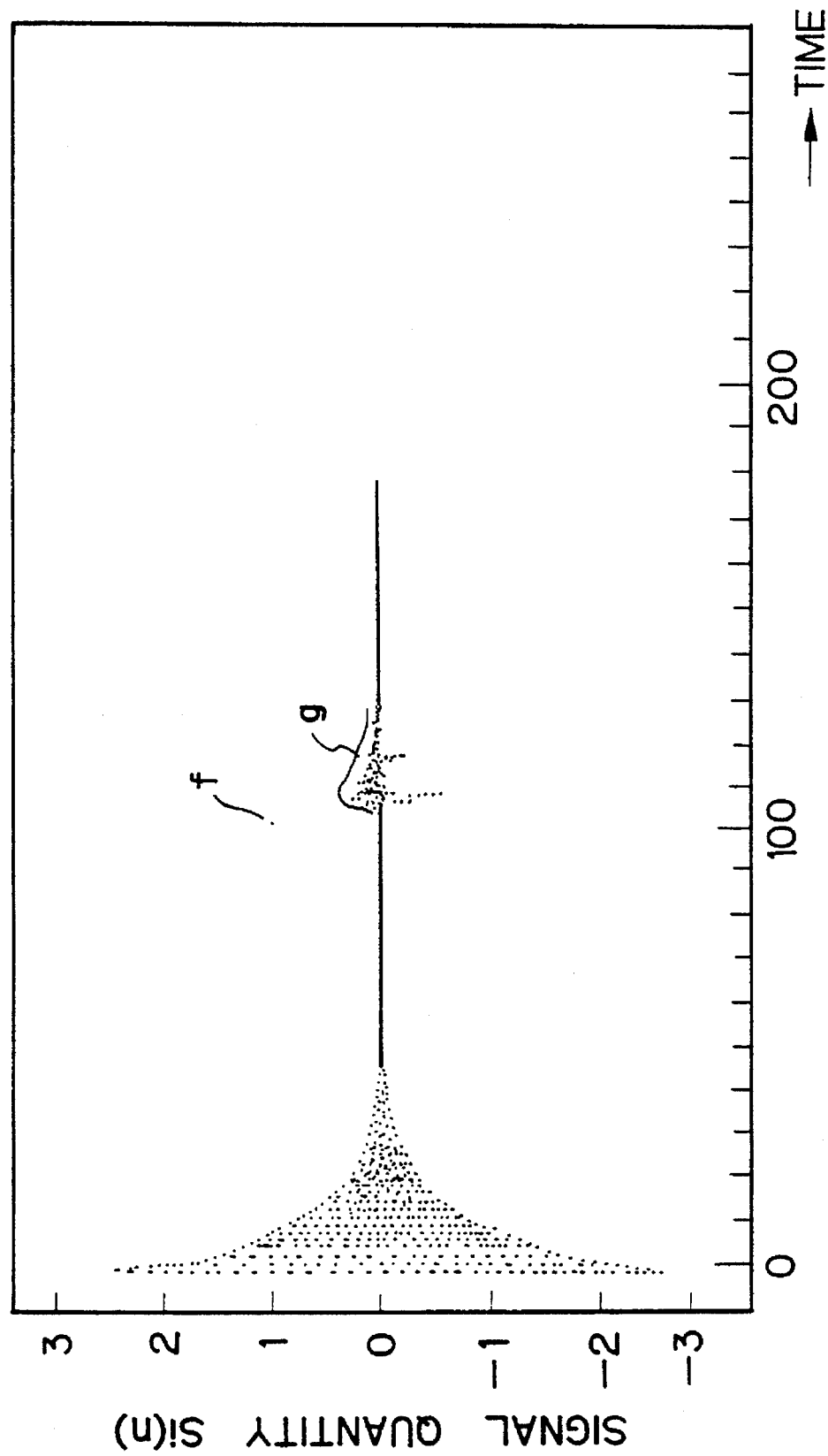
FIG. 22 is a view showing a result of simulation of characteristics of FIG. 20.

This will be explained in more detail with reference to FIGS. 21 and 22 involving 36 nodes and 3 reference signals. FIG. 21 shows characteristics of signal quantity versus time without temporal filtering (without the shift register 15a in the embodiment of FIG. 12). FIG. 22 shows characteristics of signal versus time with the arrangement of FIG. 20. Similar to FIGS. 18 and 19, each of FIGS. 21 and 22 plots changes in signal quantity of all nodes on the same graph.

In FIG. 21, the value of one reference signal abnormally increases as indicated by "d." Then, signal quantities of the other nodes slightly but steeply change in magnitude as indicated by "e" and then gradually converge to a fixed value. In FIG. 22, the signal quantities of the other nodes slightly and gradually change as indicated by "g" when the value of one reference signal abnormally increases as indicated by "f." In this way, the invention can achieve stable network synchronization control that is not affected by abnormal changes and disturbance in reference signals.

The above embodiment achieves a temporal filtering operation through a simple moving average. It is also possible to employ an interval averaging for a certain period, a weighted mean with a weight as a value corresponding to a time counted from the present moment, most frequent input values (medians), or averaging after excluding maximum and minimum values. When the weighted mean technique with a weight corresponding to a time counted from the present moment is employed, an inverse number of the time from the present moment, for example, is used as a weight. In this case, the older the value, the lesser the value influences a present controlled value, so that it may shorten a convergence time from an initial state to a steady (stabilized) state compared with using the simple moving average technique. When the medians or the averaging after excluding maximum and minimum values is used, sudden disturbance can be removed.

The above embodiment compares, in a given node, a temporally filtered result of input reference signal values stored at several time points from the present moment to the past with a signal of the node itself. As shown in FIG. 5, signal values stored at several instants may be compared with a signal quantity of the given node to provide a plurality of error signals, which are temporally filtered to provide a control input.

In this case, a result of the temporal filtering is expressed as follows according to the equation (14):

$$\Delta Si(n)=\{_{m=1}\Sigma^M \Delta Sij(n-m+1)\}/M \tag{16}$$

$$\Delta Sij(n)=Sj(n)-Si(n) \tag{17}$$

Figure 23:
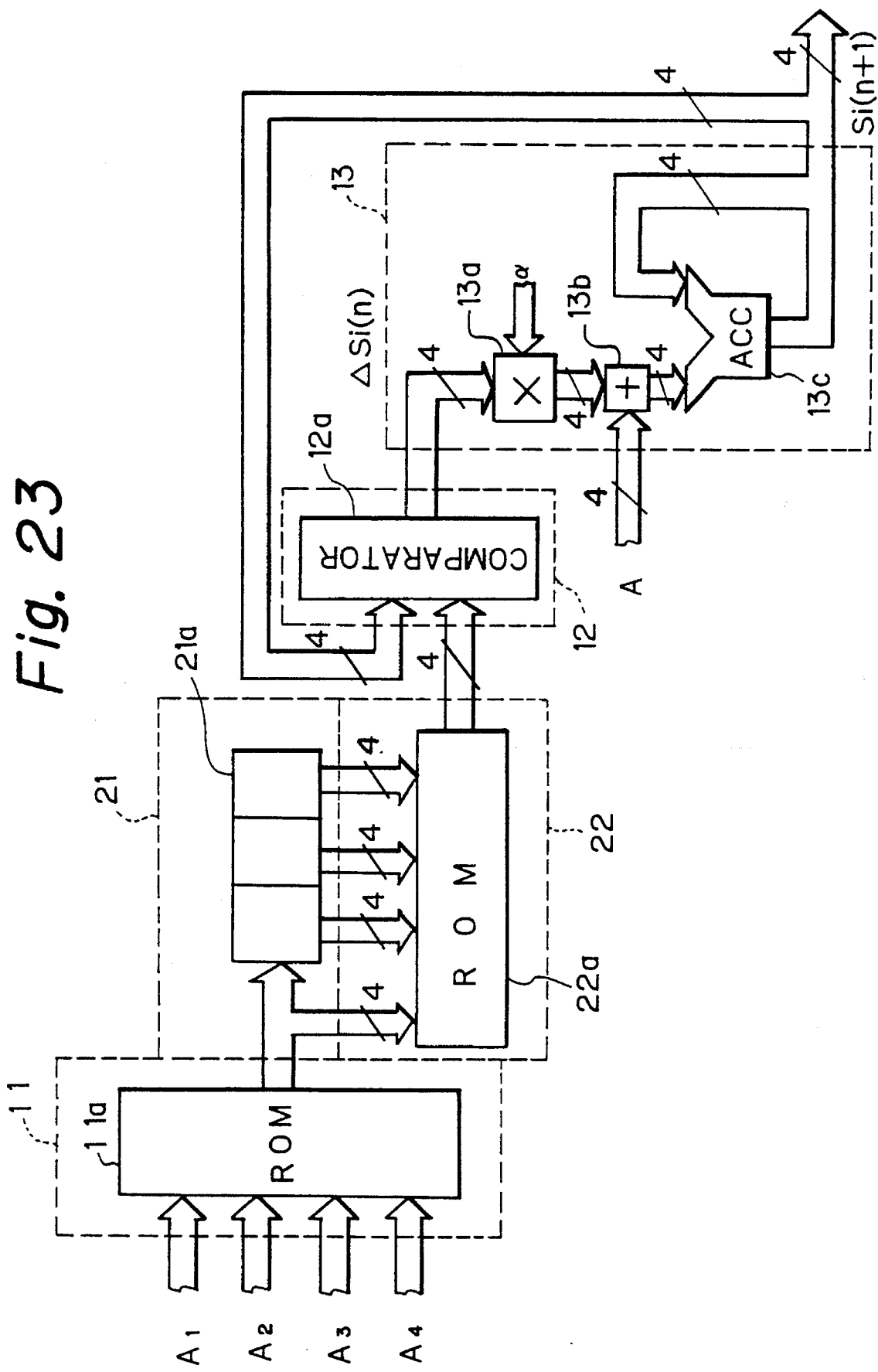
FIG. 23 is a block diagram showing an embodiment based on the system of FIG. 6.

FIG. 23 is a more practical embodiment of the system of FIG. 6 according to the invention. In the figure, the same parts as those shown in FIGS. 6 and 17 are represented with like reference marks and their explanations will not be repeated. In FIG. 23, a 3-stage shift register 21a of 4-bit width forms a third storage unit 21. The structure of the shift register 21a is the same as that of the shift register 15a. A ROM 22a forms a fifth operation unit 22 and has the same structure as the ROM 16a. The ROM 22a stores data in advance to convert inputs of 4 bits×4 provided through address lines into an output signal through four bits of an 8-bit data line.

An operation of this embodiment will be explained. A ROM 11a provides the shift register 21a with a mean value of four reference signals. The mean value is shifted to the right at each clock pulse in the shift register 21a and supplied to one of 4-bit address terminals of the ROM 22a. Each of the other three 4-bit address terminals of the ROM 22 receives a corresponding one of the three past reference signal mean values provided by the shift register 21a in parallel. The ROM 22a calculates a moving average of the mean values at consecutive four instants of the reference signal from the present moment to the past, and supplies the moving average to the comparator 12a. Namely, the ROM 22a temporally filters the spatially filtered reference signals and provides the comparator 12a with a result thereof.

The comparator 12a provides an error signal $\Delta Si(n)$ according to a difference between the operation result provided by the ROM 22a and an output signal of its own node. The error signal $\Delta Si(n)$ is expressed as follows:

$$\Delta Si(n)=[_{m=1}\Sigma^M\{_{j=1}\Sigma^N Sj(n-m+1)\}/N]/M-Si(n) \tag{18}$$

This error signal $\Delta Si(n)$ is supplied as a control signal to the control unit 13, which provides the signal $Si(n+1)$ according to the equations (11) and (15).

Similar to the previous embodiment, this embodiment makes the error signal $\Delta Si(n)$ to be zero when the reference signals are changed, to thereby synchronize the nodes of the network with one another. When an abnormally large or small reference signal is provided, the spatial filtering operation of the embodiment suppresses a total change due to the abnormal signal to one fourth, and the temporal filtering operation suppresses a changing ratio due to the influence of the abnormal signal to one fourth.

The spatial filtering operation may be realized not only by the simple averaging but also by the various techniques mentioned before. Also, the temporal filtering operation may be realized not only by the simple moving averaging but also by the various techniques mentioned before. Order of the spatial filtering and temporal filtering is not limited to that of the third embodiment. As shown in FIG. 7, reference signals may be temporally filtered at first and then spatially filtered.

As shown in FIG. 8, reference signal values may be compared with the signal quantity of a given node to provide a plurality of error signals, which are then spatially and temporally filtered to provide a control input $\Delta Si(n)$. In this case, $\Delta Si(n)$ is expressed as follows according to the equation (18):

$$\Delta Si(n)=[_{m=1}\Sigma^M\{_{j=1}\Sigma^N Sij(n-m+1)\}/N]/M \tag{19}$$

where, $$\Delta Sij(n)=Sj(n)-Si(n) \tag{20}$$

As shown in FIG. 9, the error signals may be spatially filtered at first and then temporally filtered.

The embodiments mentioned above are applicable for each base radio station of a mobile communication system, to synchronize clock, frequency, and transmission power of the mobile communication network as a whole. These embodiments are particularly effective for a mobile communication network which involves very narrow radio zones and a large number of base radio stations.

Figure 24:
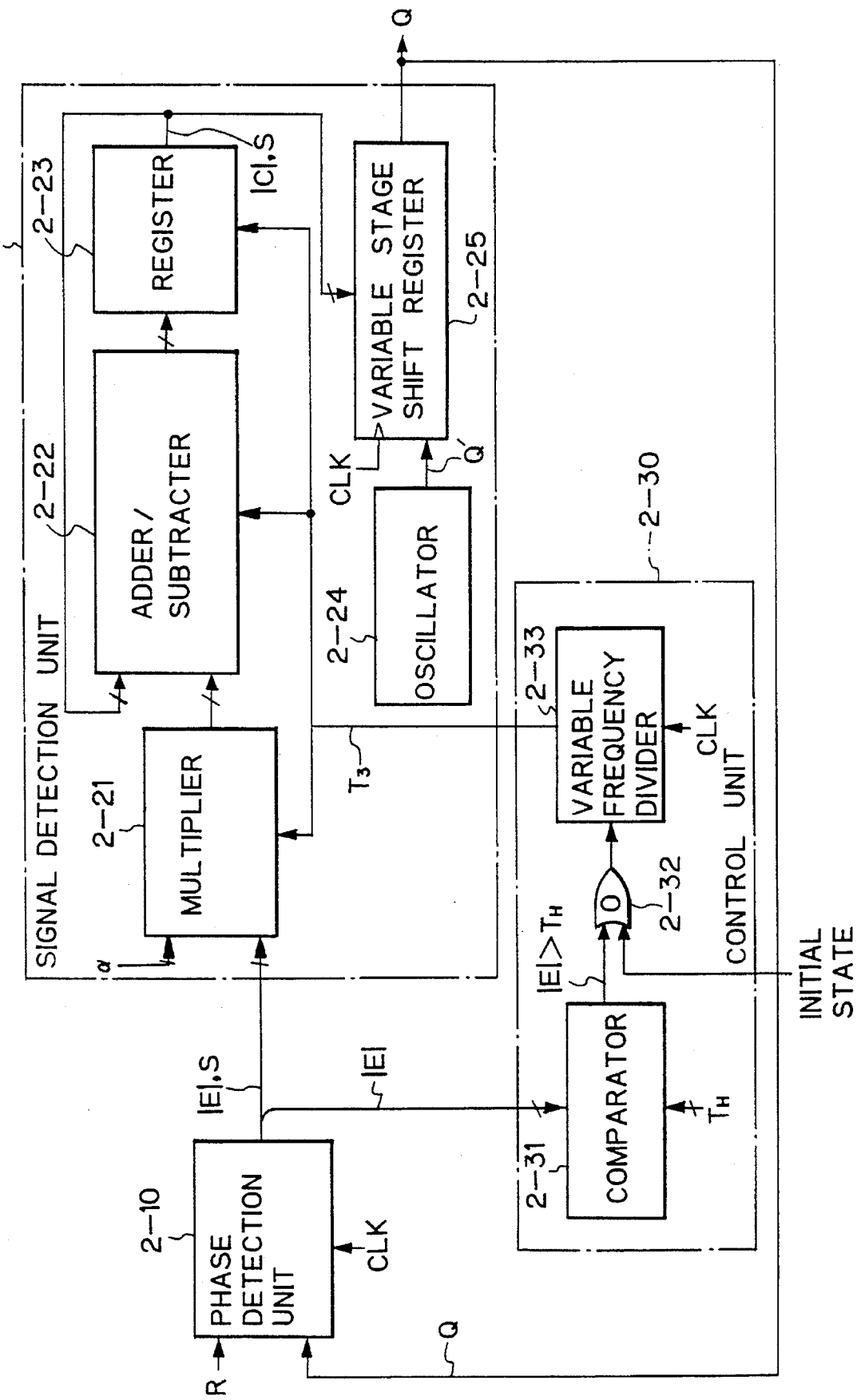
FIG. 24 is a block diagram showing an embodiment based on the system of FIG. 10.

FIG. 24 is a schematic view showing a more practical embodiment of the network control system of FIG. 10 according to the invention. In the figure, numeral 2-10 denotes a phase detection unit (corresponding to 2-1 of FIG. 10), 2-20 a signal generation unit (corresponding to 2-2 of FIG. 10), 2-21 a multiplier, 2-22 an adder/subtracter, 2-23 a register, 2-24 an oscillator, 2-25 a variable stage shift register that can change the number of stages between an input and an output according to a control signal, 2-30 a control unit (corresponding to 2-3 of FIG. 10), 2-31 a comparator, 2-32 an OR gate circuit (O), and 2-33 a variable frequency divider.

The phase detection unit 2-10 detects a phase difference between a clock signal Q serving as a controlled value of its own node and a clock signal R serving as a controlled value from another node, and provides an absolute signal value |E| and a sign S of the phase difference. The signal generation unit 2-20 is activated (in response to a timing signal $T_3$) by the control unit 2-30, to control the phase of the clock signal Q according to the phase differential signal |E| and sign S in a way to minimize the phase difference signal |E|. This will be explained in more detail. The multiplier 2-21 multiplies the phase difference signal |E| and sign S by a predetermined value α (0 to 1) to maintain a loop gain of the system to be less than 1. The adder/subtracter 2-22 adds the phase difference α|E| and sign S to an accumulated phase difference (a control signal |C| and sign S) of the register 2-23, thereby updating the control signal |C| with sign S. The oscillator 2-24 generates a clock signal Q' having the same frequency as that of the clock signal R. The variable stage shift register 2-25 receives the clock signal Q' and advances or delays the phase of the output clock signal Q according to the control signal |C| with sign S.

Under this state, the control unit 2-30 changes intervals of activation of the signal generation unit 2-20 when the system is initialized or depending on the magnitude of the phase difference signal |E| with sign S. For example, when the system is initialized or when the comparator 2-31 determines that the phase difference signal |E| is greater than a predetermined value $T_H$, the control unit 2-30 reduces the frequency dividing ratio of the variable frequency divider 2-33, to thereby shorten intervals of the timing signal $T_3$ and promote convergence to the signal R. In other cases, the control unit 2-30 increases the frequency dividing ratio of the variable frequency divider 2-33, to elongate intervals of the timing signal $T_3$, thereby removing the influence of disturbance, etc.

Figure 25:
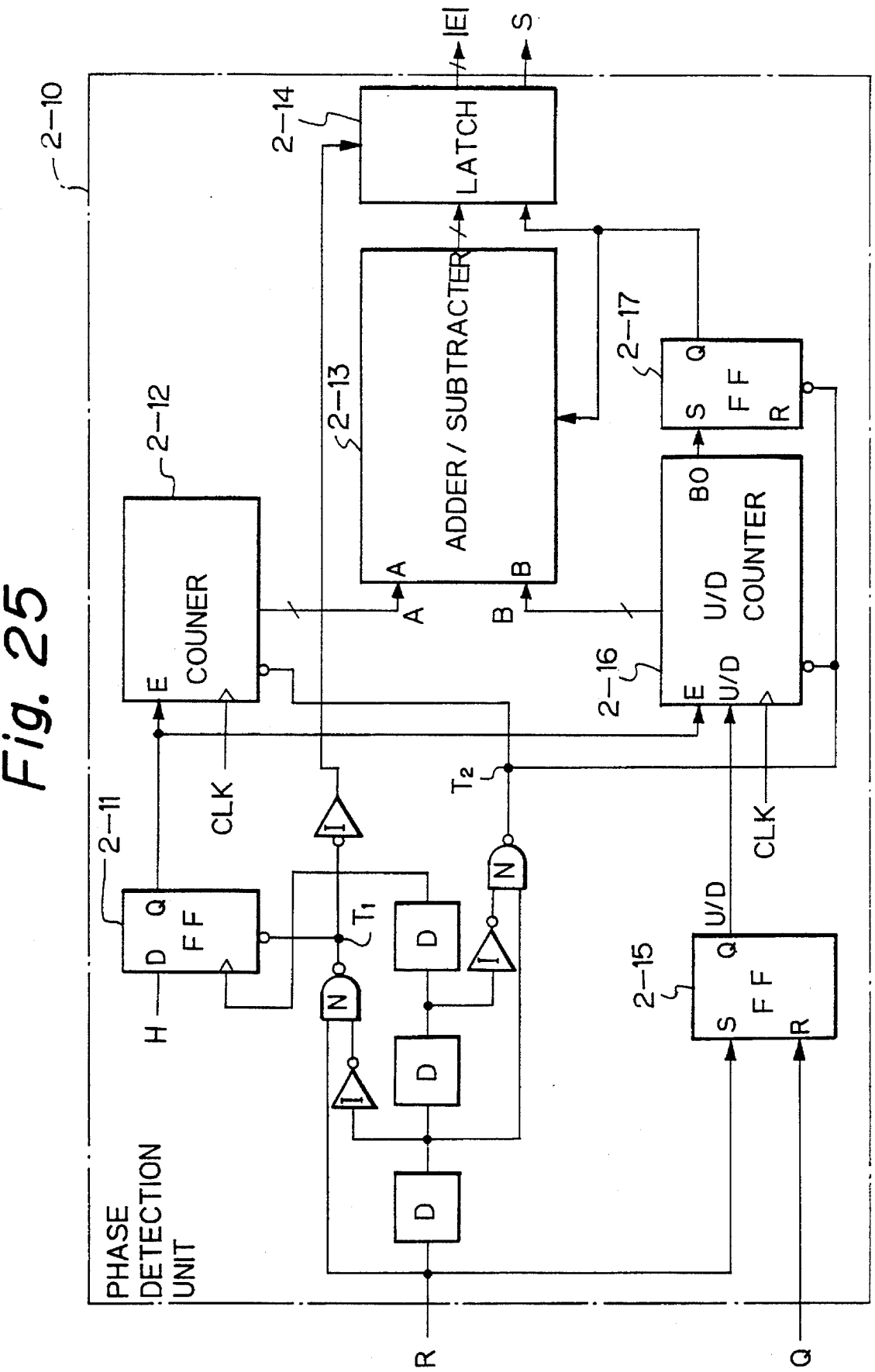
FIG. 25 is a block diagram showing a phase detection unit according to an embodiment of the invention.

FIG. 25 is a block diagram of the phase detection unit of the embodiment mentioned above. In the figure, numeral 2-10 denotes the phase detection unit (corresponding to 2-1 of FIGS. 7 to 9), 2-11 a D-type flip-flop (FF), 2-12 a counter, 2-13 an adder/subtracter, 2-14 a latch, 2-15 a set/reset flip-flop (FF), 2-16 an up/down counter (U/D counter), 2-17 a set/reset flip-flop (FF), D a delay circuit, I an inverter circuit, and N a NAND circuit.

Figure 26:
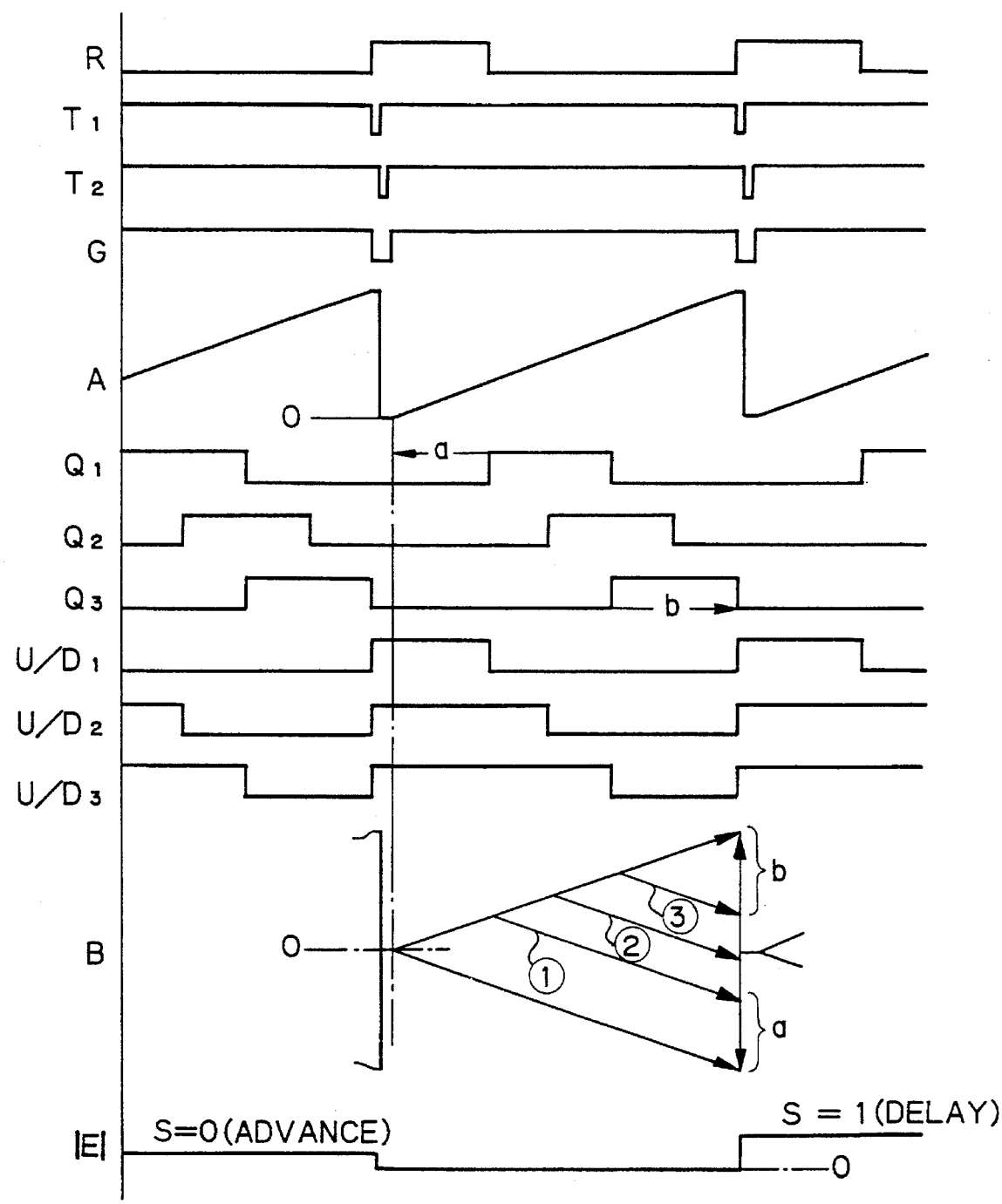
FIG. 26 is a timing chart showing operations of the phase detection unit of FIG. 25.

FIG. 26 is a timing chart showing operations of the phase detection unit. The operations of the phase detection unit will be explained with reference to FIGS. 25 and 26. A clock signal R is provided by another node. At each rise of the clock signal R, a series of timing signals $T_1$ and $T_2$ are generated. A gate signal G from an output of the flip-flop 2-11 is reset in response to the timing signal $T_1$ and set in response to a rise of the last delay circuit D. While the gate signal G is being at level HIGH, the counter 2-12 counts up a high-frequency clock signal CLK. This state is indicated as a count signal A.

Set and reset terminals of the flip-flop 2-15 receive the signals R and Q, respectively. Signals $Q_1$ to $Q_3$ show typical three phase states of the clock signal Q relative to the clock signal R. The signal $Q_1$ shows a phase delay, the signal $Q_2$ an intermediate state, and the signal $Q_3$ an advance in a phase b. The signal $Q_1$ is controlled to be pulled in the direction of an arrow mark a, and the signal $Q_3$ is controlled to be pulled in the direction of an arrow mark b. The signal $Q_2$ may be pulled in any direction.

With respect to the signals $Q_1$ to $Q_3$, the flip-flop 2-15 provides the up/down counter 2-16 with up/down control signals $U/D_1$ to $U/D_3$. The up/down counter 2-16 is activated in response to the gate signal G. The up/down counter 2-16 counts up the clock signal CLK while the up/down control signal is at level HIGH, and counts down the clock signal CLK while the up/down control signal is at level LOW. Accordingly, a count signal B corresponding to the up/down control signals $U/D_1$ to $U/D_3$ for the up/down counter 2-16 passes through routes (1) to (3). In the routes (1) and (2), the count signal B may change from 0 to −1 at a certain point. At this time, the up/down counter 2-16 provides a borrow signal BO, which is stored in the flip-flop 2-17 to provide a sign S for a phase difference signal |E|.

For the routes (1) and (2), the adder/subtracter 2-13 calculates (A+B) and sets a phase difference signal |a|=|A+B| and a sign S=HIGH (delayed phase) in the latch 2-14. For the route (3), the adder/subtracter 2-13 calculates (A-B) and sets a differential signal |b|=|A-B| and a sign S=LOW (advanced phase) in the latch 2-14.

Figure 27:
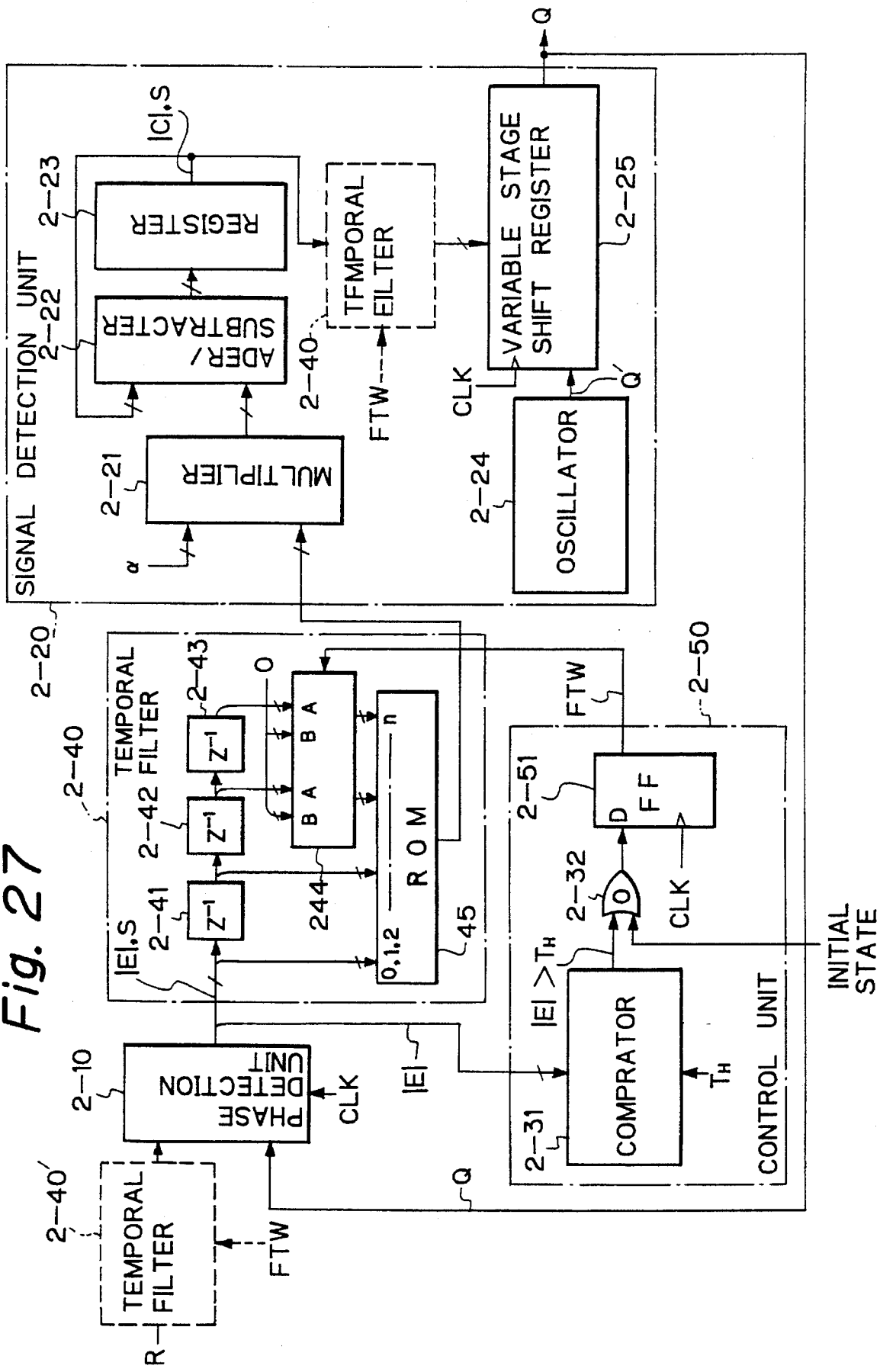
FIG. 27 is a block diagram showing an embodiment based on the system of FIG. 11.

FIG. 27 is a schematic view showing an embodiment of the network control system of FIG. 11 according to the invention. In the figure, numeral 2-40 denotes a temporal filter (corresponding to 2-4 of FIG. 11), 2-41 to 2-43 shift registers ($Z^{-1}$) for sequentially shifting a phase difference signal |E|, 2-44 a selector for selecting outputs of the shift registers 2-42 and 2-43 or data "0," 2-45 a ROM for providing an additive mean of address inputs 0 to n, 2-51 a D-type flip-flop (FF), and 2-40' an analog temporal filter.

The phase detection unit 2-10 detects a phase difference between a clock signal Q of its own node and a clock signal R from another node and provides an absolute phase difference signal |E| with a sign S. A signal generation unit 2-20 controls the phase of the control signal Q according to the phase difference signal |E| with sign S in a way to minimize the phase difference signal |E|.

At this time, the temporal filter 2-40' or 2-40 temporally filters (finds out a moving average of) the signal R provided by another node, the phase difference signal |E| with sign S, or a control signal |C| with sign S prepared for the signal generation unit 2-20 from the phase difference signal. Under this state, the control unit 2-50 changes the filtering time width of the temporal filter 2-40' or 2-40 when the system is initialized or depending on the magnitude of the phase difference signal |E|.

More precisely, when the system is initialized or when the comparator 2-31 determines that the phase difference signal |E| is greater than a predetermined value $T_H$, the flip-flop 2-51 is set, and an output signal FTW of the flip-flop 2-51 connects input terminals of the selector 2-44 to the B side. As a result, a data width for providing a moving average is narrowed to quicken response of the temporal filter 2-40, thereby speeding up convergence to the signal R. In other cases, the flip-flop 2-51 is reset, and the output signal FTW thereof connects the input terminals of the selector 2-44 to the A side. As a result, the data width for providing a moving average is widened to slow the response of the temporal filter 2-40, thereby eliminating the influence of disturbance, etc.

Figure 28:
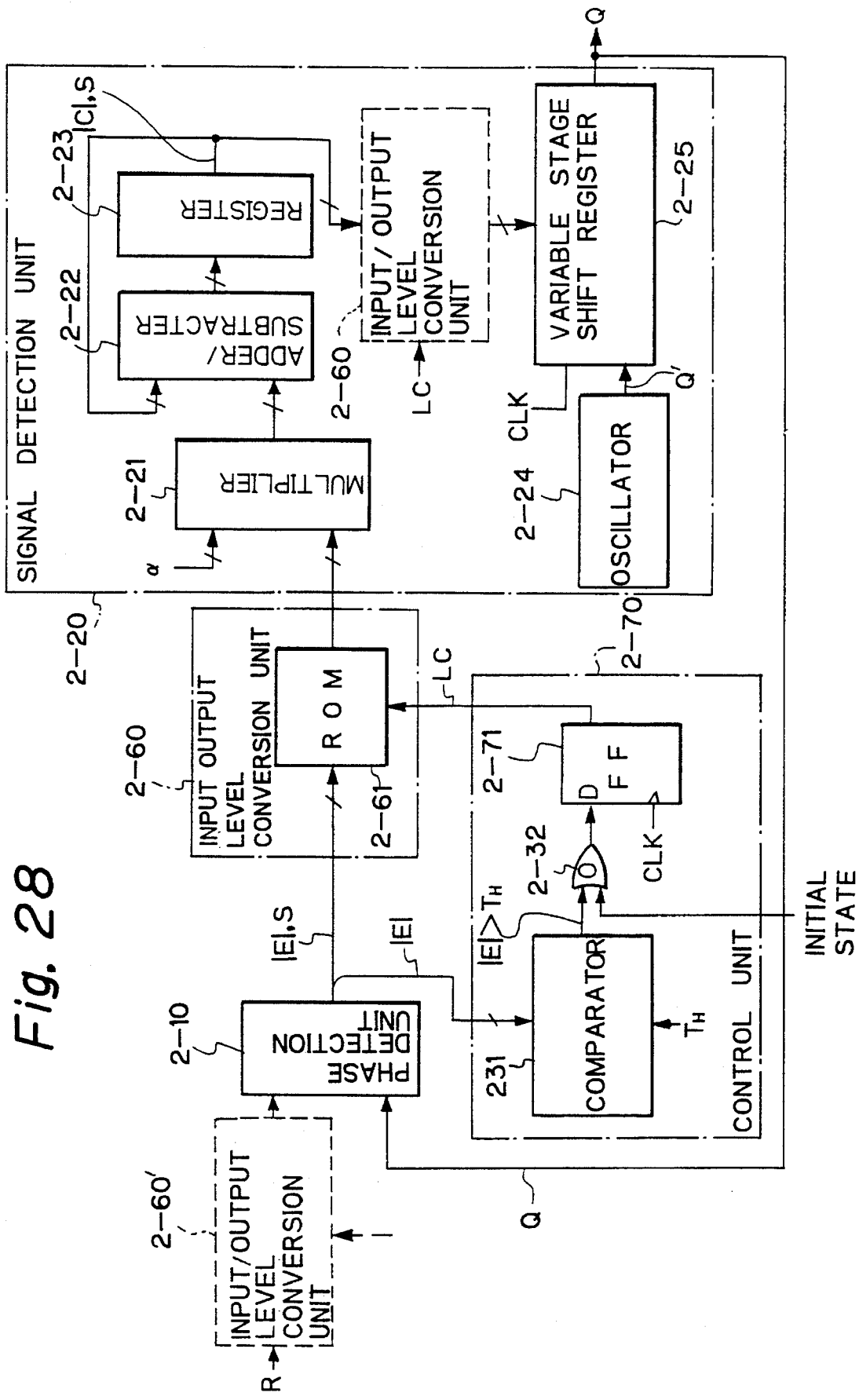
FIG. 28 is a block diagram showing an embodiment based on the system of FIG. 12.

FIG. 28 is a schematic view showing a more practical embodiment of the network control system of FIG. 12 according to the invention. In the figure, numeral 2-60 denotes an input/output level conversion unit (corresponding to 2-6 of FIG. 12), 2-61 a ROM for storing a plurality of level conversion characteristics, 2-70 a control unit, 2-71 a D-type flip-flop (FF), and 2-60' an analog input/output level conversion unit.

A phase detection unit 2-10 detects a phase difference between a clock signal Q of its own node and a clock signal R from another node and provides an absolute signal value |E| with sign S of the phase difference. A signal generation unit 2-20 controls the clock signal Q according to the phase difference signal |E| with sign S in a way to reduce the phase difference signal |E|.

At this moment, the input/output level conversion unit 2-60' or 2-60 converts the input/output level of the signal R from another node, of the phase difference signal |E| with sign S, or of a control signal |C| with sign S prepared for the signal generation unit 2-20 from the phase difference signal. The control unit 2-70 changes the level converting characteristics of the input/output level conversion unit 2-60 or 2-60 when the system is initialized or depending on the magnitude of the phase difference signal |E|.

More precisely, when the system is initialized or when a comparator 2-31 determines that the phase difference signal |E| is greater than a predetermined value $T_H$, the flip-flop 2-71 is set, and an output signal LC thereof selects one of the characteristics (for example, coarse quantization characteristics, or linear quantization characteristics, etc.,) stored in the ROM 2-61. As a result, an input/output dynamic quantization range is widened or linearized, to promote convergence to the signal R. In other cases, the flip-flop 2-71 is reset, and the output signal LC thereof selects another characteristics (for example, nonlinear quantization characteristics that improves quantization accuracy around an input level of 0) stored in the ROM 2-61, thereby improving the quantization accuracy around an input level of 0 and increasing convergence accuracy.

This embodiment is applicable not only for phase synchronization of a clock signal but also for the magnitude synchronization of various signal parameters, control parameters, etc.

Figure 29:
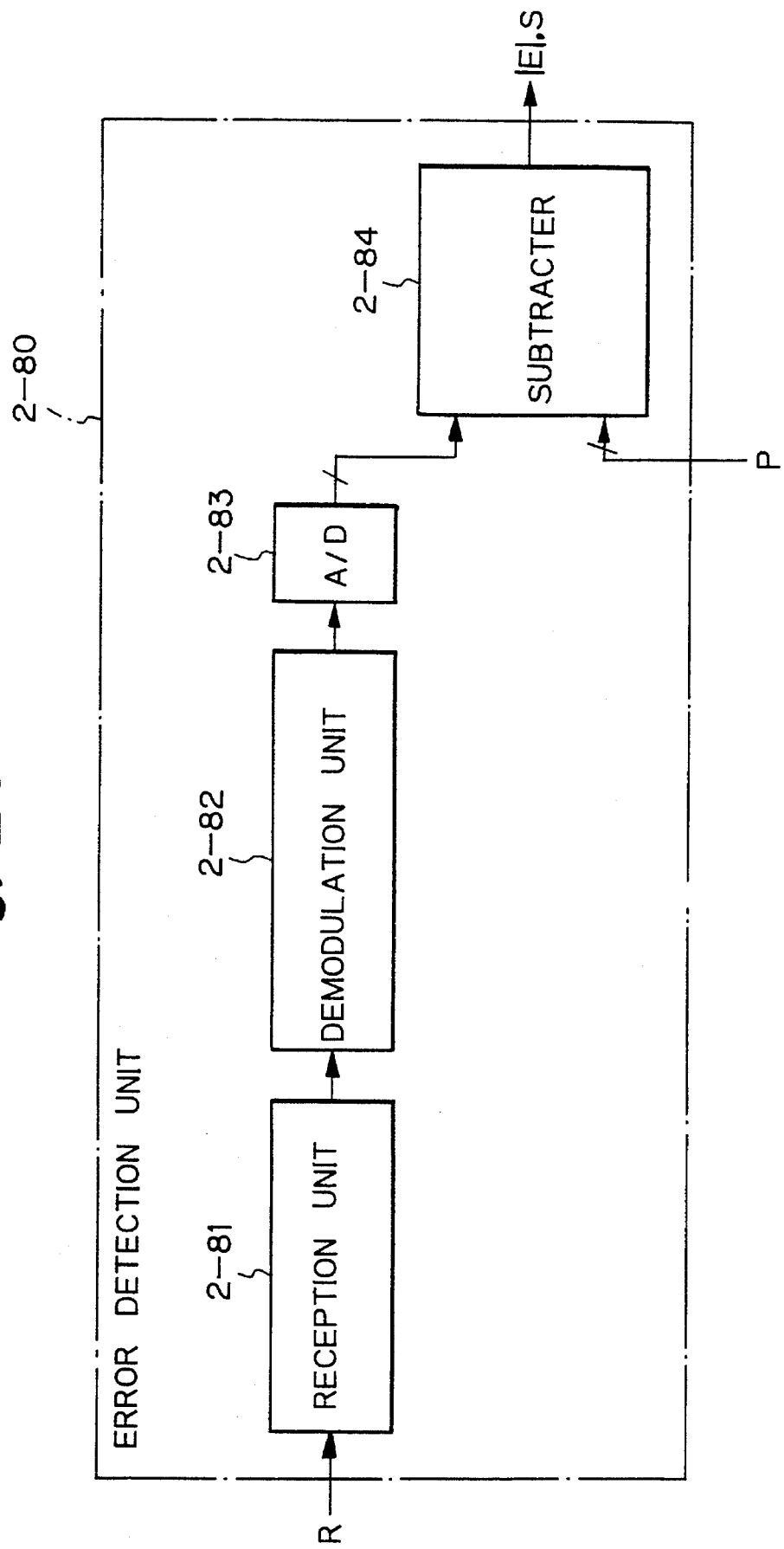
FIG. 29 is a block diagram showing an error detection unit according to an embodiment of the invention.

FIG. 29 is a block diagram showing an error detection unit of the embodiment mentioned above. In the figure, numeral 2-80 denotes the error detection unit (corresponding to 2-1 of FIGS. 10 to 12), 2-81 a reception unit, 2-82 a demodulation unit, 2-83 an A/D conversion unit, and 2-84 a subtracter.

A signal R provided by another node may be an amplitude modulated signal with predetermined signal parameters. The reception unit 2-81 receives the modulated signal, and the demodulation unit 2-82 demodulates an amplitude among the signal parameters. The A/D converter 2-83 converts the demodulated signal into a digital signal. The subtracter 2-84 provides a differential signal indicating an amplitude difference between the output of the A/D converter 2-83 and a signal parameter P of its own node, thereby synchronizing the signal parameter, similar to the previous case.

In this case, the signal generation unit 2-20 may control the amplitude of the signal parameter P of its own node according to the error signal |E| with sign S in a way to reduce the error signal |E|.

In the above embodiment, the stage variable shift register 2-25 shifts the phase of the clock signal Q'. It is possible to directly control the oscillation frequency of the oscillator 2-24 according to the control signal |C| with sign S.

In the above embodiment, the comparator 2-31 determines whether or not the differential signal |E| is greater than a predetermined value $T_H$. It is possible to arrange a plurality of threshold values $T_{Hi}$ to determine the magnitude of the differential signal |E| in multiple steps, to thereby control a controlled value in multiple steps.

In the above embodiment, only one signal R is provided by another node. It is possible to mutually and simultaneously synchronize a plurality of nodes with one another. In this case, a plurality of signals R are averaged, and the averaged signal is provided to the detection unit. Alternatively, differential signals $E_i$ between signals $R_i$ from a plurality of nodes and a signal Q of a given node are prepared, and the differential signals are averaged to provide a differential signal E.

The loop gain α may be changed when the system is initialized or depending on the magnitude of the differential signal E.

The above embodiment uses the temporal filter 2-40. It is possible to prepare a high pass filter, a notch filter, a band-pass filter, etc., to change filter characteristics from one to another.

Embodiments of averaging in frequency control (FIGS. 30A to 38)

An embodiment of the spatial averaging (filtering) carried out by the averaging unit 3-5 of FIG. 13 will be explained. This embodiment employs $g_{1i}$ to $g_{6i}$ for substituting for $\Delta f_i(t)$ in the second term of the right side of the equation (7), to control $f_i(t+1)$.

(1) The simplest averaging is arithmetic averaging, which will be expressed as follows according to the equation (5):

$$g_{1i}(t) = \Delta f_i(t) \tag{21}$$
$$= \left[ \sum_{j=1}^{N} \{(f_i'(t) + f_{sij}) - f_j'(t)\} \right] / N$$
$$= \left\{ \sum_{j=1}^{N} \Delta f_{ij}(t) \right\} / N$$

where $\Delta f_{ij}(t)$ is a relative frequency error between a frequency $f_i'(t)$ of an "i"th base station and a frequency $f_j'(t)$ of a "j"th base station adjacent to the "i"th base station and expressed as follows:

$$\Delta f_{ij}(t) = (f_i'(t) + f_{sij}) - f_j'(t) \tag{22}$$

(2) In the arithmetic averaging of the equation (21), the maximum and minimum values of $\Delta f_{ij}(t)$ may be excluded from the equation (21) to achieve the following averaging:

$$g_{2i}(t) = [\sum_{k=1}^{N-2} \Delta f_{ik}(t)]/(N-2) \tag{23}$$

where N must be equal to or larger than 3, and k indicates the number "N-2" of base stations that is obtained after excluding the maximum and minimum values from j=1,2, ..., N.

(3) In addition to detecting the $\Delta f_{ij}(t)$, a unit (not shown) for detecting C/N (carrier power/noise power) or S/N (signal/noise) may be arranged to detect the C/N of each adjacent base station. In this case, each frequency error $\Delta f_{ij}(t)$ is weighted while C/N=$_{ij}$, to obtain a weighted mean value:

$$g_{3i}(t)=[\{_{j=1}\Sigma^N{}_{\gamma j}(t)\cdot\Delta f_{ij}(t)\}/\{_{j=1}\Sigma^N{}_{\gamma j}(t)\}]/N \quad (24)$$

(4) A combination of the mean values $g_{2i}$ and $g_{3i}$ will provide the following mean value:

$$g_{4i}(t)=[\{_{k=1}\Sigma^{N-2}{}_{\gamma k}(t)\cdot\Delta f_{ik}(t)\}/\{_{k=1}\Sigma^{N-2}{}_{\gamma k}(t)\}]/(N-2) \quad (25)$$

(5) The ratio $C/N=_{\gamma ij}$ may have a threshold $_{65\,th}$ to exclude $\Delta f_{ij}(t)$ from averaging when $_{\gamma ij\gamma th}$:

$$g_{5i}(t)=\{_{l=1}\Sigma^{N'}\Delta f_{il}(t)\}/N' \quad (26)$$

This is used as a mean value. In this case, $_{l=1}\Sigma^{N'}$ means to accumulate N' pieces of $\Delta f_{il}(t)$ that satisfy $_{\gamma l}>_{\gamma th}$.

(6) A combination of the mean values $g_{3i}$ and $g_{5i}$ provides the following mean value:

$$g_{6i}(t)=[\{_{l=1}\Sigma^{N'}{}_{\gamma l}(t)\cdot\Delta f_{il}(t)\}/\{_{l-1}\Sigma^{N'}{}_{\gamma l}(t)\}]/N' \quad (27)$$

Figure 30A:
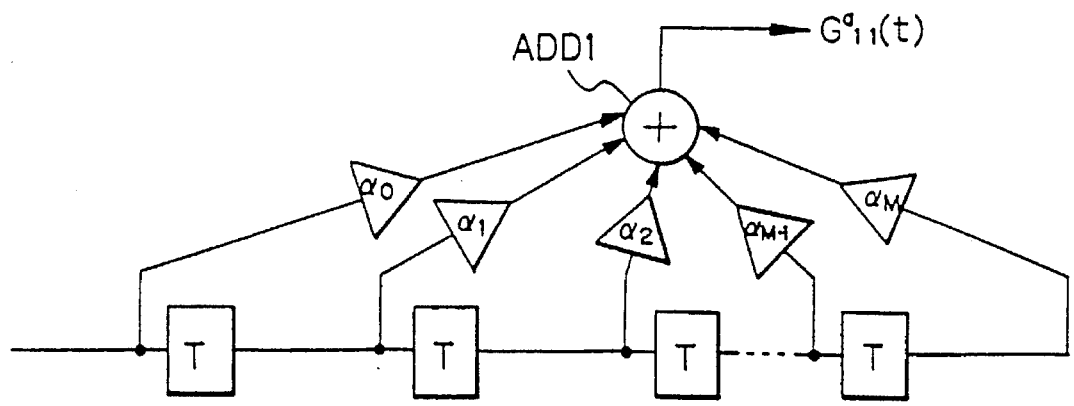
FIG. 30A to FIG. 30C are views showing a time averaging operation carried out by an averaging unit according to an embodiment of the invention.
Figure 30B:
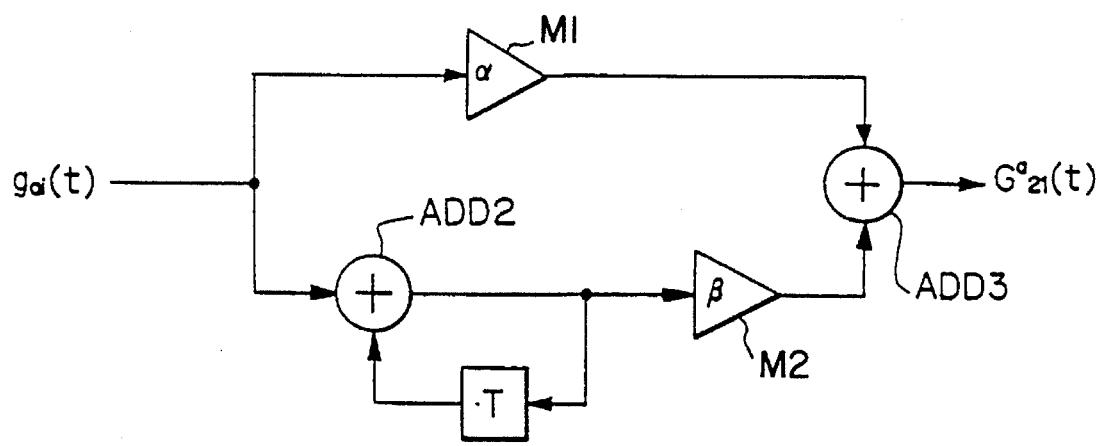
Figure 30C:
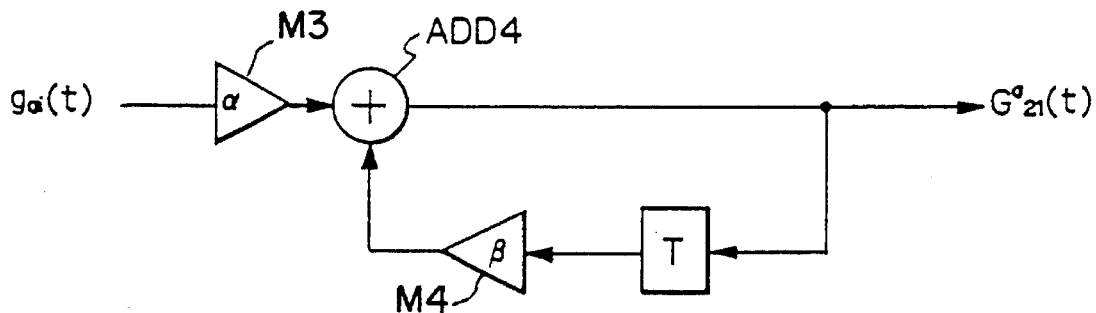

FIGS. 30A to 30C show an embodiment of a temporal averaging (filtering) operation that is carried out as and when required, after a spatial averaging operation by the averaging unit 2-5 mentioned above. This embodiment employs $G^a{}_{ki}(t)$ (k=1 to 3, a=1 to 6) for substituting $\alpha\Delta f_i(t)$ of the second term of the right side of the equation (7), to control $f_1(t+1)$.

FIG. 30A employs a so-called transversal filter. M pieces of delay elements T receive spatial mean values $\Delta f_i(t)$ of frequency errors in series. These delay elements T, M pieces of tap coefficients $\alpha_n$, and an adder ADD1 provide the following frequency control signal:

$$G^a{}_{1i}(t)=_{n=0}\Sigma^M\alpha_n\,g_{ai}(t-n) \quad (28)$$

where $\alpha_n<1$, and a=1 to 6 for indicating the kind of spatial averaging.

FIG. 30B shows a complete integration filter. In this example, multipliers M1 and M2 having multiplication coefficients $\alpha$ and $\beta$, respectively, adders ADD2 and ADD3, and a delay element T provide the following frequency control signal:

$$G^a{}_{2i}(t)=\alpha g_{ai}(t)+\beta\cdot h_{ai}(t) \quad (29)$$

$$h_{ai}(t)=h_{ai}(t-1)+g_{ai}(t) \quad (30)$$

FIG. 30C shows an incomplete integration filter. According to this example, multipliers M3 and M4 having multiplication coefficients $\alpha$ and $\beta$, respectively an adder ADD4, and a delay element T provide the following filtered mean value:

$$G^a{}_{3i}(t)=\alpha g_{ai}(t)+\beta\cdot G^a{}_{3i}(t-1) \quad (31)$$

This filter corresponds to that of FIG. 30A with the following conditions:

$$\alpha_n=\alpha$$

$$\alpha_n=\beta^n,\ n=1,2,\ldots,M$$

$$M\to\infty \quad (32)$$

FIGS. 31 to 38 show results of simulations of frequency errors, i.e., controlled value errors. These simulations have been made with the averaging unit 2-5 with the filters of FIGS. 30A to 30C carrying out averaging operations and with the transmission frequency control unit 2-6 of FIG. 13 controlling transmission frequencies. In these examples, a base station A is located adjacent to six base stations, as shown in FIG. 14. Base stations B, C, and D, shown in FIG. 14, carry out control according to frequency errors detected with respect to closest two, three, and four stations, respectively. Under an initial state with t=0, a frequency error of each base station occurs at random and is substantially uniformly distributed in a range of −1 to +1.

Figure 31:
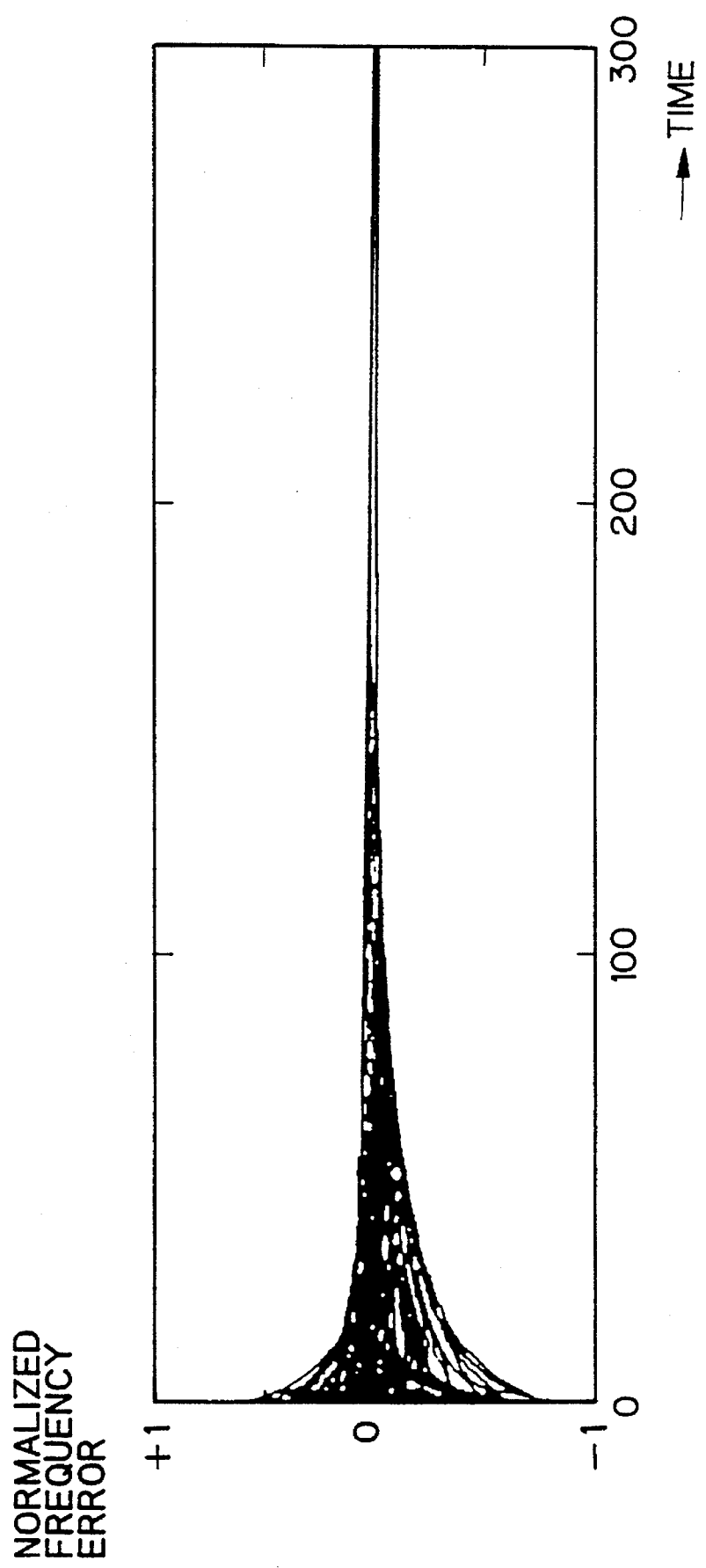
FIG. 31 is a view showing a result of simulation of time changes in frequency errors among adjacent base stations, obtained from a simple spatial arithmetic averaging operation carried out in the averaging unit according to the invention.

(1) FIG. 31 corresponds to transmission frequency control carried out by the simple spatial arithmetic averaging of $g_{1i}(t)$ of the equation (21). As shown in the figure, frequency errors with respect to the adjacent base stations approach 0 as time elapses. An abscissa indicates time, and an ordinate indicates normalized frequency errors.

Figure 32:
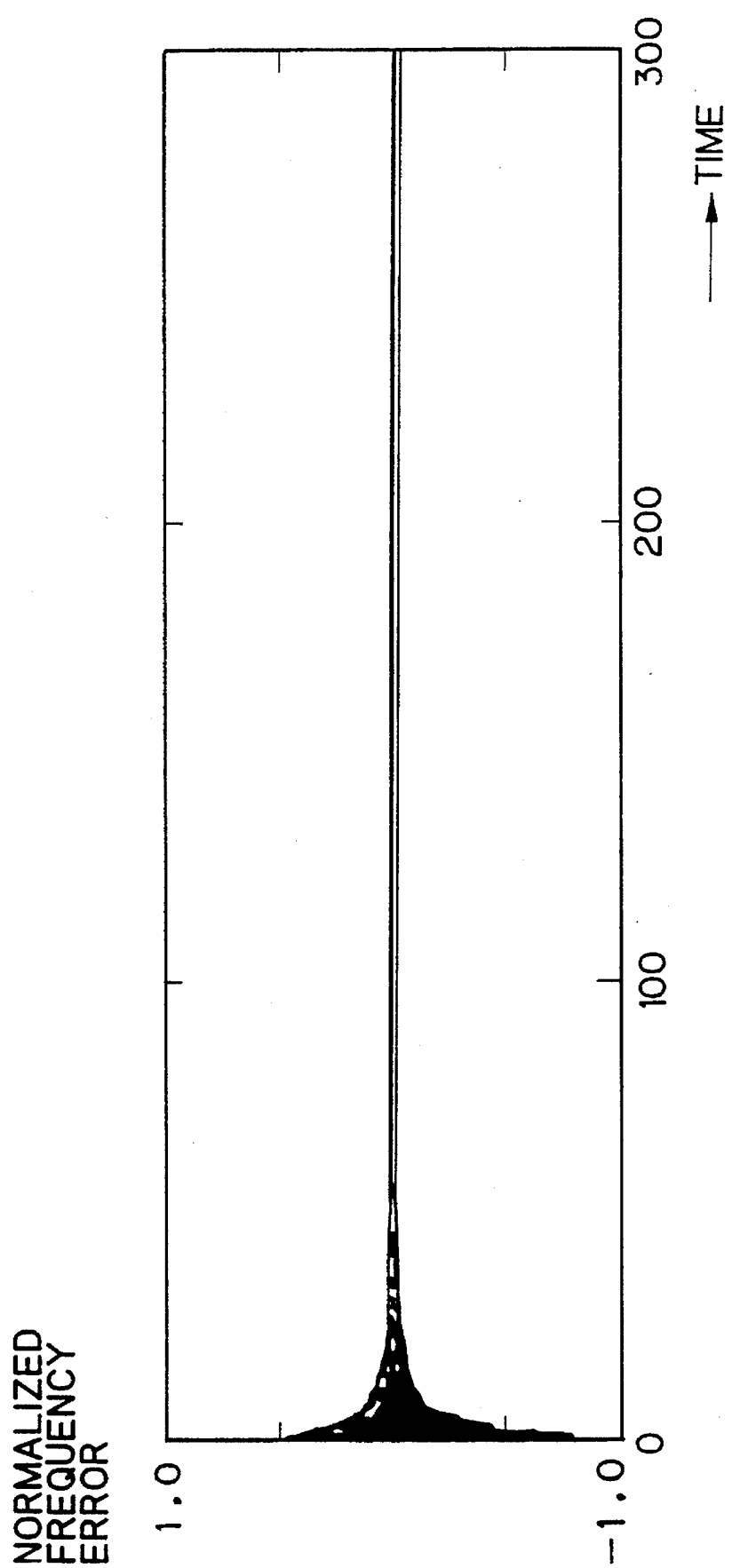
FIG. 32 is a view showing a result of simulation of temporal changes in frequency errors among adjacent base stations, obtained from a simple spatial arithmetic averaging operation and a time averaging operation of a transversal filter, carried out in the averaging unit according to the invention.

(2) FIG. 32 shows frequency errors according to control based on $G^a{}_{1i}(t)$ obtained by a combination of the simple spatial arithmetic averaging of $g_{1i}(t)$ of the equation (21) and the temporal averaging operation of the transversal filter of FIG. 30A. Here, $\alpha_n=0.5$ and M=8. Compared with those of FIG. 31, frequency errors of FIG. 29 more quickly converge (pull in) and involve a smaller time constant. The smaller time constant, however, is vulnerable to noise.

Figure 33:
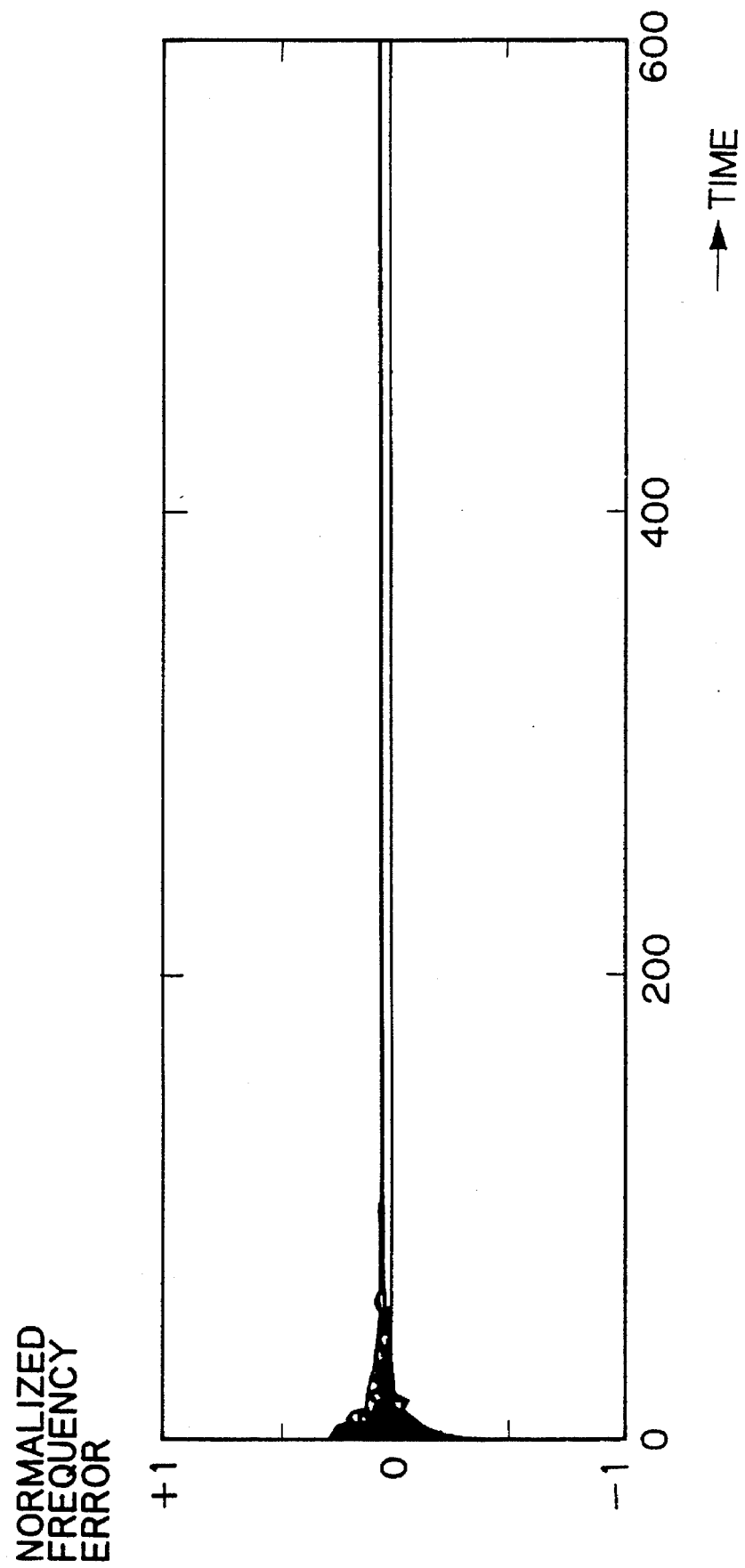
FIG. 33 is a view showing a result of simulation of temporal changes in frequency errors among adjacent base stations, obtained from a simple spatial arithmetic averaging operation and a time averaging operation of a complete integration filter, carried out in the averaging unit according to the invention.

(3) FIG. 33 shows frequency errors obtained by a combination of the simple spatial arithmetic averaging of $g_{1i}(t)$ of the equation (21) and the temporal averaging of the complete integration filter of FIG. 30B. Compared with those of FIG. 32, frequency errors of FIG. 33 more speedily converge. In this example, $\alpha=0.8$ and $\beta=0.6$ in the equation (29).

Figure 34:
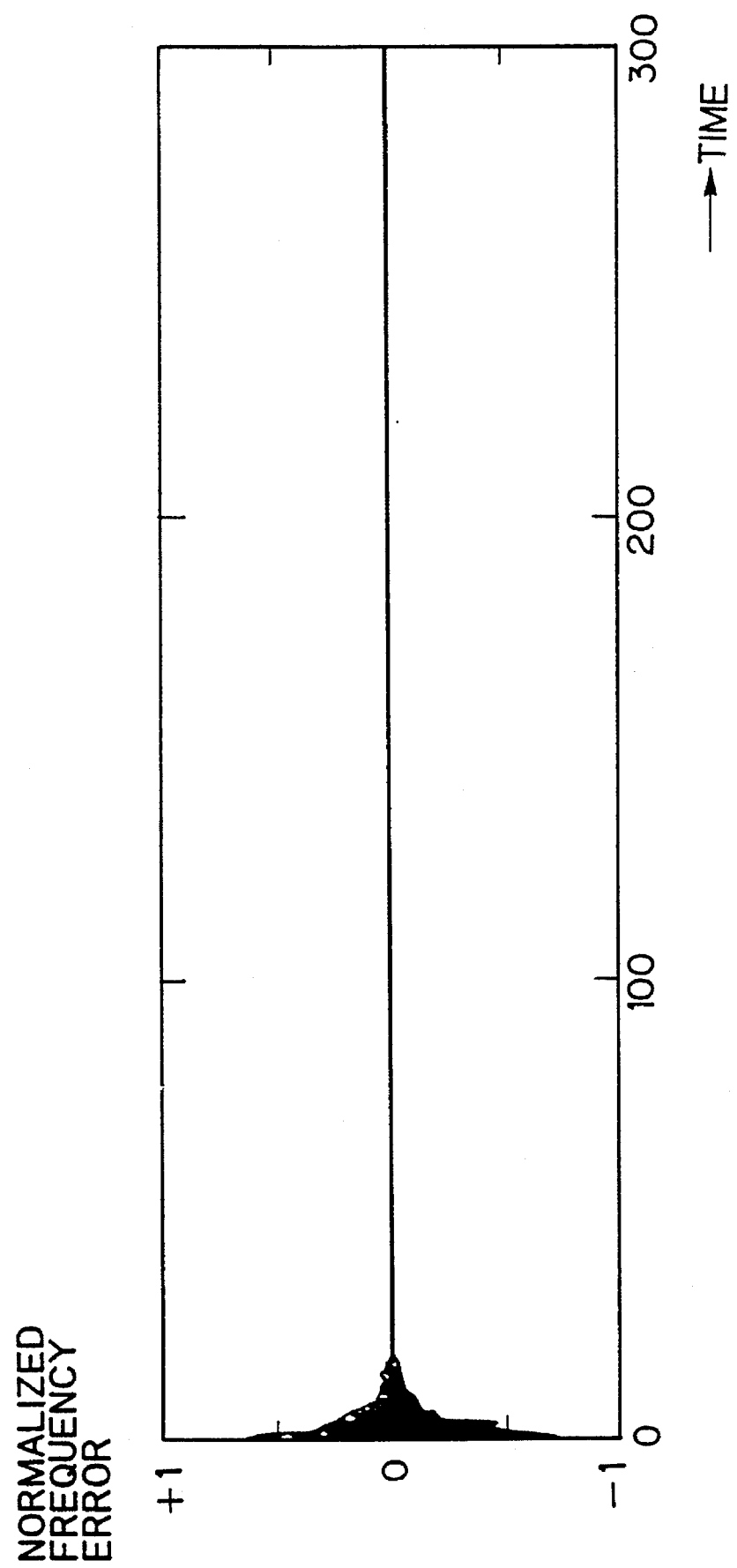
FIG. 34 is a view showing a result of simulation of temporal changes in frequency errors among adjacent base stations, obtained from a simple spatial arithmetic averaging operation and a time averaging operation of an incomplete integration filter, carried out in the averaging unit according to the invention.

(4) FIG. 34 shows frequency errors obtained by a combination of the simple spatial arithmetic averaging of $g_{1i}(t)$ of the equation (21) and the temporal averaging of the incomplete integration filter of FIG. 30C. This example achieves substantially the same convergence of frequency errors as that of FIG. 33. In this example, $\alpha=0.8$ and $\beta=0.6$ in the equation (32).

Figure 35:
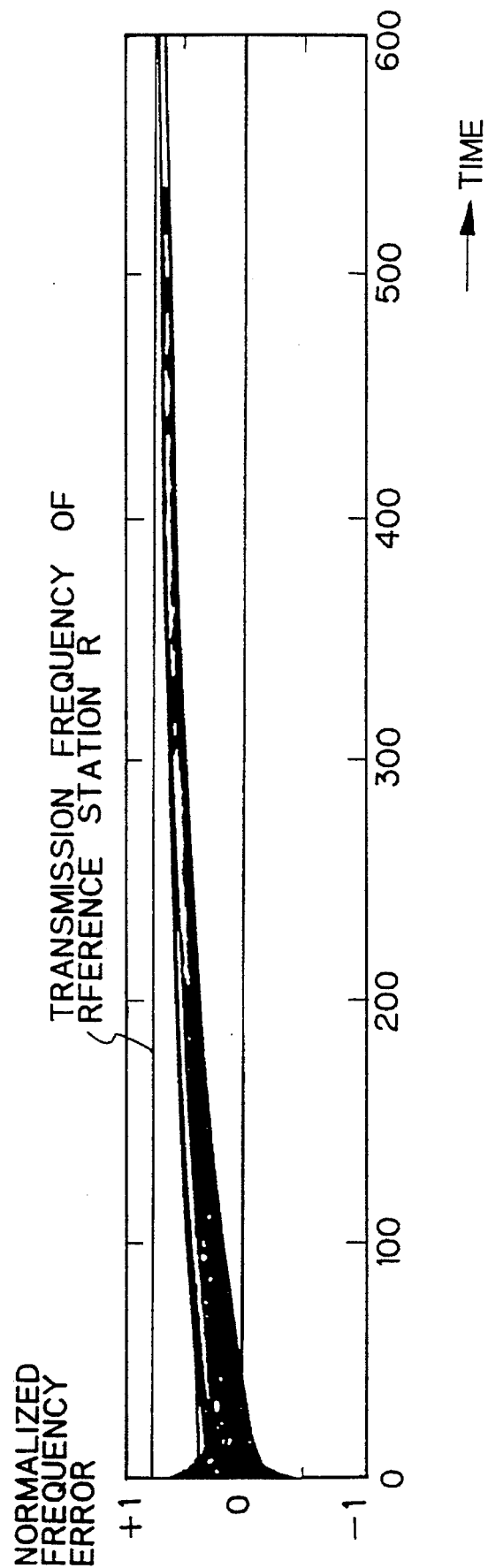
FIG. 35 is a view showing a result of simulation of temporal changes in frequency errors among adjacent base stations, obtained from a simple spatial arithmetic averaging operation carried out in the averaging unit with use of a reference station R set among base stations according to the invention.

(5) FIG. 35 shows frequency errors obtained by the simple spatial arithmetic averaging operation of $g_{1i}(t)$ of the equation (21) with a reference station R being set among base stations as shown in FIG. 14. FIG. 35 shows gradual convergence to a transmission frequency of the reference station R. In this example, the frequency error of the reference station R is set to 0.75 to clearly show the effect of the reference station.

Figure 36:
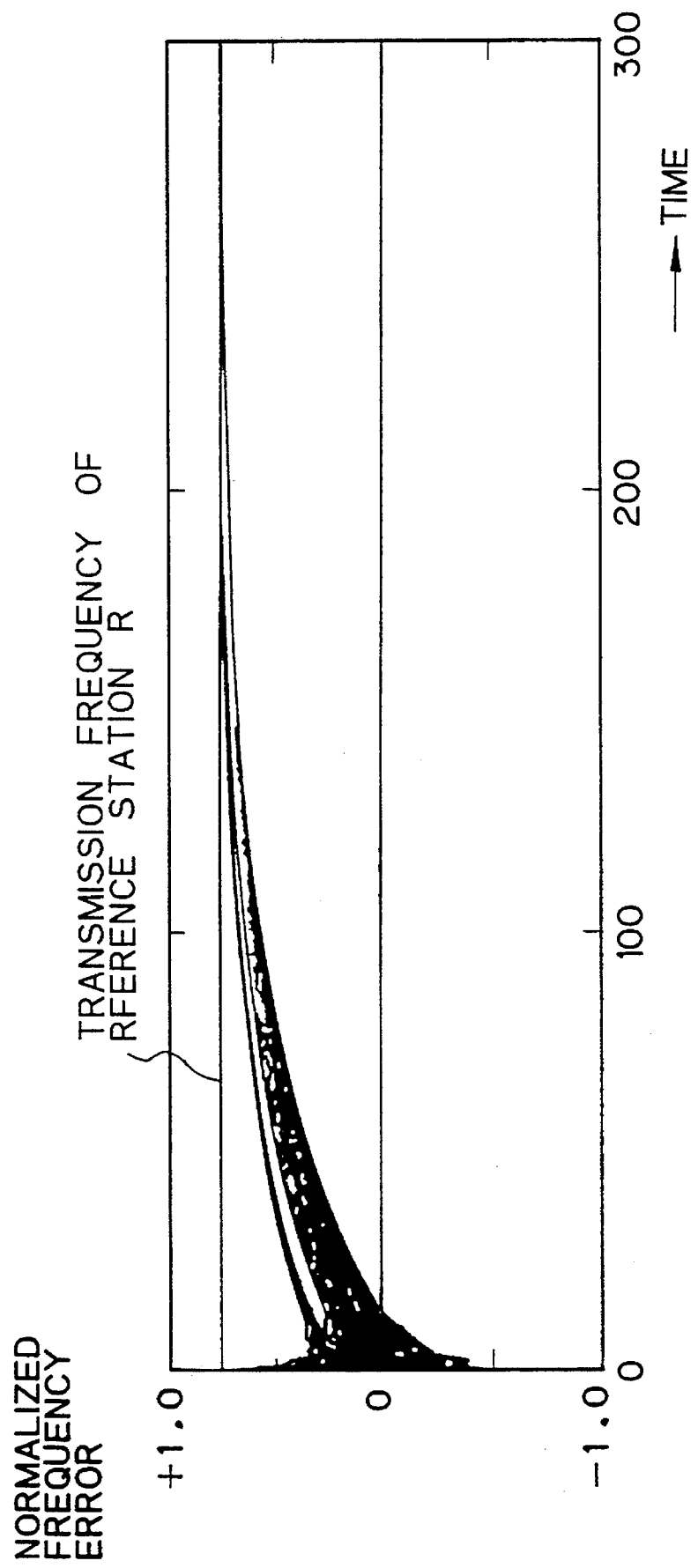
FIG. 36 is a view showing a result of simulation of temporal changes in frequency errors among adjacent base stations, obtained from a simple spatial arithmetic averaging operation and a time averaging operation of a transversal filter, carried out in the averaging unit with use of the reference station R according to the invention.

(6) FIG. 36 shows frequency errors obtained with use of the reference station R and a combination of the simple arithmetic averaging of $g_{1i}(t)$ of the equation (21) and the temporal averaging of the transversal filter of FIG. 30A. Compared with FIG. 35, it is understood that the speed of convergence to the transmission frequency of the reference station R is faster in FIG. 36.

Figure 37:
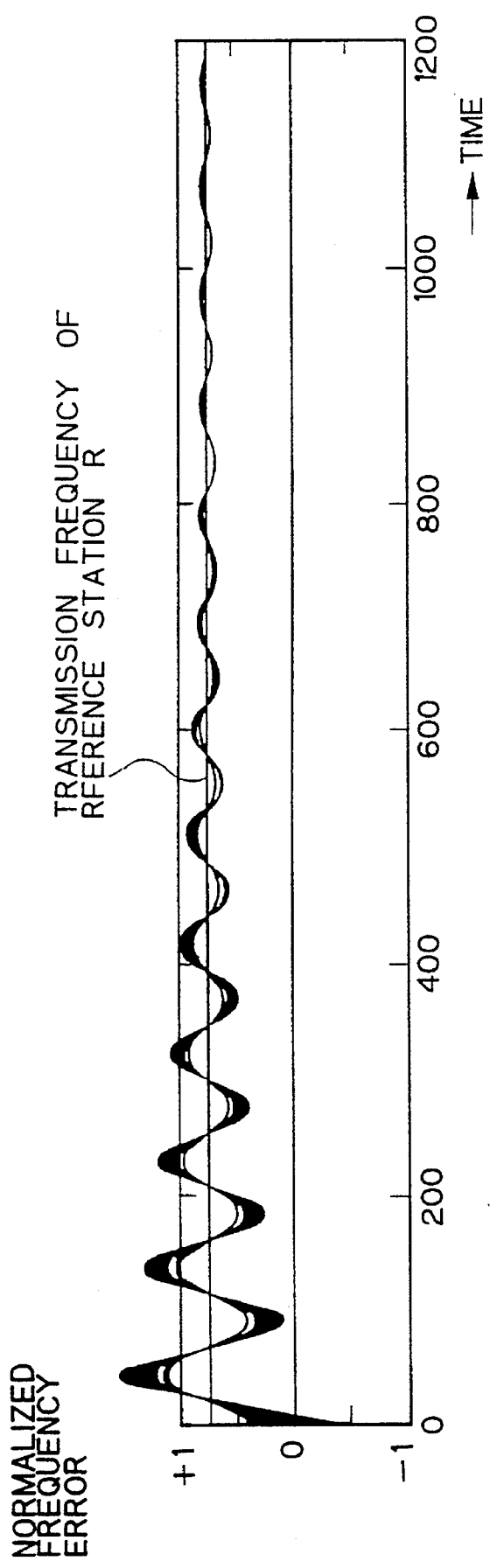
FIG. 37 is a view showing a result of simulation of temporal changes in frequency errors among adjacent base stations, obtained from a simple spatial arithmetic averaging operation and a time averaging operation of a complete integration filter, carried out in the averaging unit with use of the reference station R according to the invention.

(7) FIG. 37 shows frequency errors obtained with use of the reference station R and a combination of the simple arithmetic averaging of $g_{1i}(t)$ of the equation (21) and the temporal averaging of the complete integration filter of FIG. 30B. It is understood that convergence to the transmission frequency of the reference station R is oscillating.

Figure 38:
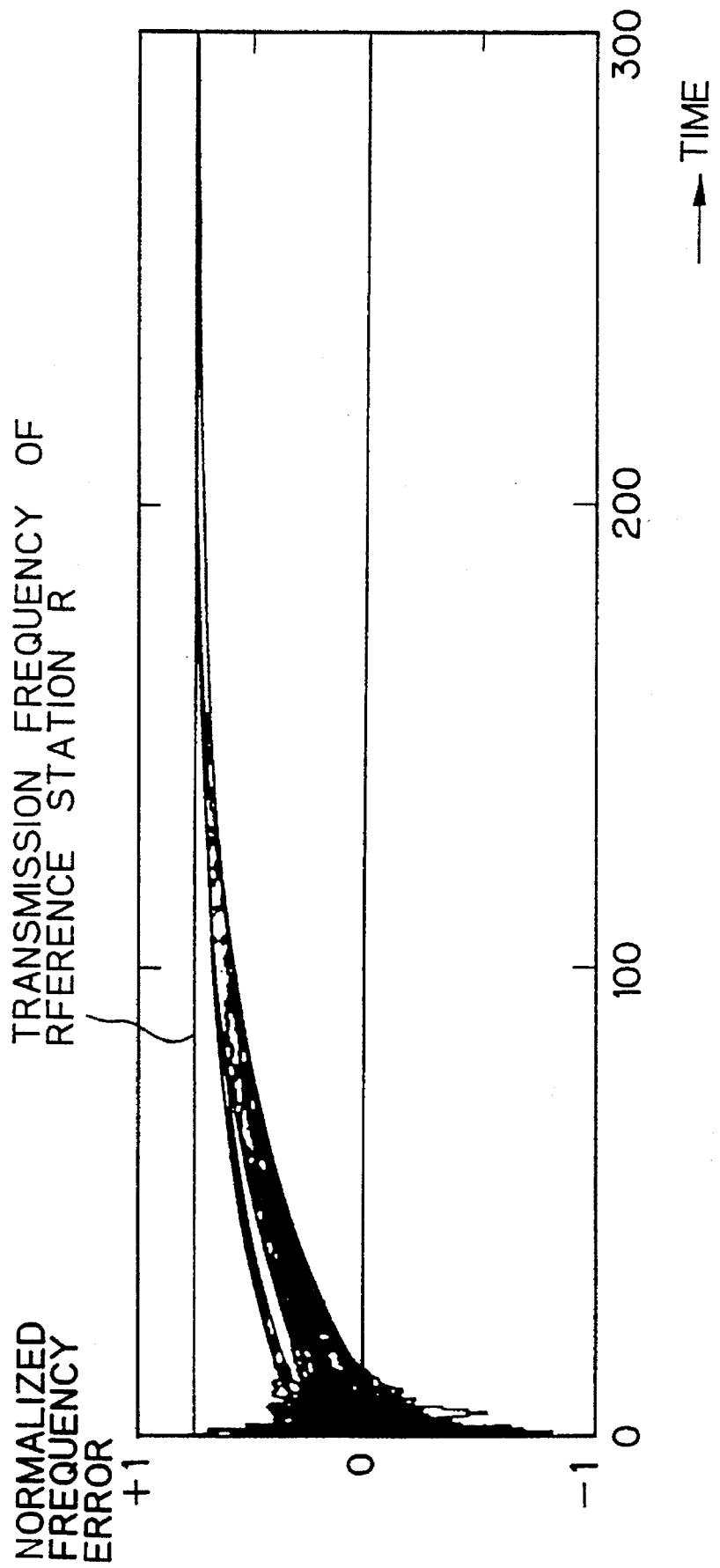
FIG. 38 is a view showing a result of simulation of temporal changes in frequency errors among adjacent base stations, obtained from a simple spatial arithmetic averaging operation and a time averaging operation of an incomplete integration filter, carried out in the averaging unit with use of the reference station R according to the invention.

(8) FIG. 38 shows frequency errors obtained with use of the reference station R and a combination of the simple arithmetic averaging of the above item (1) and the temporal averaging of the incomplete integration filter of FIG. 30C. It is understood that a waveform of gradual convergence to the transmission frequency of the reference station R resembles to that of the transversal filter.

Embodiments of timing (phase) control (FIGS. 39 to 48)

Figure 39:
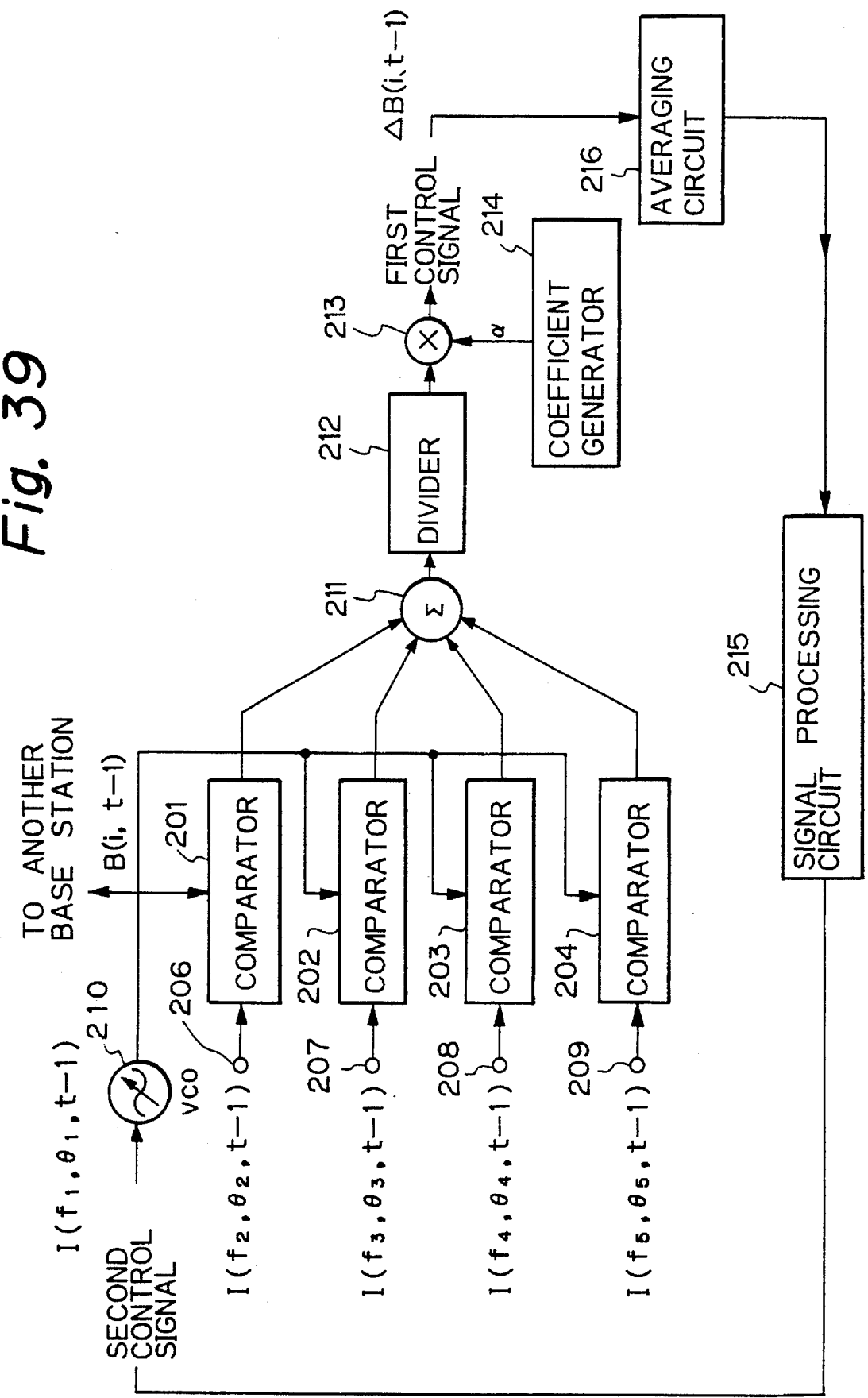
FIG. 39 is a block diagram showing a first embodiment based on the system of FIG. 15.
Figure 40:
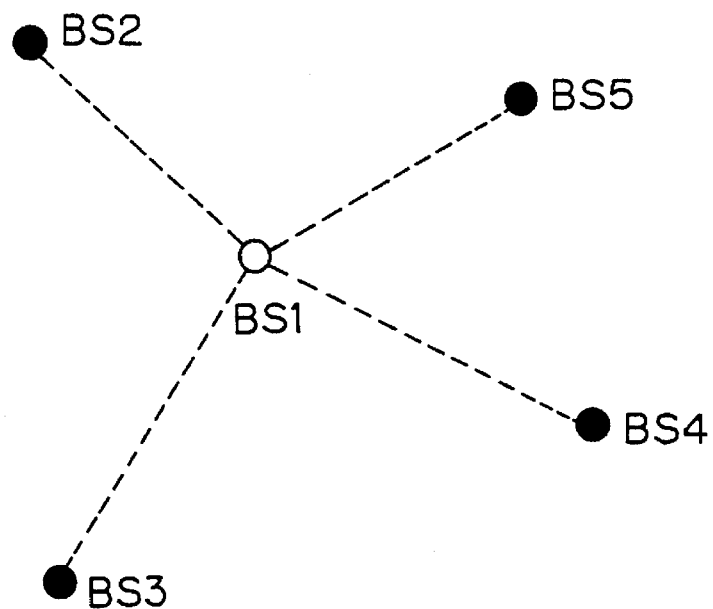
FIG. 40 is a schematic view showing a network for explaining the embodiment of FIG. 39.

FIG. 39 is a schematic view showing essential part of a more practical embodiment of the network control system of FIG. 15 according to the invention. According to this embodiment, a base radio station BS1 is connected to adjacent base radio stations BS2 to BS5 to form a network, as shown in FIG. 40. FIG. 39 shows essential parts of the base radio station BS1. Each of the other base radio stations BS2 to BS5 has the same configuration as the base radio station BS1. A mobile station communicates with any one of the base radio stations BS1 to BS5 according to, for example, the TDMA method. At the same time, each of the base radio stations BS1 to BS5 transmits a signal having an optional frame clock frequency and an optional frame phase (controlled values). The embodiment explained below employs the TDMA method. The invention is also applicable for FDMA or CDMA method, if each of the base radio stations BS1 to BS5 transmits a signal having an optional clock frequency and an optional clock phase with no regard to frames.

In FIG. 39, comparators 201 to 204 have terminals 206 to 209, respectively. These terminals receive at time t-1, by wire or by radio, information pieces $I(f_2, \Theta_2, t-1)$ to $I(f_5, \Theta_5, t-1)$ for frame clock frequencies $f_2$ to $f_5$ and frame phases $\Theta_2$ to $\Theta_5$ from the base radio stations BS2 to BS5, respectively, as well as an information piece $I(f1, \Theta_1, t-1)$ of the base radio station BS1 from a voltage control oscillator (VCO) 210. The comparators 201 to 204 compare these signals.

The comparators 201 to 204 provide errors between the frame clock frequency and frame phase at time t−1 of the base radio station BS1 and the frame clock frequencies and frame phases at time t−1 of the adjacent base radio stations BS2 to BS5. In this case, the comparators 201 to 204 each compares the numbers of clocks, i.e., clock frequencies that provide frames for determining time slots of TDMA with each other and the clock phases indicating frame heads with each other, and provides the error information. An adder 211 adds the output signals of the comparators 201 to 204 to one another, and a divider 212 spatially filters, i.e., divides a result of the addition by the number of the adjacent radio stations (four in total, i.e., BS2 to BS5). A multiplier 213 multiplies a result of the spatial filtering by a coefficient α provided by a coefficient generator 214 and provides a first control signal indicating an error $\Delta B(i, t-1)$ of the frame clock frequency and frame phase between the base radio station BS1 and the adjacent base radio stations BS2 to BS5, as shown in the equation (8).

An averaging circuit 216 averages the first control signals and supplies the averaged result to a signal processing circuit 215, which converts the signal into a second control signal appropriate for controlling the VCO 210. As a result, the VCO 210 is variably controlled to minimize the output oscillation frequency and phase error $\Delta B(i, t-1)$. Then, the VCO 210 provides the signal $B(i, t)$ of the equation (9) indicating the level of the node. The output signal of the VCO 210 is transmitted as transmission timing information through wire or radio to each of the adjacent base radio stations BS2 to BS5.

According to this embodiment based on the TDMA method, the frame clock frequency and frame phase of the base radio station BS1 are corrected to match those of the adjacent base radio stations BS2 to BS5. According to the TDMA method, the clock phase and frame clock frequency are both controlled by the VCO 210. In the FDMA and CDMA methods, the VCO 210 controls a clock frequency and a clock phase because these methods are irrelevant to frames.

Next, essential parts of another embodiment of the network control system according to the invention will be explained. This embodiment involves base radio stations that communicate with a mobile station according to the TDMA method. In FIG. 39, base radio stations 402 to 404 controlled by a radio circuit central control station 401 transmit signals with the same frame phase and clock frequency as those of other base radio stations. A controlled value of this embodiment is only a frame phase.

Figure 41:
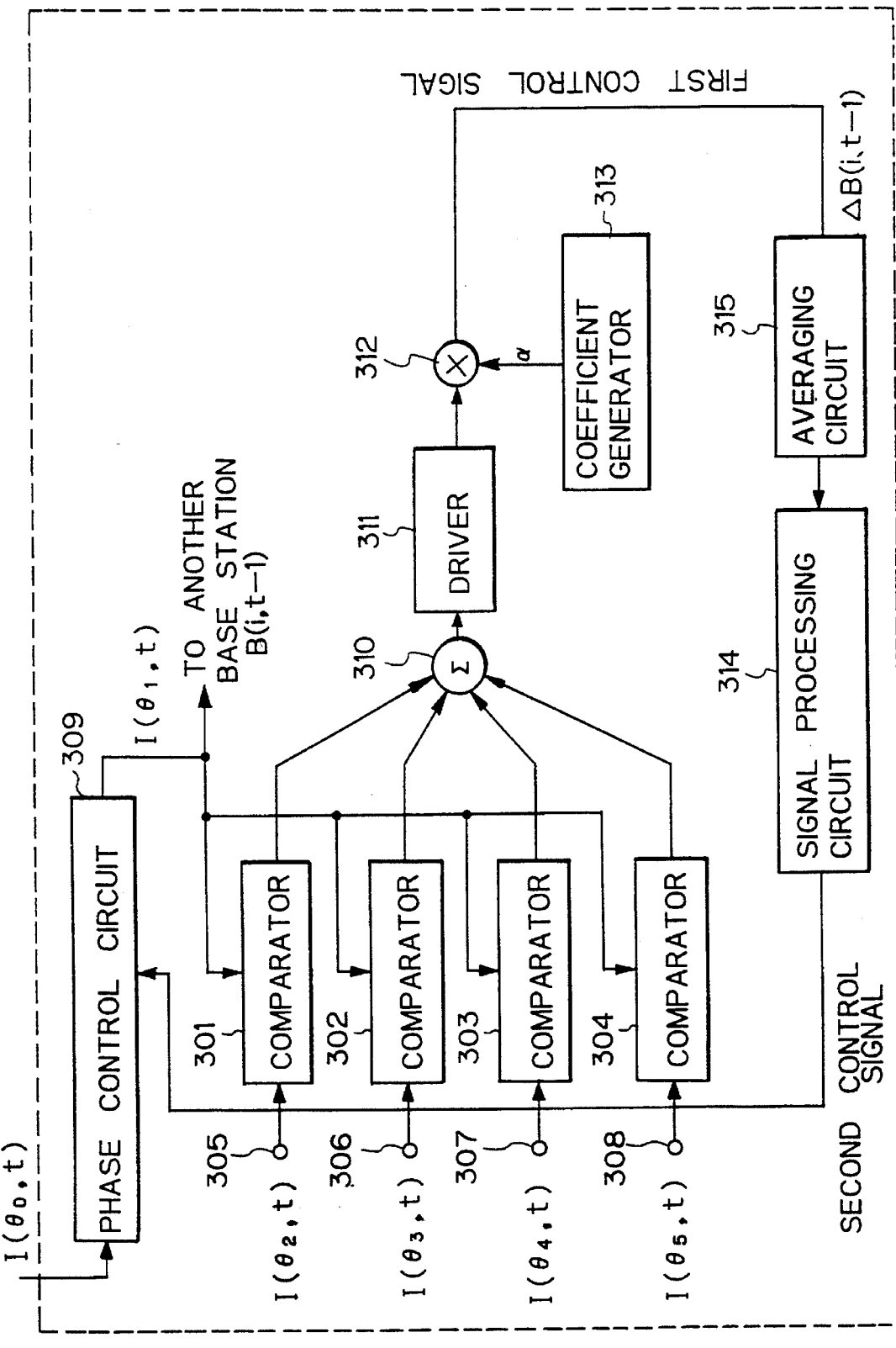
FIG. 41 is a block diagram showing a second embodiment based on the system of FIG. 15.

In FIG. 41, comparators 301 to 304 receive clock phase information $I(\Theta_1, t)$ of their own base radio station at time t from a phase control circuit 309 to be explained later. At the same time, terminals 305 to 308 of the comparators 301 to 304 receive clock phase information $i(\Theta_2, t)$ to $I(\Theta_5, t)$ at time t of adjacent base radio stations (there are four adjacent base radio stations in this embodiment) by wire or radio. The comparators 301 to 304 detect differences between the information of their own station and the information of the adjacent stations. At this time, the phase control circuit 309 receives reference clock phase information $I(\Theta_0, t)$ from the central control station 401 of FIG. 42.

An adder 310 adds output signals of the comparators 301 to 304 to one another, and a divider 311 divides a result of the addition by the number of the adjacent base radio stations (four in this embodiment) and provides a mean value. A multiplier 312 multiplies the mean value by a coefficient α provided by a coefficient generator 313 and provides a first control signal indicating a clock phase error between the base radio station in question and the adjacent base radio stations.

An averaging circuit 315 averages the first control signals and supplies the averaged result to a signal processing circuit 314. The signal processing circuit 314 converts the received signal into a second control signal having a proper signal configuration for controlling the phase control circuit 309. The phase control circuit 309 controls the reference clock phase $I(\Theta_0, t)$ to zero a difference between the reference clock phase $I(\Theta_0, t)$ and the clock phases of the adjacent base radio stations. Namely, the phase control circuit 309 receives the reference clock phase $I(\Theta_0, t)$, adjusts it according to the second control signal, and provides a clock phase signal of its own station. Output signals of the comparators 301 to 304 provide information related to errors between the clock phase of its own station and the clock phases of the adjacent base radio stations. When the FDMA and CDMA methods are employed, the phase control circuit 309 controls clock phases.

Figure 43:
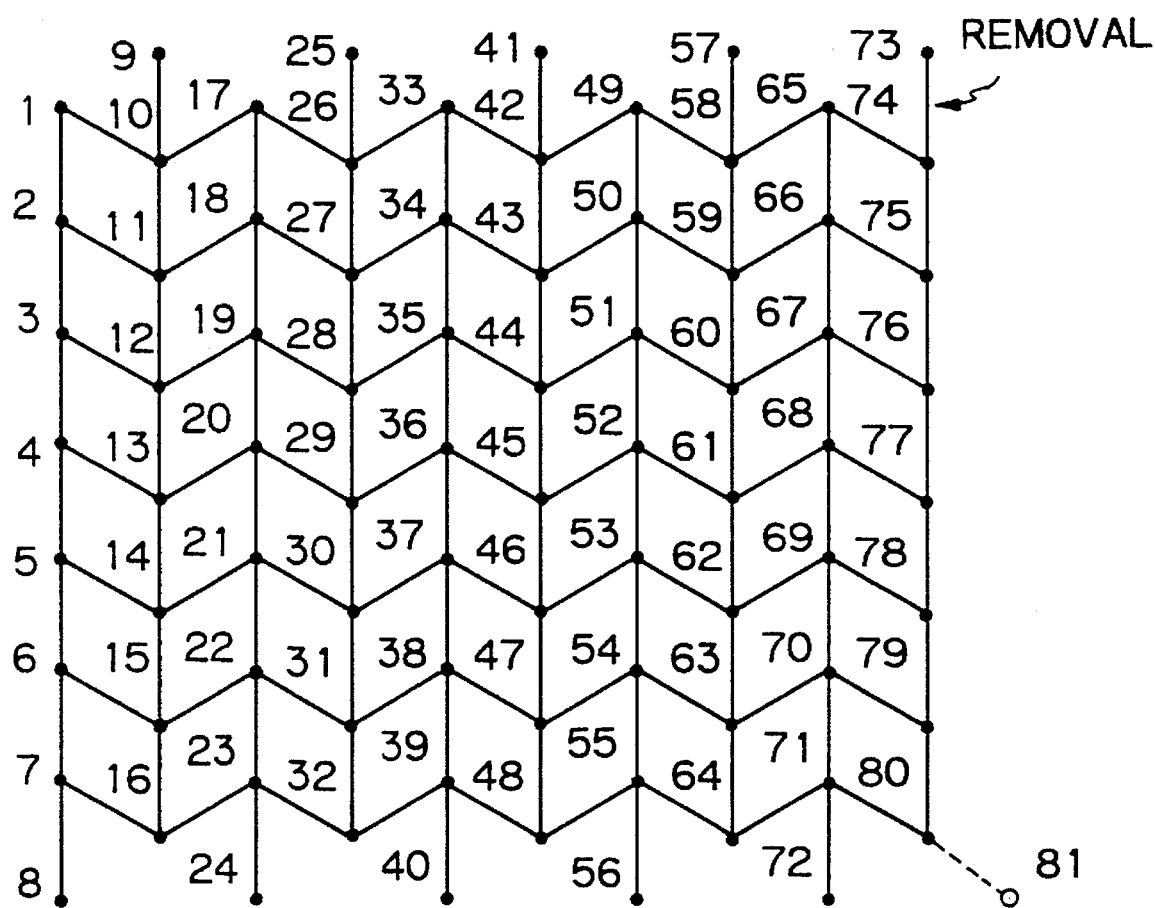
FIG. 43 is a schematic view showing a network according to an embodiment of the invention.
Figure 44A:
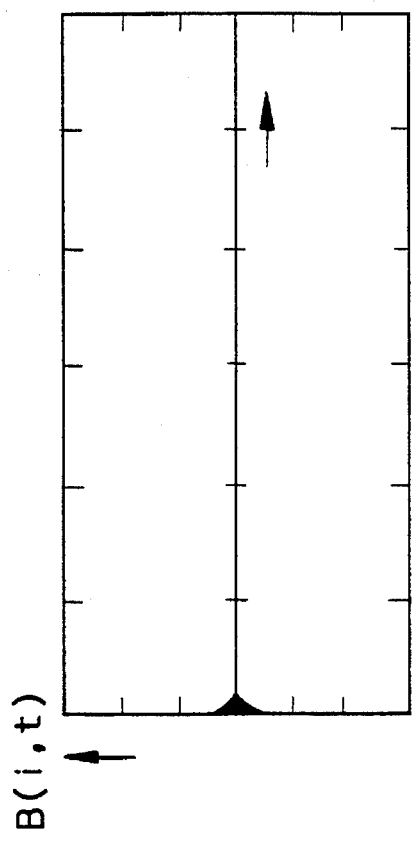
FIGS. 44A to 44C are views explaining characteristics of the network of FIG. 42.
Figure 44C:
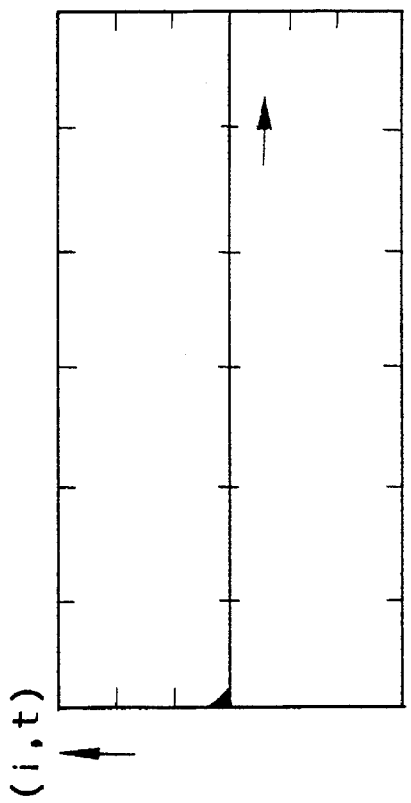
Figure 44B:
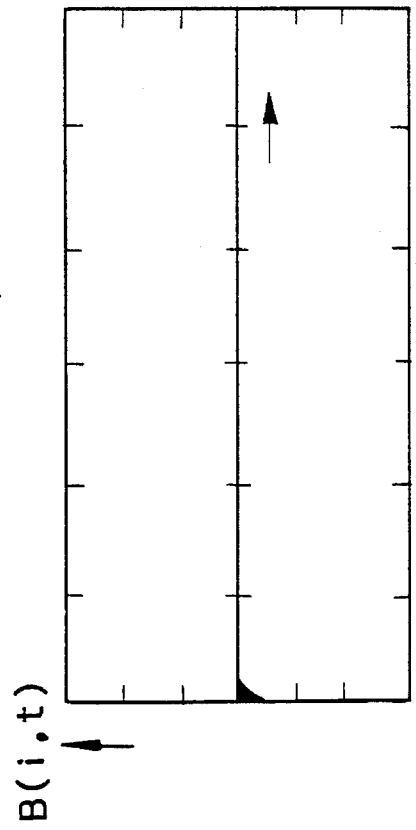

FIG. 43 shows a network based on the above embodiment having 80 nodes. FIGS. 44A to 44C and FIGS. 45A and 45B show results of simulations carried out on this network with initial values given at random and a coefficient α of 0.5. In each of the figures, an ordinate indicates the level $B(i, t)$ of a node, and an abscissa time. FIGS. 44B and 44C show pull-in characteristics of different two nodes. FIG. 44A shows pull-in characteristics of all of the 80 nodes. As is apparent in FIG. 44A, the levels of all nodes become equal to one another after a predetermined period.

Figure 42:
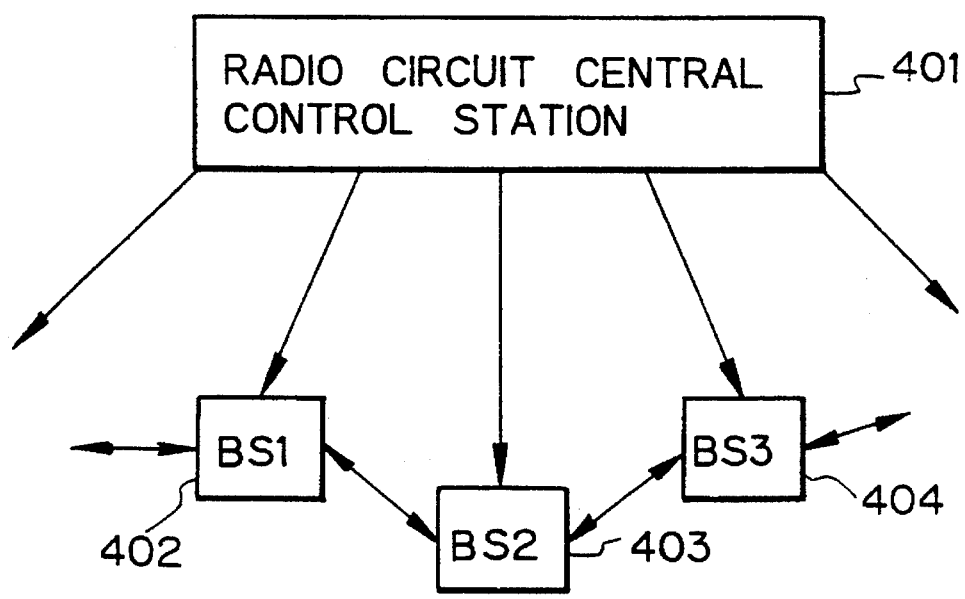
FIG. 42 is a schematic view showing a network for explaining the embodiment of FIG. 41.
Figure 45B:
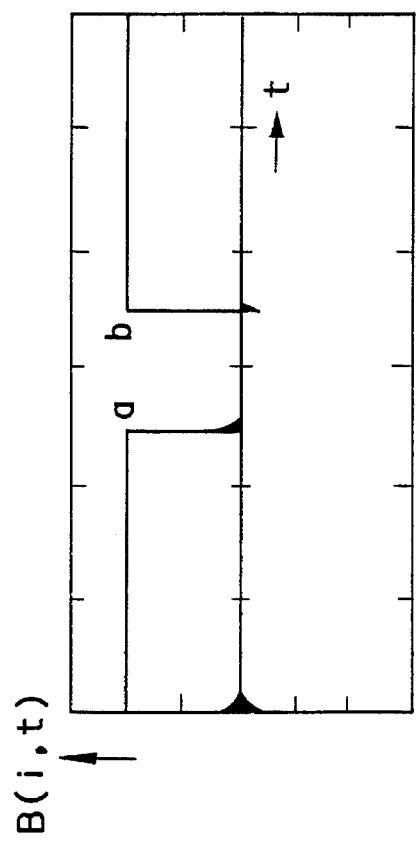
FIGS. 45A and 45B are views explaining characteristics of the network of FIG. 42 with a node being added to or removed from the network.
Figure 45A:
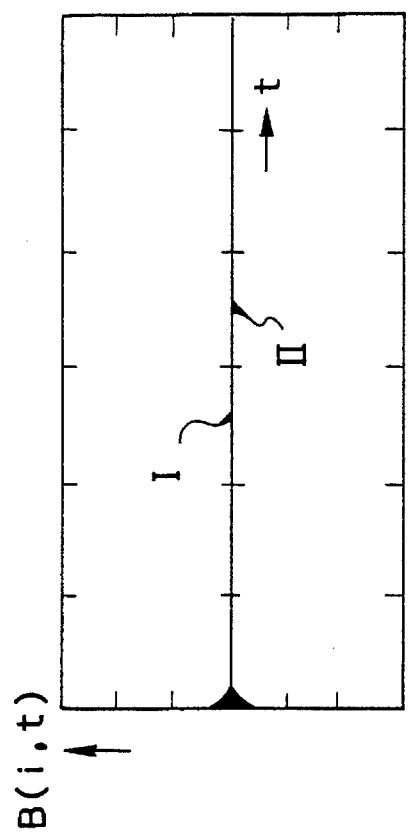

In FIG. 43, if a node 81 is added to the network, pull-in characteristics of each node of the network will be slightly disturbed just after the addition of the node 81 as indicated with "I" in FIG. 45A. This disturbance, however, is absorbed to a synchronized state at once. If a node 73 is removed from the network as shown in FIG. 42, pull-in characteristics of each node of the network will be disturbed just after the removal of the node 73 as indicated with "II" in FIG. 45A. This disturbance is also absorbed to a synchronized state at once.

In FIG. 45B, "a" indicates pull-in characteristics of the added node 80 with an initial value of 0, and "b" represents characteristics that the value B(i, t) of the node 73 is forcibly zeroed and then removed from the network. Even if a node is added to or removed from the network, each node in the network is maintained in a stable synchronized state.

With the TDMA, FDMA, or CDMA method for mobile communication, this embodiment can synchronize timing of base radio stations with one another in order to realize a hand-over with no momentary stoppage. In this case, when each node corresponds to a base radio station and when the magnitude of the node is given as frequency information or phase information, results of simulations show that the nodes are synchronized with one another. According to the embodiment, it is understood that frame synchronization is not greatly disturbed by addition of base radio stations, or failure of base radio stations.

Figure 46:
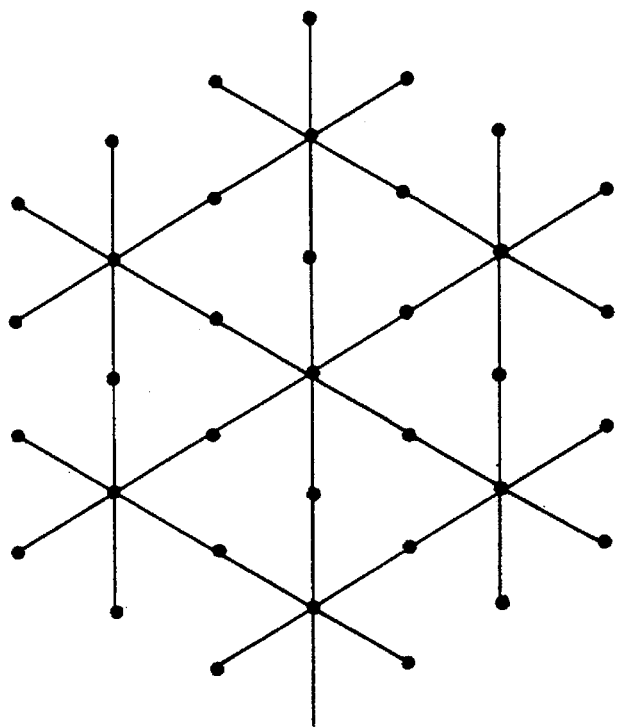
FIG. 46 is a schematic view showing a network according to another embodiment of the invention.
Figure 47:
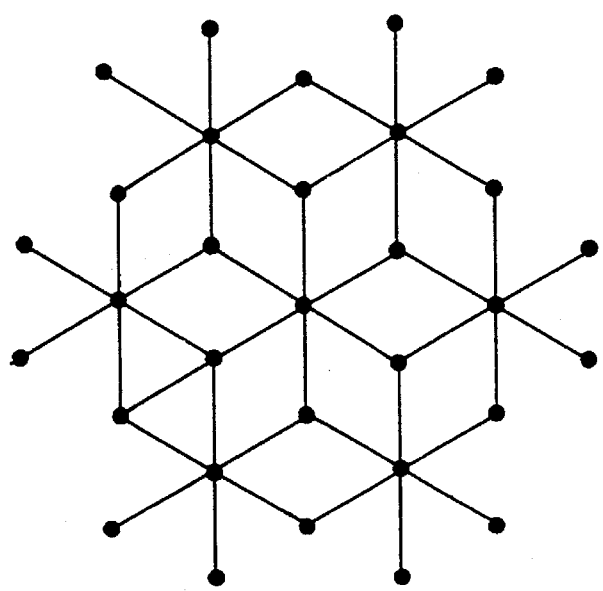
FIG. 47 is a schematic view showing network according to still another embodiment of the invention.
Figure 48:
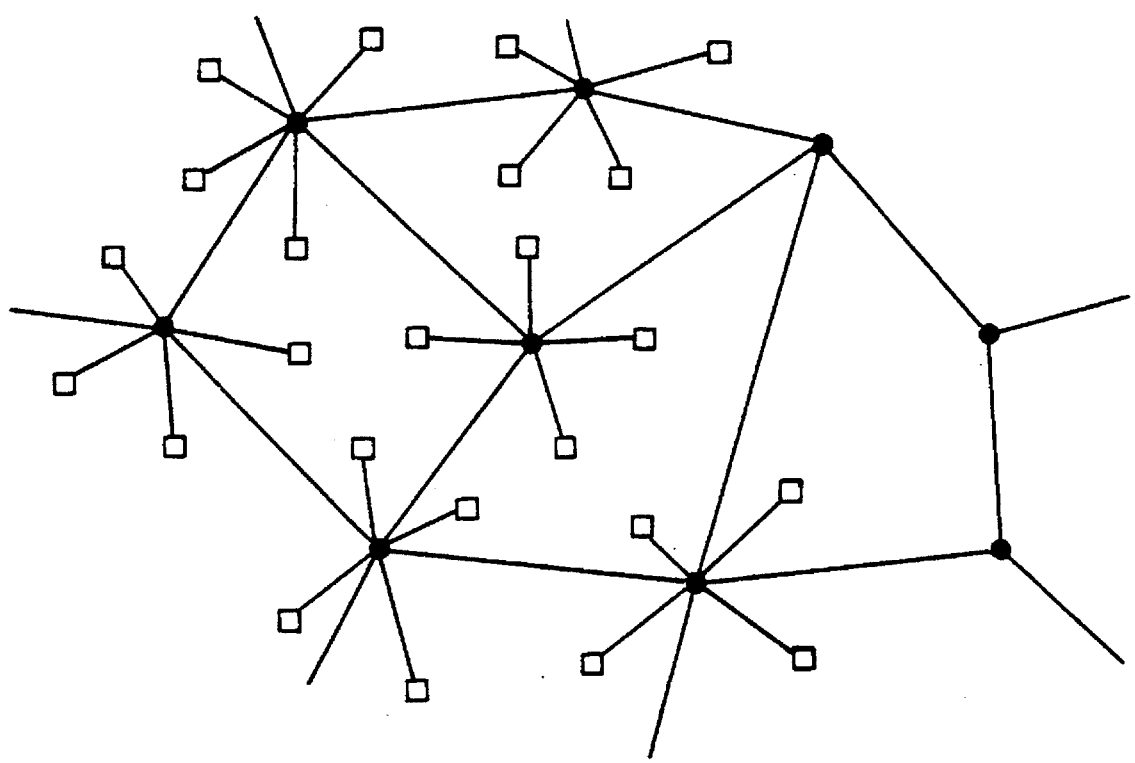
FIG. 48 is a schematic view showing a network according to still another embodiment of the invention.

The invention is not limited to the network arrangement of FIG. 43. For example, the invention is applicable for network arrangements of FIGS. 46 to 48. In FIGS. 46 and 47, adjacent nodes are basically connected to one another. In FIG. 48, some nodes (base radio stations) are locally synchronized with one another, and four nodes are disposed around and connected to each of the locally connected nodes.

Embodiments with pull-in range (FIGS. 49 to 52)

Figure 49:
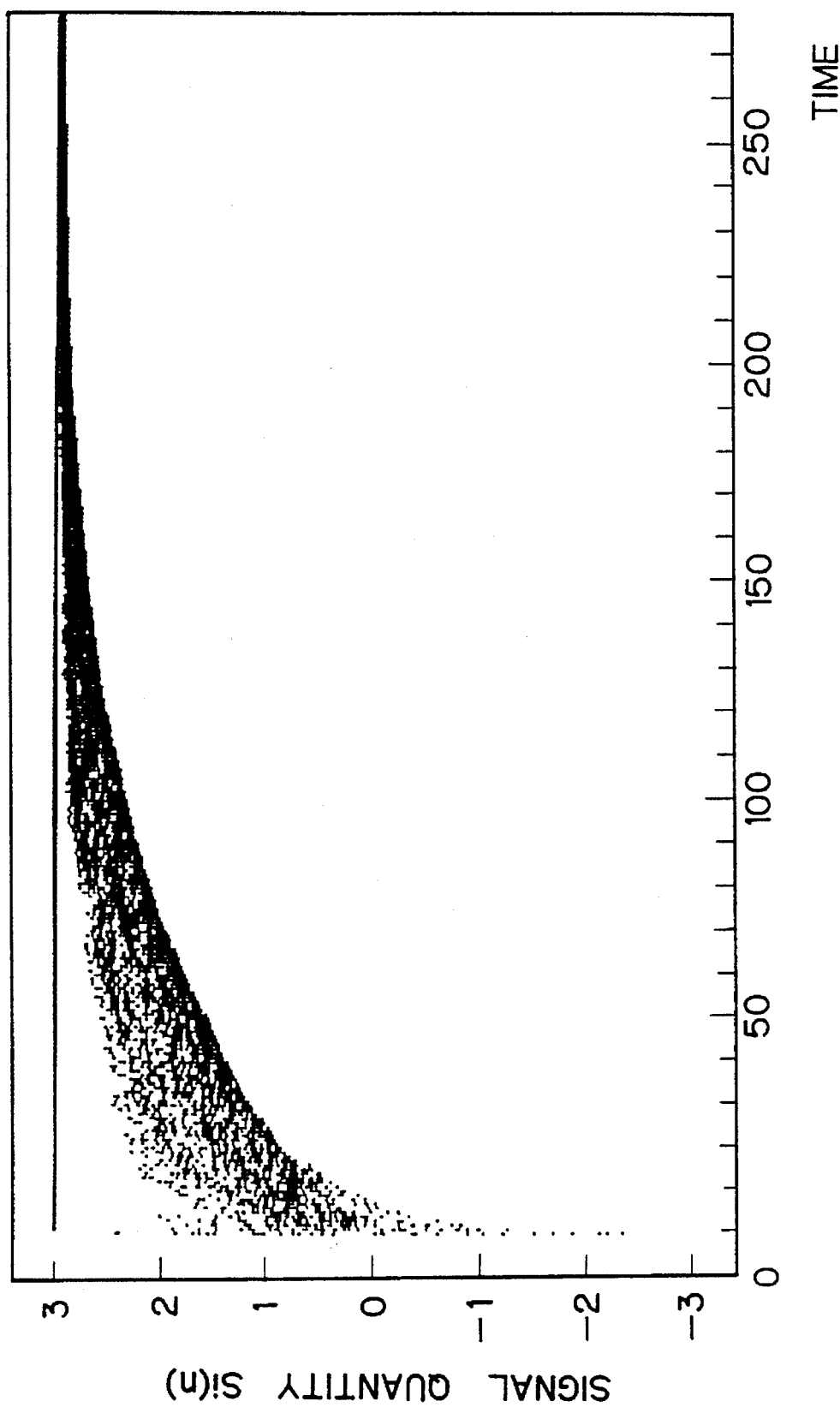
FIG. 49 is a view showing a result of simulation of pull-in characteristics (characteristics of time to signal quantity) with a single uncontrollable node.
Figure 50:
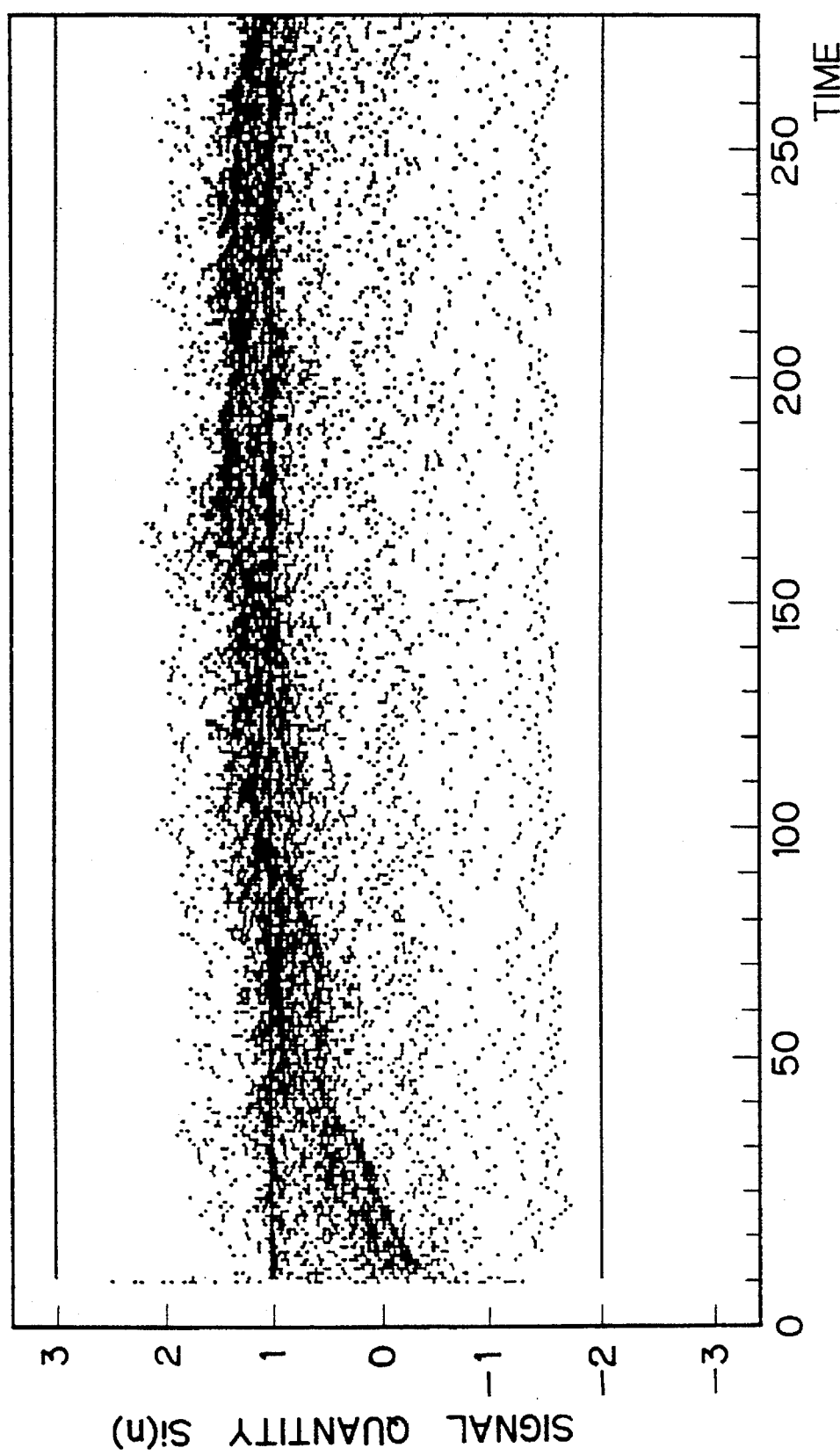
FIG. 50 is a view showing a result of simulation of pull-in characteristics (characteristics of time to signal quantity) with a large number of uncontrollable nodes.

When a network is in a mutually synchronized state with a timing phase serving as a controlled value, and when one node (base station) in the network becomes uncontrollable for the mutual synchronization, the network will converge to a mutual mean value of all nodes because the network has no absolute reference. The effect is that, when one node in the network becomes uncontrollable, the other nodes follow the value of the uncontrollable node, and it will take a long time to restore the mutually synchronized state. This phenomenon is shown in FIG. 49, which is a simulation graph showing characteristics of time versus signal quantity Si(n). As shown in the figure, the mutually synchronized state is restored anyway but after a long time.

If several nodes become uncontrollable, it will take quite a long time or be impossible to restore the mutually synchronized state. This phenomenon is shown in a simulation graph of FIG. 50. Since synchronization never progresses as time elapses, the signal quantity Si(n) never decreases.

Figure 51:
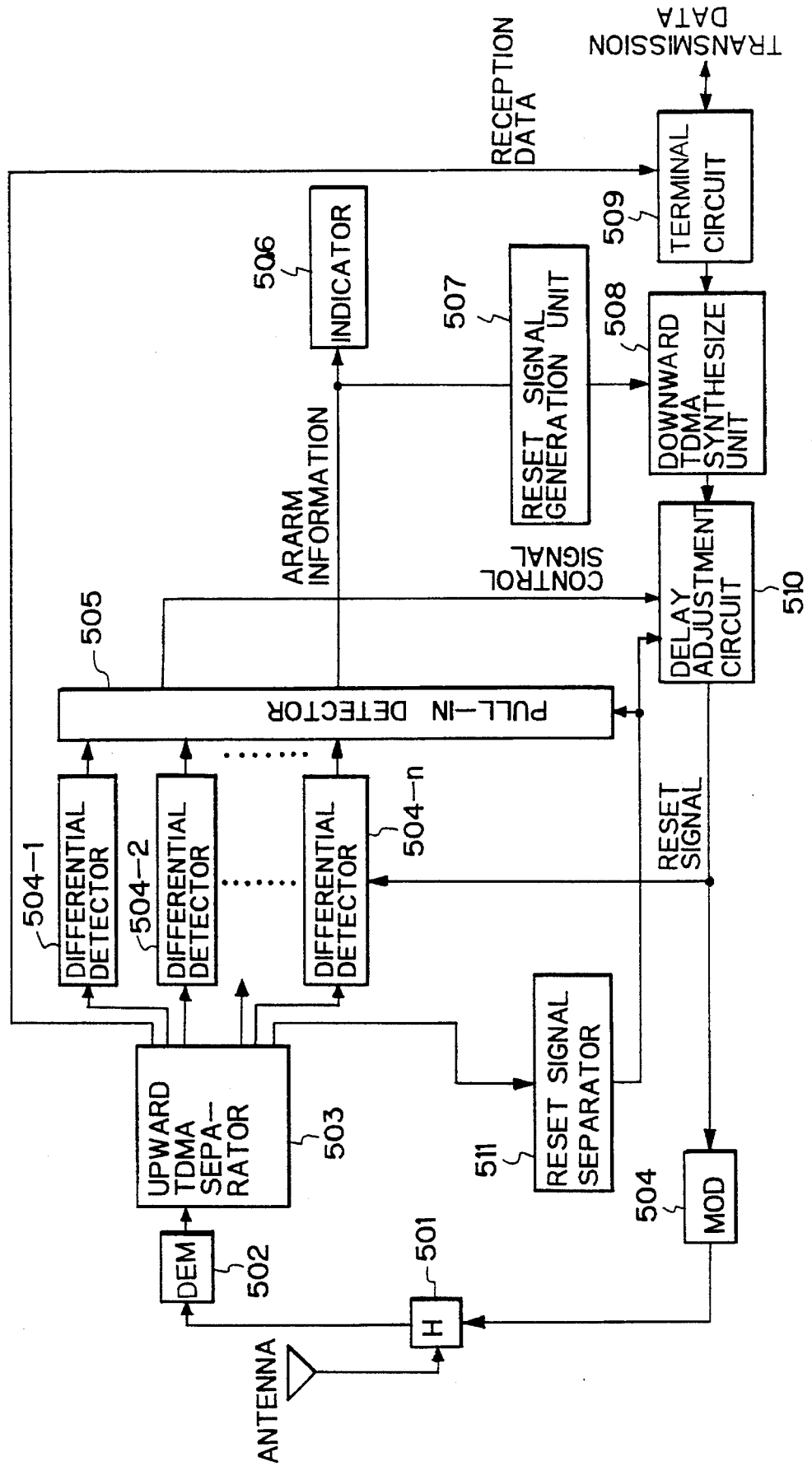
FIG. 51 is a block diagram showing a node having a pull-in range function according to an embodiment of the invention.

FIG. 51 shows means for solving these problems, according to the invention. In the figure, a signal received by a hybrid 501 is demodulated by a demodulator 502 and separated by a separator 503 into signals of individual adjacent nodes. The separated signals are compared with a reference value in differential detectors 504-1 to 504-n, which provide a pull-in range detector 505 with differences. The received data are received by a terminal circuit 509 through the separator 503.

When the pull-in range detector 505 detects that any one of the differences is exceeding a predetermined threshold value, an indicator 506 displays, as alarm information, the node number, etc., of the exceeding difference, and a reset signal generation unit 507 generates a reset signal for the node number and provides the reset signal to a synthesis unit 508.

The synthesis unit 508 adds the reset signal to transmission data from the terminal circuit 509 and provides it to a delay adjustment circuit 510. The delay adjustment circuit 510 delays the transmission data by a predetermined delay time in response to a control signal from the pull-in range detector 505. Thereafter, the transmission data is passed through a modulator 504 and transmitted from the hybrid 501.

When the node that caused the exceeding difference receives the reset signal, the separator 503 and reset signal separator 511 thereof separate the reset signal and reset the pull-in range detector 505 thereof. At the same time, the delay adjustment circuit 510 is controlled to adjust pull-in timing into a pull-in range.

Figure 52:
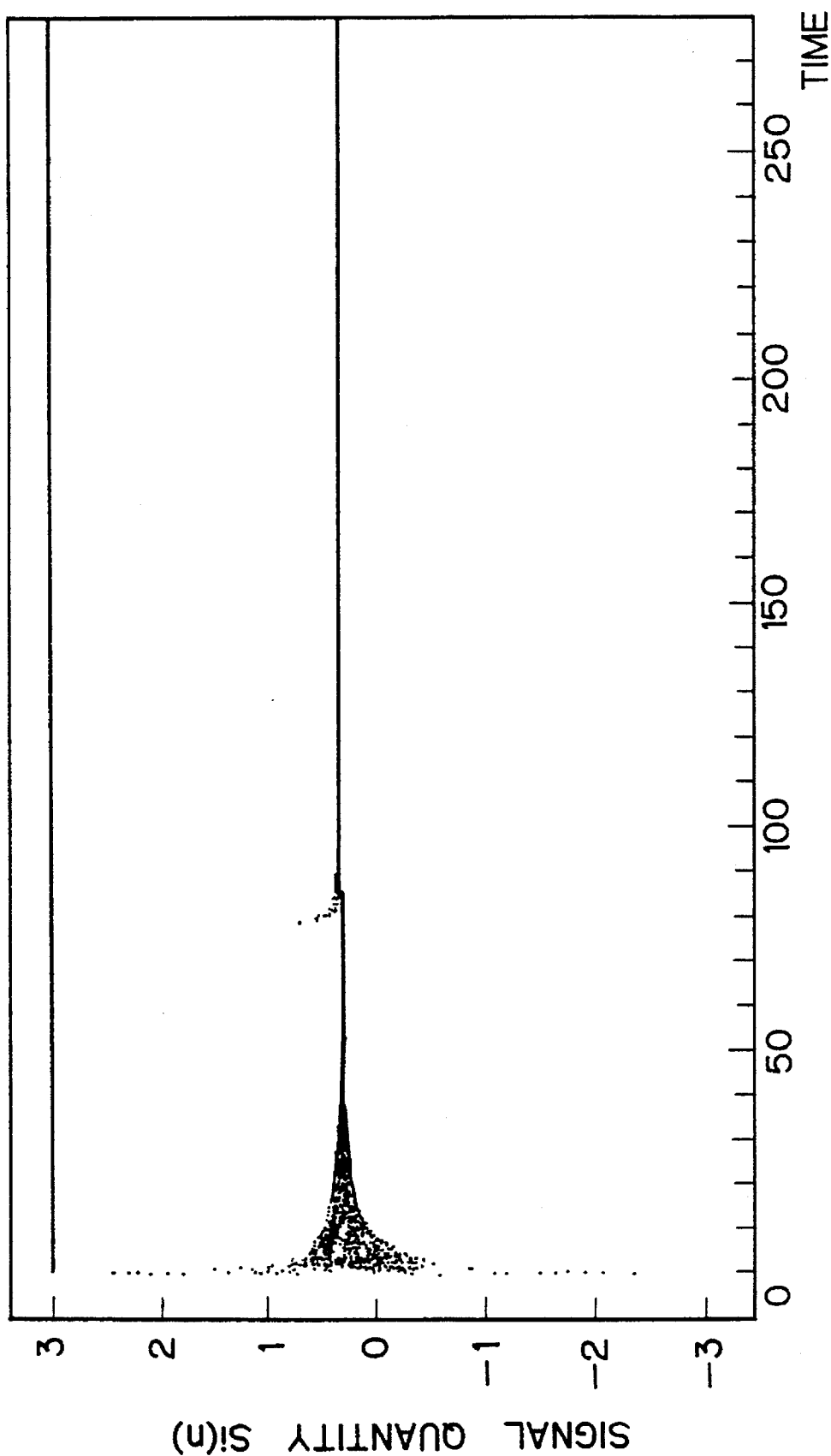
FIG. 52 is a view showing a result of simulation of pull-in characteristics (characteristics of time to signal quantity) of the embodiment of FIG. 51.

As a result, a pull-in time is greatly shortened, as shown in a simulation graph of FIG. 52.

Figure 53:
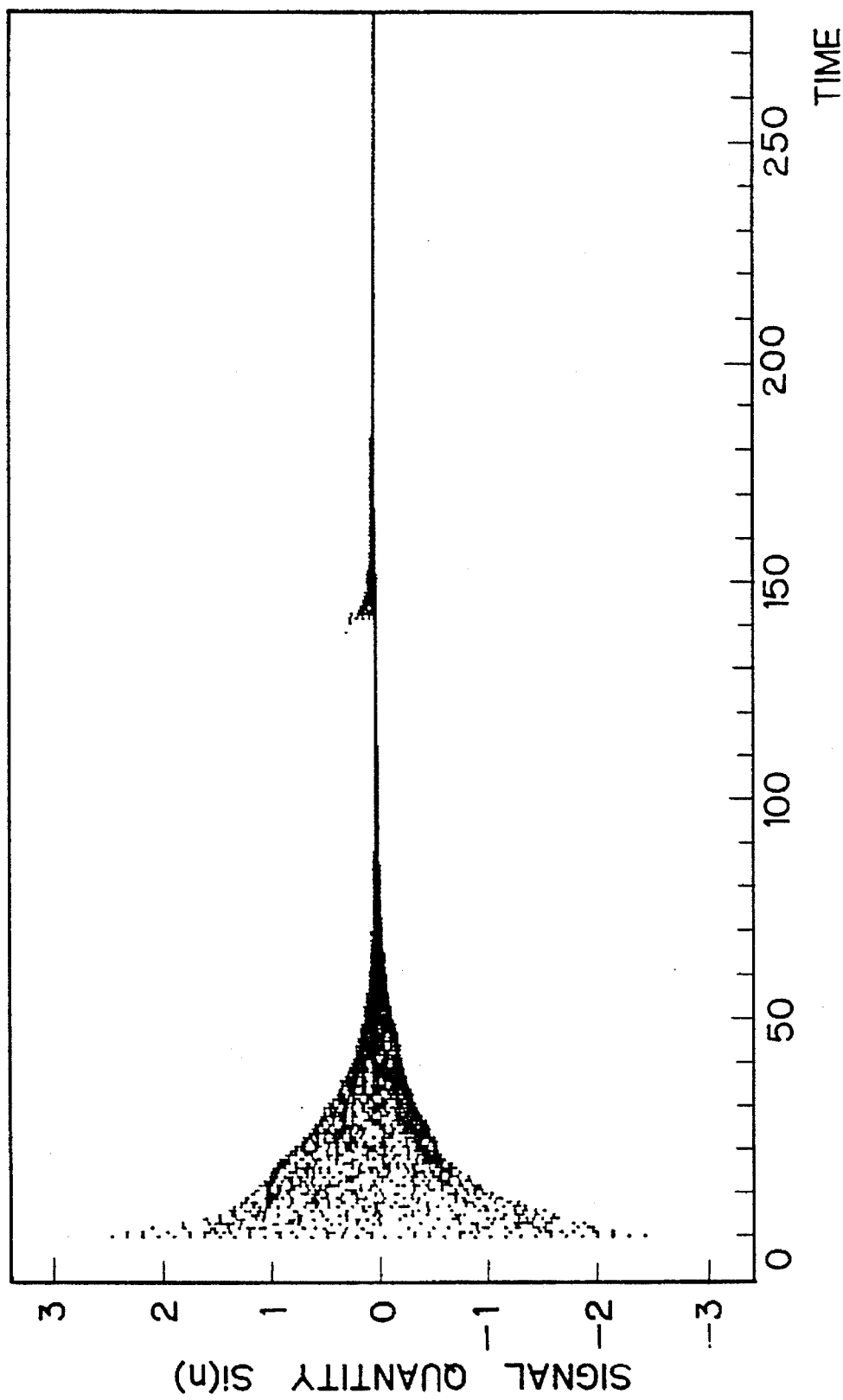
FIG. 53 is a view showing a result of simulation of pull-in characteristics (characteristics of time to signal quantity) with adjacent nodes being selected at random according to the invention.
Figure 54:
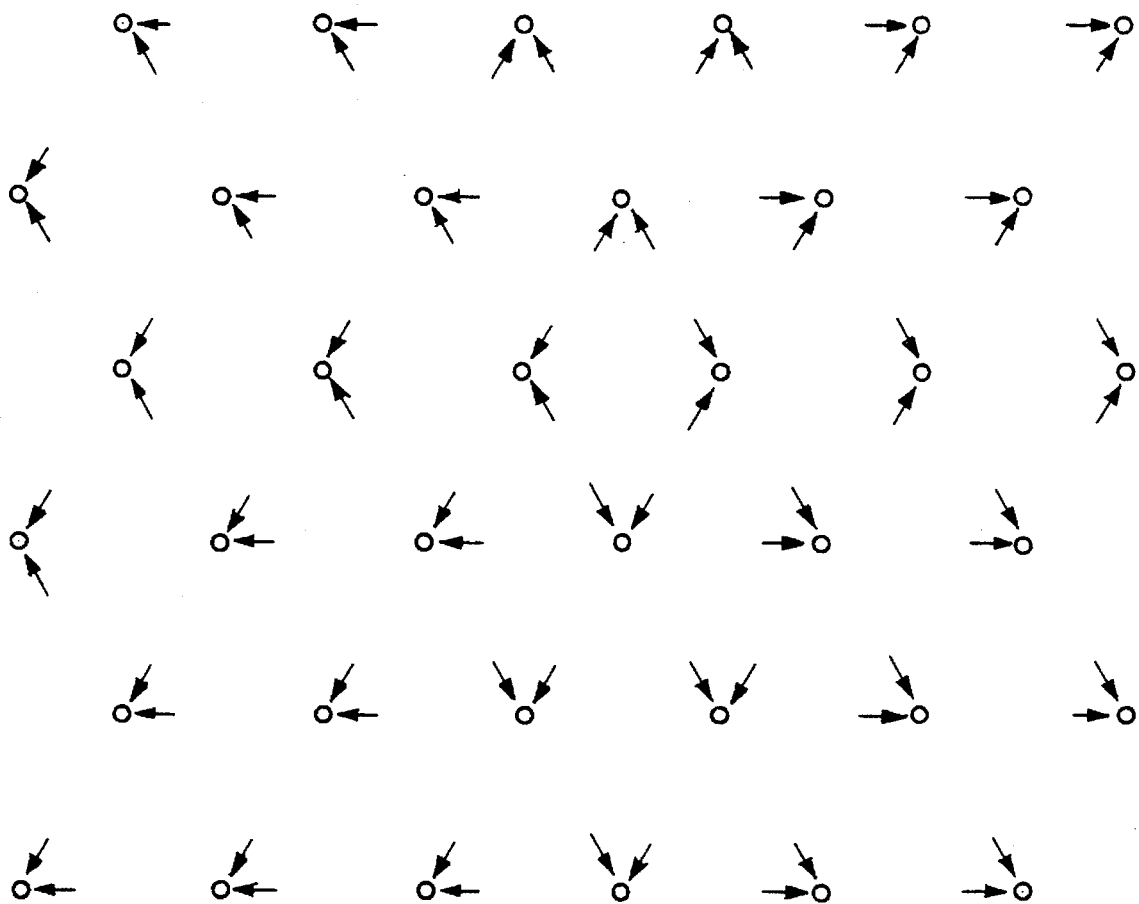
FIG. 54 is a view explaining a rule of node selection according to the invention.
Figure 55:
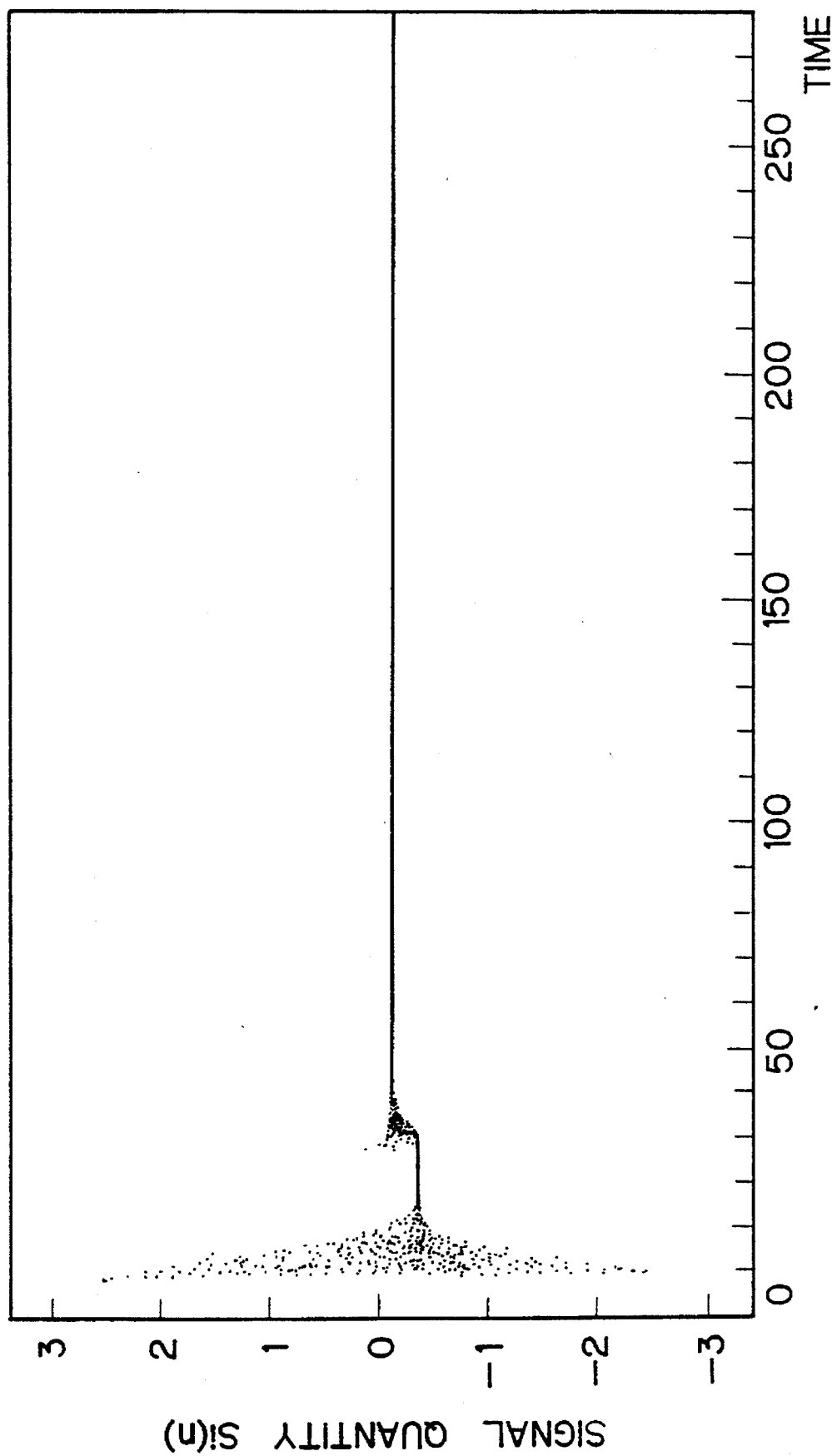
FIG. 55 is a view showing a result of simulation of pull-in characteristics (characteristics of time to signal quantity) with adjacent nodes being selected based on the rule according to the invention.

Embodiments of node selection (FIGS. 53 to 55)

As explained above, a time for stabilizing the mutual synchronization control is shortened by setting a pull-in range. When each node selects its comparison objective nodes at random, a sudden timing difference between adjacent nodes may spread to adjacent nodes, thereby taking a very long time (t=140) to stabilize the whole network (FIG. 53).

To solve this problem, FIG. 54 shows a rule for selecting comparison objective nodes. The rule is set such that fluctuations in a network do not spread over nodes in the network. Nodes existing in the directions of arrow marks serve as central nodes of the network, and a given node is synchronized only with nodes that are closer to the central node, thereby establishing directionality. In practice, each node is provided with a directional antenna with which nodes to be selected are predetermined, thereby establishing directionality of the whole network as shown in FIG. 51. Control information of each node is provided through a broadcast channel such as radio BCCH, and each node can optionally receive the information and correct an error of its own node.

This technique can shorten (t–27) a convergence time needed for stabilizing the network, as shown in a simulation result of FIG. 55.

Figure 56:
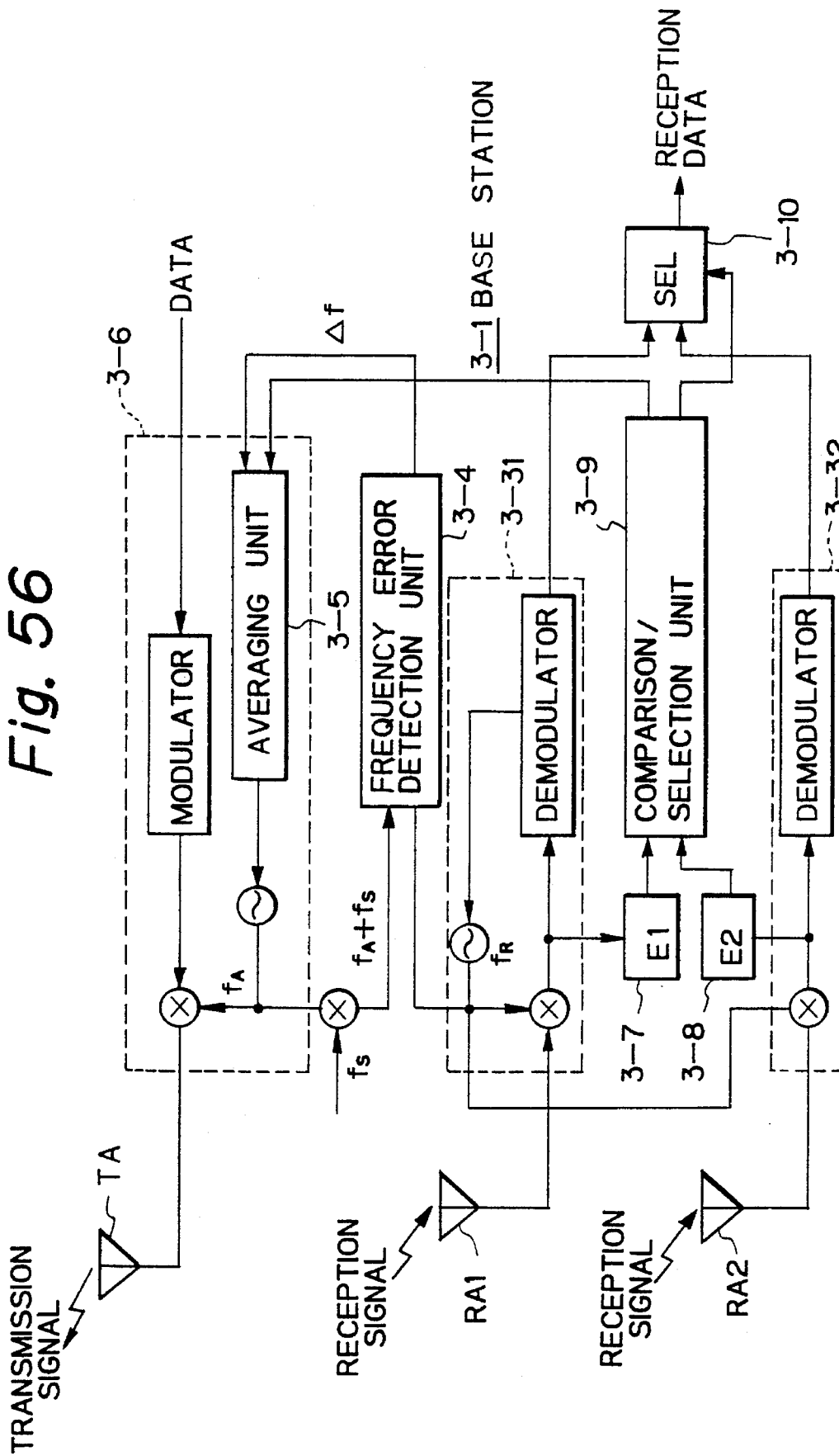
FIG. 56 is a view showing a combination of frequency control and diversity reception according to an embodiment of the invention.
Figure 57:
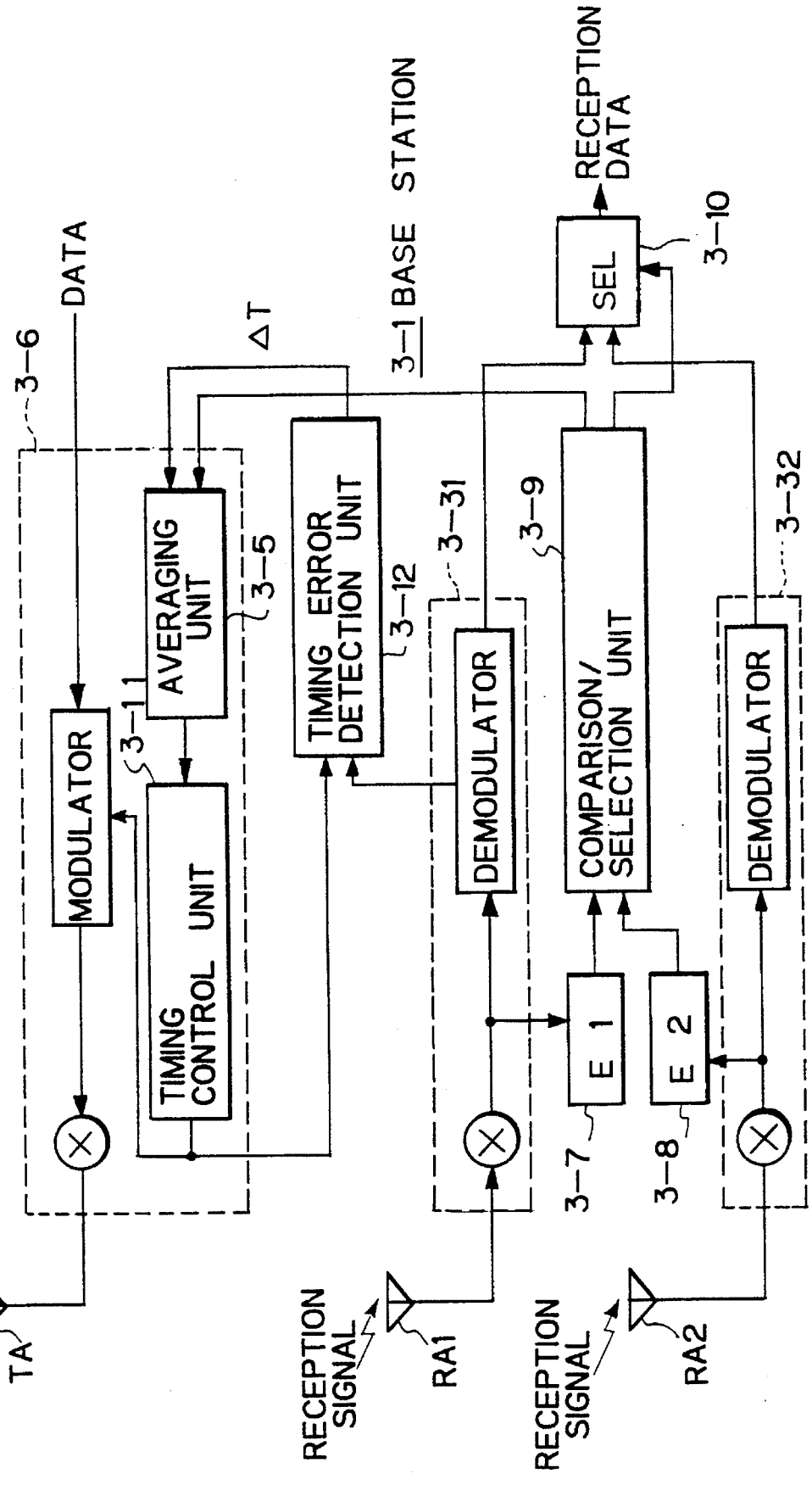
FIG. 57 is a view showing a combination of timing control and diversity reception according to another embodiment of the invention.

Embodiments of synchronous control based on diversity reception (FIGS. 56 and 57)

As explained above, in the network control system of, for example, FIG. 13, the averaging unit 3-5 calculates a spatial mean of a frequency error Δf provided by the frequency error detection unit 3-4. At this time, the Δf is usually weighted by multiplying it by a received C/N provided by an S/N detection unit (not shown). This is also achieved in the timing control of FIG. 12.

In these cases, it is necessary to prepare the S/N detection unit. Instead, this embodiment of the invention employs a diversity reception method and uses, in place of the S/N detection unit, a value measured by a received electric field strength measuring device that is usually arranged for each system.

FIG. 56 shows a combination of the network control system of FIG. 13 based on frequencies and the diversity reception method. Reception frequency automatic control units 3-31 and 3-32 are arranged for signals received by two reception antennas RA1 and RA2, respectively. Measuring devices (E1, E2) 3-7 and 3-8 measure the received electric field strengths of intermediate frequency signals of the reception frequency automatic control units 3-31 and 3-32. A comparison/selection unit 3-9 compares values measured by the measuring devices 3-7 and 3-8 with each other and provides an averaging unit 3-5 with a larger one of the measured values. The selected result is also sent as a selection control signal for received data to a selector 3-10.

FIG. 57 shows a combination of the network control system based on timing control and the diversity reception. What is different from FIG. 56 is that a transmission control unit 3-6 involves a timing control unit 3-11 for receiving an output signal of an averaging unit 3-5 and controlling the timing of a modulator, and a timing error detection unit 3-12 for receiving a reception timing signal from one reception control unit 3-31 as well as a transmission timing signal from the timing control unit 3-11 and providing the averaging unit 3-5 with a timing error signal ΔT.

In this way, in either of the frequency control and timing control, one having a larger received electric field strength is added to a frequency error or a timing error in calculating a weighted mean value, thereby omitting the S/N detection unit.

As explained above, the network control system according to the invention arranges communication means between adjacent nodes. Each node transmits its own controlled value. When receiving a controlled value from an adjacent station, a given node spatially or temporally filters the received controlled value and controls its own controlled value for the next time by minimizing a relative error between the controlled value that has been spatially or temporally filtered and its own controlled value. In this way, the given node communicates data related to the controlled values with adjacent nodes and finds a relative error between them. It is possible, therefore, to eliminate the relative errors of the controlled values at least around the given node. Consequently, the controlled values are surely corrected in the end over the whole system.

Even if some of spatially spread reference signals are disturbed or cause abnormality, the spatial filtering operation carried out on error signals can remove or relax the influence of the disturbance and abnormality. Even if a string of temporally continuous error signals are partly disturbed or cause abnormality, the temporal filtering operation carried out on the error signals can remove or relax the influence of the disturbance and abnormality.

According to the invention, a given node controls its own signal in a way to minimize a differential signal between the signal of its own and signals from other nodes according to the differential signal. When the system is initialized or depending on the magnitude of the differential signal, the invention changes control intervals, filtering characteristics, or level conversion characteristics, thereby most preferably maintains the speed of convergence of network synchronization and the stability of the network.

According to the invention, each base station compares its own transmission frequency with transmission frequencies of adjacent base stations, and controls its own transmission frequency in a way to bring a relative frequency error close to a nominal frequency gap with respect to a reference station. Accordingly, under a steady state, a transient operation of an AFC for absorbing the frequency error of a mobile station is carried out only after a power source is turned ON. Similarly, it is not necessary for a base station to transiently operate the AFC when a mobile station enters into the zone of the base station in question or newly transmits a signal. This may greatly reduce momentary communication stoppage during a hand-over.

The invention correctly controls a frequency gap between radio channels of adjacent base stations. Accordingly, it is not necessary to provide a margin in the frequency gap between the radio channels of the adjacent base stations in consideration of a frequency error, thereby improving the efficiency of frequency use in the communication system as a whole.

The invention can form a distributed control network according to any one of TDMA, FDMA, and CDMA methods, with base radio stations serving as nodes. Unlike a conventional centralized control network, the invention can increase the number of nodes without substantially changing load on each node. According to the invention, each base radio station is connected to a plurality of adjacent base radio stations, so that, even if a given base radio station is disconnected from any one of its adjacent base radio stations, the given base radio station is able to stably carry out synchronous control according to the remaining normal base radio stations, thereby providing a backup function.

We claim:

1. A network control system comprising a plurality of nodes respectively corresponding to, and provided in, a plurality of radio zones, each of said plurality of nodes having a plurality of corresponding adjacent nodes without other nodes positioned between the respective node and each of said plurality of corresponding adjacent nodes, wherein a mobil station travels among the plurality of radio zones and communicates with a respective node when travelling in a radio zone corresponding to the respective node, each of said nodes forms a transmission control signal from a respective initial control signal of the respective node, transmits the transmission control signal to said plurality of corresponding adjacent nodes and receives transmission control signals transmitted from said plurality of corresponding adjacent nodes, each of said nodes comprising:

relative error detecting means for detecting a relative error between a transmission control signal to be transmitted to said plurality of corresponding adjacent nodes and a plurality of transmission control signals respectively received from said plurality of corresponding adjacent nodes, and for producing a corresponding relative error detection output; and control means, which receives the respective initial control signal of the respective node and is responsive to the relative error detection output, for adjusting the initial control signal to form the transmission control signal so that the relative error becomes approximately zero.

2. A network control system as claimed in claim 1, wherein said relative error detecting means detects a plurality of relative errors between said transmission control signal to be transmitted to said plurality of corresponding adjacent nodes and a plurality of received transmission control signals from said plurality of corresponding adjacent nodes, said network control system further comprising filtering means, operatively connected between said relative error detecting means and said control means, for filtering noise from said relative errors.

3. A network control system as claimed in claim 2, wherein said filtering means comprises time filtering means for filtering said relative errors with respect to time.

4. A network control system as claimed in claim 2, wherein said filtering means comprises space filtering means for filtering said relative errors with respect to space.

5. A network control system as claimed in claim 2, wherein said filtering means comprises space filtering means for filtering said relative errors with respect to space and time filtering means for filtering said relative errors with respect to time.

6. A network control system as claimed in claim 1, wherein each node further comprises filtering means, receiving a plurality of transmission control signals from said plurality of corresponding adjacent nodes, for filtering noise from the received transmission control signals and producing a corresponding filtered signal, said relative error detecting means being connected between said filtering means and said control means so that said relative error detecting means receives the filtered signal and detects a relative error between said filtered signal and said transmission control signal to be transmitted to said plurality of corresponding adjacent nodes.

7. A network control system as claimed in claim 6, wherein said filtering means comprises time filtering means for filtering said received transmission control signals with respect to time.

8. A network control system as claimed in claim 6, wherein said filtering means further comprises space filtering means for filtering said received transmission control signals with respect to space.

9. A network control system as claimed in claim 6, wherein said filtering means comprises space filtering means for filtering said received transmission control signals with respect to space and time filtering means for filtering said received transmission control signals with respect to time.

10. A network control system as claimed in claim 8, wherein:

said space filtering means comprises a filtering unit for spatially filtering said received transmission control signals to provide a spatial noise reduced transmission control signal to said control means, said received transmission control signals being reference signals from said plurality of corresponding adjacent nodes;

said relative error detecting means comprises an error detecting unit for providing an error signal indicating a difference between the spatial noise reduced transmission control signal provided by said filtering unit and said transmission control signal to be transmitted to said plurality of corresponding adjacent nodes;

said initial control signal is a synchronization input signal; and said transmission control signal to be transmitted to said plurality of corresponding adjacent nodes is a reference signal of its own node to be transmitted to said plurality of corresponding adjacent nodes.

11. A network control system as claimed in claim 4, wherein:

said relative error detecting means comprises a plurality of error detecting units, each error detecting unit providing a respective error signal indicating a difference between a respective received transmission control signal from one of said plurality of corresponding adjacent nodes and the transmission control signal of its own node, said respective received transmission control signal being a reference signal;

said space filtering means is a filtering unit which receives the error signals provided by the error detecting units and spatially filters the error signals to provide a spatially noise reduced transmission control signal to said control means;

said initial control signal is a synchronization input signal; and said transmission control signal is a reference signal of its own node to be transmitted to said plurality of corresponding adjacent nodes.

12. A network control system as claimed in claim 7, wherein said time filtering means comprises:

a storage unit for storing a received transmission control signal from one of said plurality of corresponding adjacent nodes at a plurality of times and providing corresponding outputs;

a filtering unit, coupled to said storage unit, for filtering, with respect to time, the outputs of said storage unit to provide a noise reduced transmission control signal with respect to time to said relative error detecting means;

said initial control signal is a synchronization input signal; and said transmission control signal to be transmitted to said plurality of corresponding adjacent nodes is a reference signal of its own node to be transmitted to said plurality of corresponding adjacent nodes.

13. A network control system as claimed in claim 3, wherein:

said relative error detecting means is an error detecting unit which provides an error signal indicating a difference between said received transmission control signal as a reference signal and said transmission control signal to be transmitted to said plurality of corresponding adjacent nodes; and said time filtering means comprises:
a storage unit which stores error signals provided by said error detecting unit at a plurality of times; and
a filtering unit which filters, with respect to time, the error signals stored at a plurality of times in said storage unit, to provide a noise reduced transmission control signal with respect to time to said control means.

14. A network control system as claimed in claim 7, wherein said time filtering means comprises:

a first filtering unit which spatially filters said received transmission control signals and provides corresponding output signals;

a storage unit which stores the output signals provided by said first filtering unit at a plurality of times; and a second filtering unit which filters, with respect to time, the output signals stored at a plurality of times in said storage unit, to provide a noise reduced transmission control signal with respect to time to said control means.

15. A network control system as claimed in claim 9, wherein:

said time filtering means comprises:
a plurality of storage units, each storage unit storing a respective received transmission control signal from a respective, corresponding adjacent node of said plurality of corresponding adjacent nodes at a plurality of times and producing corresponding outputs, and
a plurality of filtering units which correspond, respectively, to said plurality of storage units, each filtering unit filtering, with respect to time, the outputs of said corresponding storage unit to provide a respective noise reduced transmission control signal with respect to time;

said space filtering means comprises a filtering unit which receives the respective noise reduced transmission control signals from the plurality of filtering units and filters, with respect to space, the noise reduced transmission control signals to provide a noise reduced transmission control signal with respect to time and space as said filtered signal to said control means; and said initial control signal is a synchronization input signal.

16. A network control system as claimed in claim 5, wherein:

said relative error detecting means comprises a plurality of error detecting units, each error detecting unit providing a corresponding error signal indicating a difference between a respective received transmission control signal from a respective corresponding adjacent node of said plurality of corresponding adjacent nodes and the transmission control signal of its own node;

said space filtering means comprises a filtering unit which receives the error signals from the plurality of error detecting units and spatially filters the error signals to provide a spatially noise reduced transmission control signal;

said time filtering means comprises:
- a storage unit which stores, at a plurality of times, said spatially noise reduced transmission control signal from said filtering unit and produces corresponding output signals, and
- a filtering unit which filters, with respect to time, the output signals produced by said storage unit, to provide a noise reduced transmission control signal with respect to time to said control means.

17. A network control system as claimed in claim 10, further comprising time filtering means comprising:
- a storage unit which stores, at a plurality of times, said error signal from said error detecting unit and produces a corresponding output signal, and
- a filtering unit which filters, with respect to time, the output signals produced by said storage unit, to provide a noise reduced transmission control signal with respect to space and time to said control means.

18. A network control system as claimed in claim 1, further comprising adjustment means, operatively connected to said relative error detecting means and said control means, for adjusting said control means based on the magnitude of said relative error detected by said relative error detecting means.

19. A network control system as claimed in claim 18, wherein said adjustment means comprises:
- a comparator which compares said relative error from said relative error detecting means with a predetermined threshold to provide a control signal when said relative error is greater than said predetermined threshold;
- an OR gate having inputs for receiving said control signal and an initial state signal indicating that said system is in its initial state; and
- a timing signal changing unit, connected to the output of said OR gate, for changing a time duration of a driving signal for driving said control means.

20. A network control system as claimed in claim 1, further comprising:
- filtering means for filtering noises from said relative error;
- filtering characteristic controls means, operatively connected to said relative error detecting means and said filtering means, for controlling the filtering characteristic of said filtering means based on the magnitude of said relative error.

21. A network control system as claimed in claims 20, wherein said filtering characteristic control means comprises:
- a comparator for comparing said relative error from said relative error detecting means with a predetermined threshold to provide a control signal when said relative error is greater than said predetermined threshold;
- an OR gate having inputs for receiving said control signal and an initial state signal indicating that said system is in its initial state; and
- a filtering characteristic changing unit, connected to the output of said OR gate, for changing the filtering characteristic of said filtering means in accordance with the output of said OR gate.

22. A network control system as in claim 1, further comprising:
- level converting means for receiving the error signal and for changing a characteristic of the error signal in correspondence with the magnitude of the error signal to produce an adjusted error signal, wherein the control means receives the adjusted error signal and uses the adjusted error signal to form the transmission control signal to be transmitted to said plurality of corresponding adjacent nodes.

23. A network control system as claimed in claim 22, wherein said input/output level converting means comprises:
- a comparator for comparing said relative error from said relative error detecting means with a predetermined threshold to provide a control signal when said relative error is greater than said predetermined threshold;
- an OR gate having inputs for receiving said control signal and an initial state signal indicating that said system is in its initial state; and
- a level converting characteristic changing unit, connected to the output of said OR gate, for changing the level converting characteristic in accordance with the output of said OR gate.

24. A network control system as in claim 20, wherein said filtering means receives a transmission control signal from one of said plurality of corresponding adjacent nodes, filters said received transmission control signal to produce a filtered signal and provides the filtered signal to said relative error detecting means.

25. A network control system as in claim 20, wherein said filtering means is operatively connected between said relative error detecting means and said control means for filtering said relative error.

26. A network control system as in claim 20, wherein said filtering means is operatively connected to said control means for filtering a control signal of said control means.

27. A network control system as in claim 1, wherein each node further comprises:
- relative error feedback means, which receives a respective transmission control signal from a respective, corresponding adjacent node of said plurality of corresponding adjacent nodes and is responsive to the relative error detected by the relative error detecting means, for using the relative error as feedback to adjust the level of a characteristic of the received transmission control signal based on the magnitude of the relative error, and for producing a corresponding output, the output of the relative error feedback means being provided to the relative error detection means for detection of the relative error.

28. A network control system as in claim 1, wherein each node further comprises:
- level converting means, which receives the relative error from the relative error detecting means, for adjusting the level of a characteristic of the relative error based on the magnitude of the relative error, and for producing a corresponding output, the output of the level converting means being provided to the control means, wherein the control means adjusts the initial control signal to form the transmission control signal based on the output of the level converting means.

29. A network control system as in claim 1, wherein the control means is responsive to the relative error to adjust the level of a characteristic of the transmission control signal to be transmitted to said plurality of corresponding adjacent nodes, the adjustment being based on the magnitude of the relative error.

30. A network control system as in claim 1, wherein the relative error detected by said relative error detection means is a relative frequency error between the transmission control signal to be transmitted to said plurality of corresponding adjacent nodes and the plurality of transmission control signals respectively received from said plurality of corresponding adjacent nodes.

* * * * *

UNITED STATES PATENT AND TRADEMARK OFFICE
CERTIFICATE OF CORRECTION

PATENT NO. : 5,526,383
DATED : June 11, 1996
INVENTOR(S) : Tetsuyoshi TAKENAKA et al.

It is certified that error appears in the above-indentified patent and that said Letters Patent is hereby corrected as shown below:

Column 6, line 6, after "stations", delete the comma (",");
    Line 6, after "700", insert a comma (",").

Column 13, line 67, delete "with".

Signed and Sealed this

Twenty-fourth Day of September, 1996

Attest:

BRUCE LEHMAN

Attesting Officer        Commissioner of Patents and Trademarks